United States Patent
Zhang et al.

(10) Patent No.: US 11,861,156 B2
(45) Date of Patent: Jan. 2, 2024

(54) INTERFACE DISPLAY METHOD AND RELATED APPARATUS

(71) Applicant: Huawei Technologies Co., Ltd., Shenzhen (CN)

(72) Inventors: Yanan Zhang, Shenzhen (CN); Hongjun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/192,006

(22) Filed: Mar. 29, 2023

(65) Prior Publication Data

US 2023/0251773 A1 Aug. 10, 2023

Related U.S. Application Data

(63) Continuation of application No. PCT/CN2021/121334, filed on Sep. 28, 2021.

(30) Foreign Application Priority Data

Sep. 30, 2020 (CN) .......................... 202011066477.1

(51) Int. Cl.
*G06F 3/0485* (2022.01)
(52) U.S. Cl.
CPC .. *G06F 3/0485* (2013.01); *G06F 2203/04803* (2013.01)
(58) Field of Classification Search
CPC ................ G06F 3/0485; G06F 2203/04803
USPC ........................................................ 715/765
See application file for complete search history.

(56) References Cited

U.S. PATENT DOCUMENTS

| | | | |
|---|---|---|---|
| 2010/0122162 A1* | 5/2010 | Terada | G06F 3/0485 345/589 |
| 2013/0073951 A1* | 3/2013 | Takami | G06F 3/0481 715/243 |
| 2014/0164966 A1* | 6/2014 | Kim | G06F 16/168 715/769 |
| 2014/0365854 A1* | 12/2014 | Karunamuni | G06F 3/0488 715/777 |
| 2017/0199853 A1* | 7/2017 | Kim | G06T 3/40 |
| 2018/0039387 A1* | 2/2018 | Cheong | G06F 3/04883 |
| 2021/0407507 A1* | 12/2021 | Zhou | G06F 3/04842 |
| 2022/0147228 A1* | 5/2022 | Yi | H04M 1/72412 |
| 2022/0358089 A1* | 11/2022 | Liu | G06F 16/148 |
| 2023/0046708 A1* | 2/2023 | Xu | G06F 1/1694 |

(Continued)

*Primary Examiner* — William D Titcomb
(74) *Attorney, Agent, or Firm* — Slater Matsil, LLP

(57) ABSTRACT

An interface display method is disclosed. The method includes: An electronic device displays a first page of a first application in full screen. The electronic device receives a first operation on the first page. In response to the first operation, the electronic device displays the first page in a window form in a first area of a display, displays a second page of a second application in a window form in a second area of the display, and displays a first control in a third area of the display, where the first control is associated with a third page of the first application. When the electronic device receives a fourth operation on the first control, the electronic device displays the third page in full screen in response to the fourth operation. In this way, the third page can be quickly entered from the first page, and access efficiency is improved.

20 Claims, 37 Drawing Sheets

(56) References Cited

U.S. PATENT DOCUMENTS

2023/0251773 A1\* 8/2023 Zhang ................ G06F 3/04817
715/765

\* cited by examiner

INTERFACE DISPLAY METHOD AND RELATED APPARATUS

CROSS-REFERENCE TO RELATED APPLICATIONS

This application is a continuation of International Application No. PCT/CN2021/121334, filed on Sep. 28, 2021, which claims priority to Chinese Patent Application No. 202011066477.1, filed on Sep. 30, 2020. The disclosures of the aforementioned applications are hereby incorporated by reference in their entireties.

TECHNICAL FIELD

This application relates to the field of electronic technologies, and in particular, to an interface display method and a related apparatus.

BACKGROUND

In daily life, when using a mobile phone, a user often needs to quickly enable specific functions, such as quick payment and quick music playing. For example, the user needs to make a payment when browsing news on the mobile phone. In this case, the user needs to exit a news browsing interface on the mobile phone, enters to payment application software, and then performs a series of user operations to enter a payment interface to complete the payment. The user operations are complex.

Currently, the mobile phone may quickly switch to a previously used application by using a multi-task interface. The multi-task interface includes pages corresponding to a plurality of applications that are running on the mobile phone. By using a page on the multi-task interface, the mobile phone may quickly enter an application corresponding to the page, and display a user interface of the application. For example, the user may directly enter a main interface (or an interface (a non-payment code interface) displayed when the payment application is exited last time) of the payment application from a news browsing application by using the multi-task interface, and then performs a series of user operations to enter the payment code interface. The user operations are still complex.

SUMMARY

Embodiments of this application provide an interface display method and a related apparatus, to help a user quickly open an interface in an application. Therefore, access efficiency is improved.

According to a first aspect, this application provides an interface display method. The method includes: An electronic device displays a first page of a first application in full screen. The electronic device receives a first operation on the first page. In response to the first operation, the electronic device displays the first page in a window form in a first area of a display, displays a second page of a second application in a window form in a second area of the display, and displays a first control in a third area of the display, where the first control is associated with a third page of the first application. The first operation may be an upward sliding operation performed at a bottom of the first page. The first operation may be performed to enter a multi-task interface of the electronic device. The multi-task interface may include pages of one or more applications.

When the electronic device receives a second operation on the first page in the window form, the electronic device displays the first page in full screen in response to the second operation. When the electronic device receives a third operation on the second page in the window form, the electronic device displays the second page in full screen in response to the third operation. When the electronic device receives a fourth operation on the first control, the electronic device displays the third page in full screen in response to the fourth operation, where the third page differs from the first page. When the electronic device receives a fifth operation on the third page, the electronic device displays, in response to the fifth operation, the third page in a window form in the first area and the second page in the window form in the second area.

In this embodiment of this application, when the first page on the electronic device is accessed, the first operation may be performed to enter the multi-task interface, and a tap operation may be performed on the first control on the multi-task interface. The first control is associated with the third page. In response to the tap operation performed on the first control, the electronic device displays the third page. In this way, the third page can be quickly entered from the first page and access efficiency is improved.

With reference to the first aspect, in a possible implementation, the method further includes: The electronic device displays the first control in the third area in response to the fifth operation. When the electronic device receives the fifth operation on the third page, the electronic device displays the multi-task interface. The third area still includes the previous first control. In other words, the first control may be always displayed in the third area on the multi-task interface. Optionally, the first control is displayed surrounding the first application.

With reference to the first aspect, in a possible implementation, the method further includes: The electronic device displays a second control in the third area in response to the fifth operation, where the second control is associated with the first page. When the electronic device receives a sixth operation on the second control, the electronic device displays the first page in full screen in response to the sixth operation.

The second control is automatically added by the electronic device. If the electronic device has displayed the third page, the third page is a historical track interface. The electronic device establishes a correspondence between the second control and the third page, and displays the second control in the third area. Optionally, if the electronic device has displayed the third page, and cumulative display time of the third page is greater than a first threshold, the third page is a historical track interface. The electronic device establishes a correspondence between the second control and the third page, and displays the second control in the third area. Optionally, if the electronic device has displayed the third page, and a cumulative quantity of times of displaying the third page is greater than a second threshold, the third page is a historical track interface. The electronic device establishes a correspondence between the second control and the third page, and displays the second control in the third area. A manner in which the electronic device automatically adds a control associated with a historical interface is provided herein, so that a user can quickly return to a historical track interface.

The electronic device displays the third page in a window form in the first area. In this case, the electronic device may directly enter the third page based on the third page in the window form, which functions the same as the first control.

Therefore, when the electronic device identifies that a current interface is the multi-task interface entered from the third page, the first control that is in the third area and that is associated with the third page may not be displayed. This reduces resources.

With reference to the first aspect, in a possible implementation, the method further includes: When the electronic device receives a seventh operation on the first page in the window form, the electronic device displays a second control in the third area in response to the seventh operation, where the second control is associated with the first page. Alternatively, the second control may be manually added by the user.

With reference to the first aspect, in a possible implementation, the method further includes: The electronic device displays a fourth page in a window form in the first area in response to the seventh operation, where the fourth page is a homepage of the first application or an upper-level page of the first page in the first application.

With reference to the first aspect, in a possible implementation, the first control is displayed in the third area by the electronic device in response to an eighth operation when the electronic device receives the eighth operation on the third page in a window form, and the third page in the window form is displayed in the first area by the electronic device in response to a ninth operation when the electronic device displays the third page in full screen and the electronic device receives the ninth operation on the third page. A manner of manually adding the first control is described herein. In the first area of the multi-task interface, the third page in a window form is displayed. When receiving a user operation on the third page, the electronic device may add the first control to the multi-task interface.

With reference to the first aspect, in a possible implementation, the method further includes: The electronic device displays the third page in full screen before displaying the first page of the first application in full screen. When the electronic device receives a tenth operation on the third page, the electronic device displays the first page in full screen in response to the tenth operation. A manner of automatically adding the first control is described herein. If the electronic device has displayed the third page, the electronic device establishes a correspondence between the first control and the third page.

In a possible implementation, the method further includes: The electronic device displays the third page in full screen before displaying the first page of the first application in full screen, where cumulative display time of the third page is greater than a first threshold. When the electronic device receives a tenth operation on the third page, the electronic device displays the first page in full screen in response to the tenth operation. Another manner of automatically adding the first control is described herein. If the electronic device has displayed the third page, and the cumulative display time of the third page is greater than the first threshold, the electronic device establishes a correspondence between the first control and the third page.

In a possible implementation, the method further includes: The electronic device displays the third page in full screen before displaying the first page of the first application in full screen, where a cumulative quantity of times of displaying the third page is greater than a second threshold. When the electronic device receives a tenth operation on the third page, the electronic device displays the first page in full screen in response to the tenth operation. Another manner of automatically adding the first control is described herein. If the electronic device has displayed the third page, and the cumulative quantity of times of displaying the third page is greater than the first threshold, the electronic device establishes a correspondence between the first control and the third page.

With reference to the first aspect, in a possible implementation, the third area further includes a third control, the third control is associated with a fifth page of the first application, and the third control is preset by the electronic device.

With reference to the first aspect, in a possible implementation, the method further includes: The electronic device displays a fifth page in full screen. The electronic device receives an eleventh operation on the fifth page. The electronic device displays the first control and a fourth control in response to the eleventh operation. When the electronic device receives a user operation on the first control, the electronic device displays the third page in full screen. When the electronic device receives a user operation on the fourth control, the electronic device displays a sixth page of a third application in full screen, where the third application differs from the first application. The electronic device may view controls of a plurality of applications, for example, the first control and the fourth control.

With reference to the first aspect, in a possible implementation, the method further includes: After the electronic device displays the third page in full screen when receiving the user operation on the first control, the electronic device displays a fifth control on the third page. When the electronic device receives a user operation on the fifth control, the electronic device displays the fifth page in full screen. A return control is provided herein. If the electronic device enters the fifth page by using the first control, the electronic device may also quickly return to the third page by using the fifth control on the fifth page.

With reference to the first aspect, in a possible implementation, the method further includes: After the electronic device displays the sixth page of the third application in full screen when receiving the user operation on the fourth control, the electronic device displays a sixth control on the sixth page. When the electronic device receives a user operation on the sixth control, the electronic device displays the fifth page in full screen. A return control is provided herein. If the electronic device enters the sixth page by using the fourth control, the electronic device may also quickly return to the third page by using the fifth control on the sixth page.

According to a second aspect, this application provides an electronic device, including one or more processors and one or more memories, where the one or more memories are coupled to the one or more processors and are configured to store computer program code. The computer program code includes computer instructions, and when the computer instructions are executed on the processor, the electronic device is enabled to perform the interface display method according to any possible implement of the foregoing aspect.

According to a third aspect, an embodiment of this application provides a computer storage medium, including computer instructions. When the computer instructions are executed on an electronic device, a communications apparatus is enabled to perform the interface display method according to any possible implementation of any one of the foregoing aspects.

According to a fourth aspect, an embodiment of this application provides a computer program product. When the computer program product is run on an electronic device, a computer is enabled to perform the interface display method according to any possible implementation of any one of the foregoing aspects.

DETAILED DESCRIPTION OF ILLUSTRATIVE EMBODIMENTS

The following describes technical solutions of embodiments in this application with reference to accompanying drawings. In the descriptions of embodiments of this application, "/" means "or" unless otherwise specified. For example, A/B may represent A or B. In this specification, "and/or" describes merely an association relationship between associated objects and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" and "second" may explicitly or implicitly include one or more of the features. In the descriptions of embodiments of this application, unless otherwise specified, "a plurality of" means two or more. An orientation or a location relationship indicated by the terms "middle", "left", "right", "up", "down", and the like is based on an orientation or a location relationship shown in the accompanying drawings, and is merely intended to facilitate description of this application and simplify description, instead of indicating or implying that the mentioned apparatus or element needs to have a specific orientation or needs to be constructed and operated in a specific orientation, and therefore cannot be construed as a limitation on this application.

The following first describes an electronic device 100 involved in embodiments of this application.

Figure 1A:
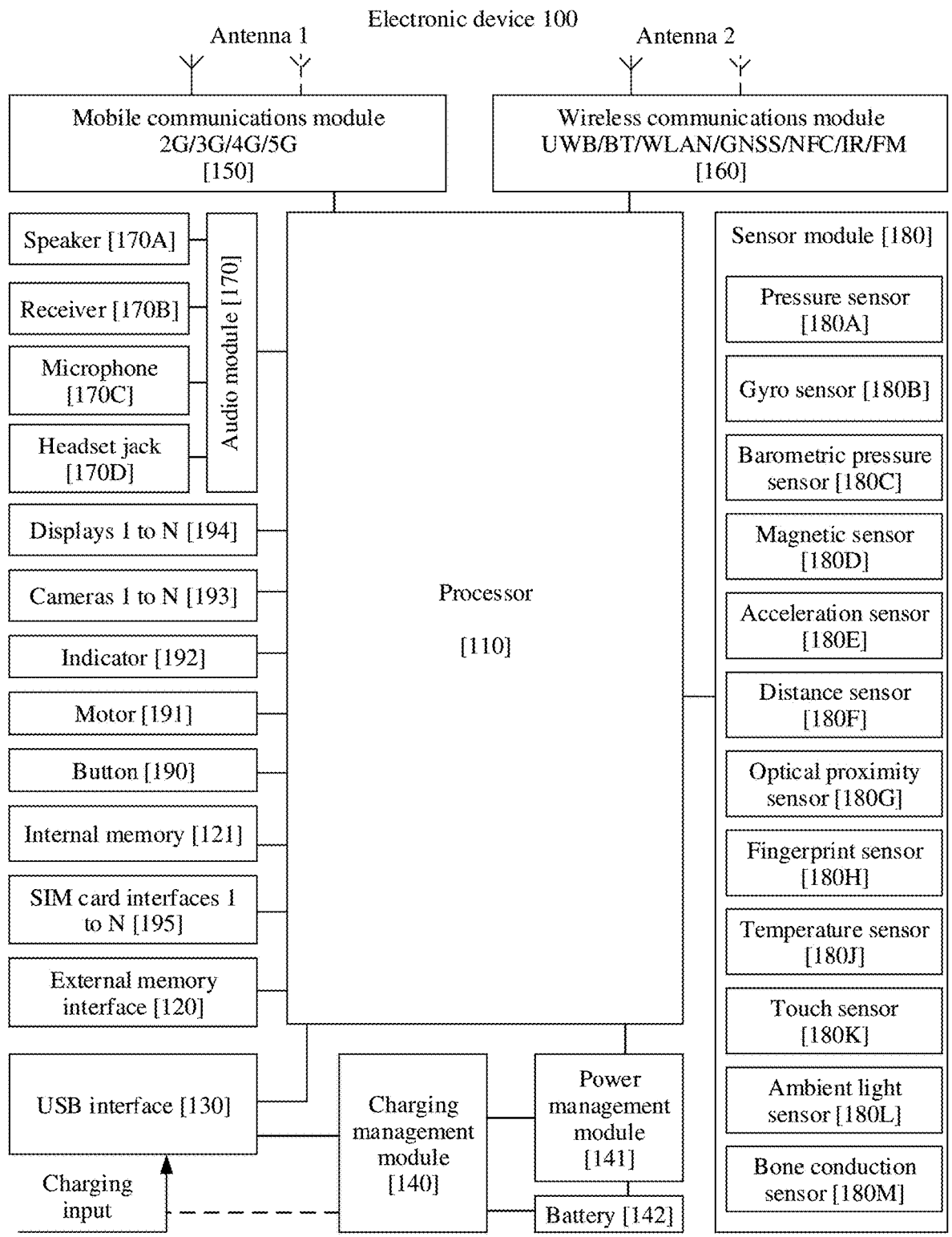
FIG. 1A is a schematic diagram of a hardware structure of an electronic device according to an embodiment of this application.

FIG. 1A is a schematic diagram of a structure of the example electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a limitation on the electronic device 100. In some other embodiments, the electronic device 100 may include more or fewer components than those shown in the figure, combine some components, split some components, or have different component arrangements. The components shown in the figure may be implemented by using hardware, software, or a combination of software and hardware.

The processor no may include one or more processing units. For example, the processor no may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to control instruction fetching and instruction execution.

A memory may be further disposed in the processor no, to store instructions and data. In some embodiments, the memory in the processor no is a cache. The memory may store instructions or data that has been used or is cyclically used by the processor no. If the processor no needs to use the instructions or the data again, the processor may directly invoke the instructions or the data from the memory. This avoids repeated access, reduces waiting time of the processor no, and improves system efficiency.

In some embodiments, the processor no may include one or more interfaces. The interface may be an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The I2C interface is a bidirectional synchronous serial bus, including a serial data line (SDA) and a serial clock line (SCL). In some embodiments, the processor no may include a plurality of I2C buses. The processor no may be coupled to the touch sensor 180K, a charger, a camera flash, the camera 193, and the like through different I2C bus interfaces. For example, the processor no may be coupled to the touch sensor 180K through the I2C interface, so that the processor no can communicate with the touch sensor 180K through the I2C bus interface, to implement a touch function of the electronic device 100.

The I2S interface may be used for audio communication. In some embodiments, the processor no may include a plurality of I2S buses. The processor no may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, and may perform sampling, quantizing, and encoding on an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a bidirectional communications bus. The bus converts to-be-transmitted data between serial communication and parallel communication. In some embodiments, the UART interface is usually configured to connect the processor no to the wireless communications module 160. For example, the processor no communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor no to a peripheral component such as the display 194 or the camera 193. The MIPI interface includes a camera serial interface (CSI), a display serial interface (DSI), or the like. In some embodiments, the processor no communicates with the camera 193 through the CSI, to implement a photographing function of the electronic device 100. The processor no communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor no to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to the USB standard specification, and may be specifically a mini USB interface, a micro USB interface, a USB T e-C interface, or the like. The USB interface 130 may be configured to connect to a charger to charge the electronic device 100, may be configured to transmit data between the electronic device 100 and a peripheral device, or may be configured to connect to a headset to play audio by using the headset. The interface may be further configured to connect to another electronic device such as an AR device.

It may be understood that an interface connection relationship between the modules shown in this embodiment of this application is merely an example for description, and does not constitute a limitation on a structure of the electronic device 100. In some other embodiments of this application, the electronic device 100 may alternatively use an interface connection manner different from that in the foregoing embodiment, or combine a plurality of interface connection manners.

The charging management module 140 is configured to receive charging input from the charger. The charger may be a wireless or wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage and impedance). In some other embodiments, the power management module 141 may alternatively be disposed in the processor no. In some other embodiments, the power management module 141 may alternatively be disposed in a same device as the charging management module 140.

A wireless communications function of the electronic device 100 may be implemented by using the antenna 1, antenna 2, mobile communications module 150, wireless communications module 160, modem processor, baseband processor, and the like.

The antenna 1 and the antenna 2 are configured to transmit and receive an electromagnetic wave signal. Each antenna of the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communications solution that is applied to the electronic device 100 and that involves 2G/3G/4G/5G communication, or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor no. In some embodiments, at least some functional modules of the mobile communications module 150 may be disposed in a same device as at least some modules of the processor no.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers a signal obtained after processing to the application processor. The application processor outputs a sound signal by using an audio device (which is not limited to the speaker 170A, the receiver 170B, or the like), or displays an image or a video on the display 194. In some embodiments, the modem processor may be an independent device. In some other embodiments, the modem processor may be independent of the processor no, and is disposed in a same device as the mobile communications module 150 or another functional module.

The wireless communications module 160 may provide a wireless communications solution that is applied to the electronic device 100 and that involves UWB, a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor no. The wireless communications module 160 may further receive a to-be-sent signal from the processor no, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time division synchronous code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BeiDou navigation satellite system, BDS), a quasi-zenith satellite system (QZSS), and/or satellite-based augmentation systems (SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation and render an image. The processor no may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (OLED), an active-matrix organic light emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

In some embodiments of this application, the display 194 displays an interface that is currently output by the system. For example, the interface is an interface of an instant messaging application.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, so as to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image is generated for an object through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, such as RGB or YUV. In some embodiments, the electronic device 100 may include one or N cameras 193, where N is a positive integer greater than 1.

The digital signal processor is configured to process a digital signal, and may further process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of coding formats, such as moving picture experts group (MPEG)-1, MPEG-2, MPEG-3, and MPEG-4.

The NPU is a neural-network (NN) computing processor. The NPU quickly processes input information with reference to a structure of a biological neural network, such as a transfer mode between human brain neurons, and may further perform self-learning continuously. Applications such as intelligent cognition of the electronic device 100, for example, image recognition, facial recognition, speech recognition, and text understanding, may be implemented through the NPU.

The external memory interface 120 may be used to connect to an external storage card, such as a micro SD card, to extend a storage capability of the electronic device 100. The external storage card communicates with the processor no through the external memory interface 120, to implement a data storage function. For example, files such as music and a video are stored in the external storage card.

The internal memory 121 may be configured to store computer-executable program code that includes instructions. The processor no implements various functional applications and data processing of the electronic device 100 by running the instructions stored in the internal memory 121. The internal memory 121 may include a program storage area and a data storage area. The program storage area may store an operating system, an application required by at least one function (such as a sound playing function or an image playing function), and the like. The data storage area may store data (such as audio data and a phone book) and the like that are created during use of the electronic device 100. In addition, the internal memory 121 may include a high-speed random access memory, and may further include a nonvolatile memory, for example, at least one magnetic disk storage device, a flash memory device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor no, or some functional modules of the audio module 170 are disposed in the processor no.

The speaker 170A, also referred to as a "loudspeaker", is configured to convert an electrical audio signal into a sound signal. The speaker 170A may be used to listen to music or answer a hands-free call on the electronic device 100.

The receiver 170B, also referred to as an "earpiece", is configured to convert an electrical audio signal into a sound signal. When the electronic device 100 is used to answer a call or listen to audio information, the receiver 170B may be put close to a human ear to listen to a voice.

The microphone 170C, also referred to as a "mike" or a "mic", is configured to convert a sound signal into an electrical signal. When making a call or sending speech information, a user may have the mouth of the user near the microphone 170C to make a sound, so as to input a sound signal to the microphone 170C. At least one microphone 170C may be disposed in the electronic device 100. In some other embodiments, two microphones 170C may be disposed in the electronic device 100, to collect a sound signal and to further perform noise reduction. In some other embodiments, three, four, or more microphones 170C may alternatively be disposed in the electronic device 100, to collect a sound signal, perform noise reduction, and identify a sound source, so as to implement a directional recording function and the like.

The headset jack 170D is configured to connect to a wired headset. The headset jack 170D may be the USB interface 130, or may be a 3.5-mm open mobile terminal platform (OMTP) standard interface or a cellular telecommunications and internet association of the USA (cellular telecommunications and internet association of the USA, CTIA) standard interface.

The pressure sensor 180A is configured to sense a pressure signal, and can convert the pressure signal into an electrical signal. In some embodiments, the pressure sensor 180A may be disposed on the display 194. In some optional embodiments of this application, the pressure sensor 180A may be configured to capture a pressure value generated when a finger part of a user touches the display, and transmit the pressure value to the processor. In this way, the processor can identify the finger part through which the user enters a user operation.

There are various types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 receives intensity of the touch operation through the pressure sensor 180A. The electronic device 100 may also calculate a touch location based on a detection signal of the pressure sensor 180A. In some embodiments, different touch positions may correspond to different operation instructions. In some optional embodiments, the pressure sensor 180A may further calculate a quantity of touch points based on a detected signal, and transmit a calculated value to the processor. In this way, the processor can identify whether the user uses a single finger or a plurality of fingers to enter a user operation.

The gyro sensor 180B may be configured to determine a motion posture of the electronic device 100. In some embodiments, an angular velocity of the electronic device 100 around three axes (namely, axes x, y, and z of the electronic device) may be determined by using the gyro sensor 180B. The gyro sensor 180B may be configured to ensure image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion. In this way, image stabilization is ensured. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, if the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or flip cover.

The acceleration sensor 180E may detect acceleration magnitudes in all directions (usually along three axes) of the electronic device 100. When the electronic device 100 is still, a magnitude and direction of gravity may be detected. The acceleration sensor 180E may be further configured to identify a posture of the electronic device, and is used for landscape/portrait mode switching and an application such as a pedometer or the like. In some optional embodiments of this application, the acceleration sensor 180E may be configured to capture an acceleration value generated when a finger part of a user touches the display (or when a user finger taps a rear cover frame of the electronic device 100), and transmit the acceleration value to the processor. In this way, the processor can identify the finger part through which the user enters a user operation.

The distance sensor 180F is configured to measure a distance. The electronic device wo may measure a distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When adequate reflected light is detected, the electronic device 100 may determine that there is an object near the electronic device 100. When inadequate reflected light is detected, the electronic device 100 may determine that there is no object near the electronic device 100. The electronic device 100 may use the optical proximity sensor 180G to detect that the user holds the electronic device 100 close to an ear for a call, so as to automatically turn off the display for power saving. The optical proximity sensor 180G may also be used in a leather case mode or a pocket mode to automatically unlock or lock the screen.

The ambient light sensor 180L is configured to sense brightness of ambient light. The electronic device 100 may adaptively adjust brightness of the display 194 based on the sensed brightness of ambient light. The ambient light sensor 180L may also be configured to automatically adjust white balance during photographing. The ambient light sensor 180L may also cooperate with the optical proximity sensor 180G to detect whether the electronic device wo is in a pocket, so as to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 performs a temperature processing policy based on the temperature detected by the temperature sensor 180J. For example, if a temperature reported by the temperature sensor 180J exceeds a threshold, the electronic device 100 degrades performance of a processor near the temperature sensor 180J, to reduce power consumption and implement thermal protection. In some other embodiments, if the temperature is less than another threshold, the electronic device 100 heats the battery 142 to prevent the electronic device 100 from being shut down abnormally due to a low temperature. In some other embodiments, if the temperature is less than still another threshold, the electronic device 100 boosts an output voltage of the battery 142 to prevent an abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a touch screen. The touch sensor 180K is configured to detect a touch operation on or near the touch sensor 180K. The touch operation refers to an operation of touching the display 194 by a hand, an elbow, a stylus, or the like of the user. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a pulsating blood pressure signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the pulsating blood pressure signal obtained by the bone conduction sensor 180M, to implement a heart rate detection function.

The button 190 includes a power button, a volume button, and the like. The button 190 may be a mechanical button or a touch-sensitive button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (such as photographing and audio playing applications) may correspond to different vibration feedback effects. Touch operations performed on different areas of the display 194 may also correspond to different vibration feedback effects of the motor 191. Different application scenarios (such as time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to be in contact with or separated from the electronic device 100.

In embodiments of this application, a mobile phone may quickly switch to a previously used application by using a multi-task interface. The multi-task interface includes one or more pages, and each of the one or more pages corresponds to an application of the mobile phone. In some embodiments, the application is an application that is running on the mobile phone. The mobile phone may start and simultaneously run a plurality of applications to provide different services or functions for a user. That the mobile phone simultaneously runs a plurality of applications means that the mobile phone has started the plurality of applications, and the plurality of applications are not closed. Resources such as a memory occupied by the plurality of applications are not deleted by the mobile phone, the plurality of applications simultaneously occupy the resources such as the memory in the background, and the plurality of applications are required to interact with the user at the same time in the foreground. For example, the mobile phone successively starts a music application, a gallery application, and an instant messaging application, and simultaneously runs the three applications. In this case, the multi-task interface includes a page corresponding to the music application, a page corresponding to the gallery application, and a page corresponding to the instant messaging application. The user may trigger one of the pages on the multi-task interface to switch to an interface of an application corresponding to the page.

During use of an application, if the user switches to another application or a desktop to perform an operation, the electronic device may retain the previously used application as a background application in a multi-task queue. When a plurality of applications are simultaneously run, the mobile phone may generate, based on the plurality of applications in the multi-task queue, a page corresponding to each of the applications.

In some embodiments, an application corresponding to a page on the multi-task interface is an application that has been started by the mobile phone. The user may restart the application based on the page corresponding to the application on the multi-task interface.

In some application scenarios, the mobile phone displays the multi-task interface after detecting an operation that is indicated by the user and that is of opening the multi-task interface. The multi-task interface includes one or more pages in the mobile phone. By using a page on the multi-task interface, the mobile phone may quickly enter an application corresponding to the page, and display a user interface of the application. For example, the user may directly enter a main interface (or an interface (a non-payment code interface) displayed when a payment application is exited last time) of the payment application from a news browsing application by using the multi-task interface, and then performs a series of operations to enter a payment code interface.

An embodiment of this application provides a method for displaying an application interface of application software. In the foregoing application scenario, the user may directly switch from the multi-task interface to the payment code interface of the payment application. This simplifies user operations. Specifically, the electronic device 100 may add a shortcut control for any application interface of application software, to establish an association relationship between the shortcut control and the application interface. The user may quickly access the application interface corresponding to the shortcut control by triggering the shortcut control. In this application, the user can quickly open a specific interface or enable a specific function of an application. Therefore, access efficiency is improved. The application interface herein includes any interface of the application software in a running process.

When the electronic device 100 runs an application, a task is started. A task includes one or more activities. The activity is an application component configured to implement interaction between the electronic device 100 and the user. One activity provides one application interface. The electronic device 100 may make a response based on an event triggered by the user on the application interface. In this application, the electronic device 100 establishes an association relationship between a shortcut control and an application interface. By triggering the shortcut control, the electronic device 100 may be switched from a current activity to an activity associated with the shortcut control. Therefore, a quick switch between application interfaces is implemented.

Figure 1B:
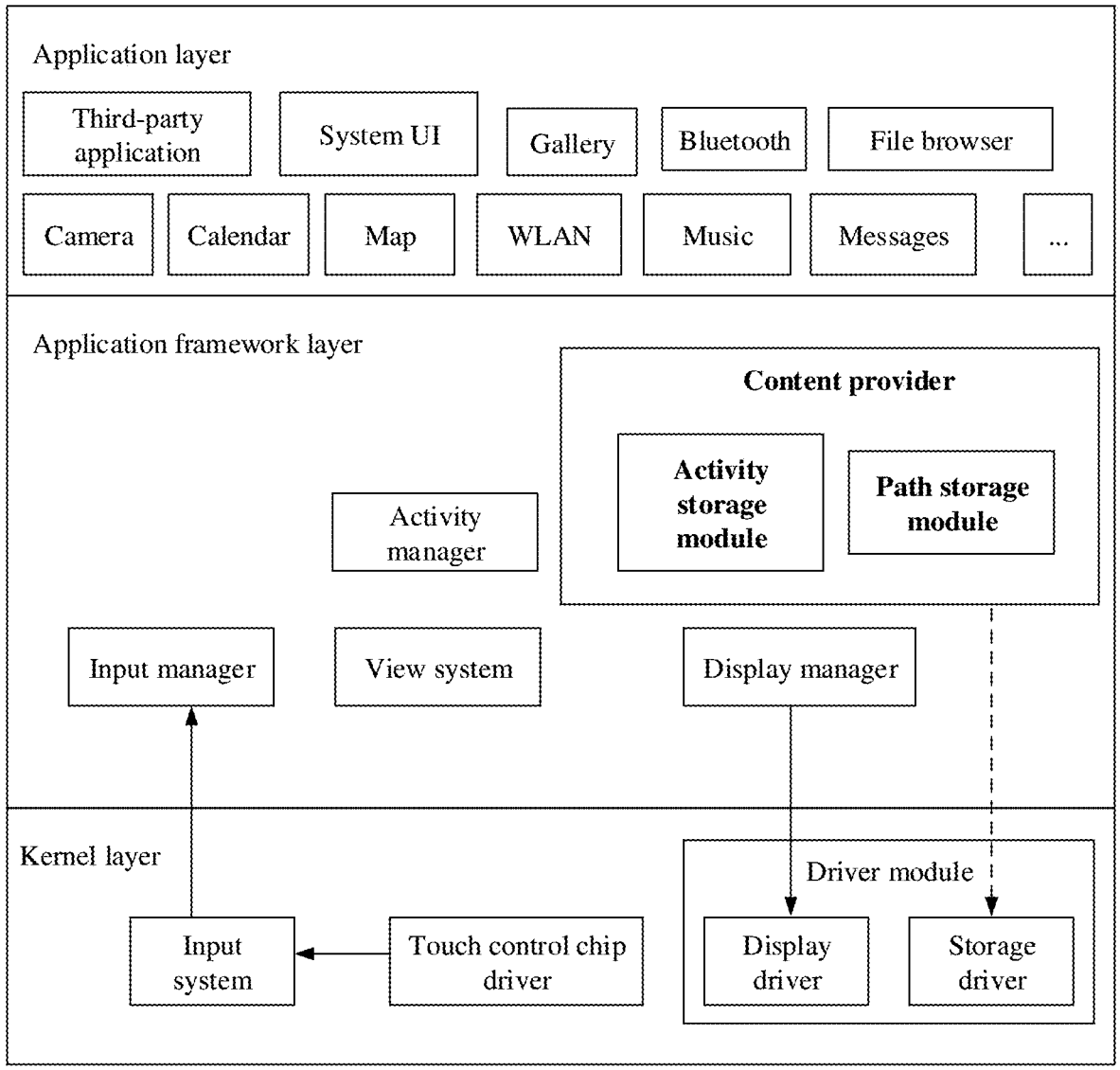
FIG. 1B is a schematic diagram of a software architecture of an electronic device according to an embodiment of this application.

FIG. 1B is a block diagram of a software structure of the electronic device 100 according to an embodiment of this application.

In a layered architecture, software is divided into several layers, and each layer has a clear role and task. The layers communicate with each other through a software interface. In some embodiments, an Android system is divided into the following five layers from top to bottom: an application layer, an application framework layer, an Android runtime, a system library (not shown in FIG. 1B), and a hardware abstraction layer (HAL) (not shown in FIG. 1B), and a kernel layer.

The application layer may include a series of application packages.

As shown in FIG. 1B, the application packages may include applications such as Camera, Gallery, Calendar, Calls, Map, Navigation, WLAN, Bluetooth, Music, Videos, Games, Shopping, Travel, Instant Messaging (such as Messages), and the like. In addition, the application packages may further include system applications such as a home screen (namely, a desktop), a leftmost screen, a control center, a notification center, and the like.

The application framework layer provides an application programming interface (API) and a programming framework for an application at the application layer. The application framework layer includes some predefined functions.

As shown in FIG. 1B, the application framework layer may include an input manager, a window manager, a content provider, a view system, a phone manager, a resource manager, a notification manager, a display manager, an activity manager, and the like. For ease of description, in FIG. 1B, an application framework layer that includes an input manager, a window manager, a content provider, a view system, and an activity manager is used as an example for illustration. It should be noted that any two of the input manager, window manager, content provider, view system, and activity manager may invoke each other.

The input manager is configured to receive an instruction or a request from a lower layer such as the kernel layer or the hardware abstraction layer.

The window manager is configured to manage a window program. The window manager may obtain a size of a display, determine whether a status bar exists, perform screen locking, take a screenshot, and the like. In this application, the window manager is configured to: when the electronic device 100 meets a preset trigger condition, display a window that includes one or more shortcut controls.

Figure 1C:
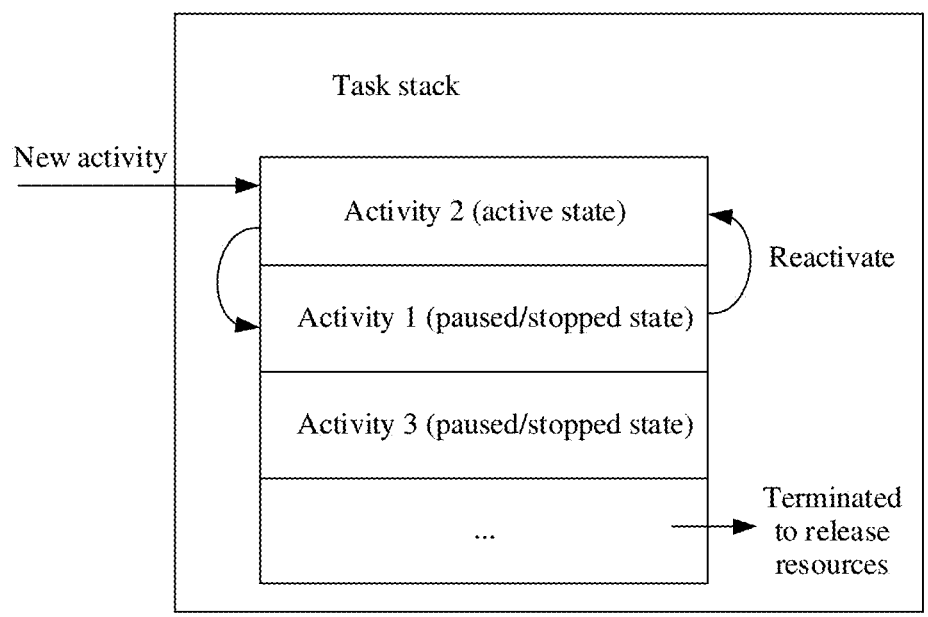
FIG. 1C is a schematic principle diagram of an interface display method according to an embodiment of this application.

The activity manager is configured to manage activities that are running in a system, including information about a process, an application, a service, a task, and the like. In this application, the activity manager starts a task stack each time an application is run. A task stack includes one or more activities. For example, the electronic device 100 runs an application, and starts a task stack of the application. When a new activity (an activity 1) is created, the new activity is displayed at the forefront of the display 194 and is located at the top of the task stack (the top of an activity stack). In this case, the activity 1 is visible and is in an active (active/running) state in which interaction with a user can be implemented. As shown in FIG. 1C, when the electronic device 100 receives a user operation, a new application interface needs to be displayed. When a new activity (an activity 2) is started and pushed into the task stack, the activity 1 that is originally located at the top of the task stack is pushed down to a second layer of the task stack, and the activity 2 is placed at the top of the task stack. In this case, the activity 2 is in an active state. If the activity 2 is an application interface that is not displayed in full screen or is a transparent application interface, in other words, the activity 2 does not fully cover the activity 1, the activity 1 is in a paused state, the activity 1 is still connected to the window manager, and all data of the activity 1 is visible on the display 194. However, interaction with the user cannot be performed. When the system memory of the electronic device 100 is inadequate, the activity 1 is forcibly terminated (killed). If the activity 2 fully covers the activity 1, the activity 1 is in a stopped state, and all data of the activity 1 is retained but is invisible on the display 194. When the system memory of the electronic device 100 is inadequate, an activity in the stopped state is terminated prior to an activity in the paused state. An activity in a terminated state cannot be reactivated. It should be noted that when an application is closed, all activities in a task stack of the application are also terminated.

For example, the electronic device 100 displays a first interface of a first application, and an activity 10 corresponding to the first interface is in an active state and is located at the top of a task stack. After the electronic device 100 detects an operation that is indicated by the user and that is of opening a multi-task interface, the electronic device 100 displays the multi-task interface. In this case, an activity 11 corresponding to the multi-task interface is in an active state and is located at the top of the task stack. The activity 10 that is originally located at the top of the task stack is pushed down to a second layer of the task stack. The multi-task interface includes one or more pages, and each of the one or more pages is associated with an activity. For example, the multi-task interface includes a page corresponding to the first interface, and the page is associated with the activity 10.

In some embodiments, the page corresponding to the activity 10 is currently in a paused/stopped state. In this case, if the user triggers the page, the activity manager reactivates the activity 10 and places the activity 10 on the top of the task stack. The display 194 displays the first interface. In some embodiments, the page corresponding to the activity 10 is in a terminated state. In this case, if the user triggers the page, the electronic device 100 restarts the first application corresponding to the page and displays a homepage interface of the first application. The activity manager creates a new activity (an activity of the homepage interface) and places the activity on the top of the task stack. The display 194 displays the homepage interface.

In this embodiment of this application, if the user wants to create a shortcut to an application interface such as a payment code interface, after receiving a user operation on the payment code interface, the electronic device 100 creates a shortcut control associated with an activity of the payment code interface in response to the user operation. Optionally, the electronic device 100 protects the activity from being terminated. When the electronic device 100 displays another application interface, such as a news browsing interface, the user may trigger the shortcut control of the payment code interface. In response to the user operation, the activity manager reactivates the activity and places the activity on the top of the task stack. In this case, the display 194 of the electronic device 100 displays the payment code interface.

The content provider is configured to store and obtain data, and enable the data to be accessed by an application. The data may include a video, an image, audio, calls that are made and received, a browsing history and a bookmark, a phone book, and the like.

In this application, the content provider includes a display activity storage module and a path storage module.

The activity storage module is configured to store a correspondence between a shortcut control and an activity. If the user wants to create a shortcut control for an application interface, the electronic device 100 creates, after receiving a user operation on the application interface, a shortcut control corresponding to an activity of the application interface in response to the user operation. When the electronic device detects a user operation on the shortcut control, the electronic device 100 activates, in response to the user operation, the activity corresponding to the shortcut control based on a correspondence in the activity storage module, and displays the application interface.

In some embodiments, after an application is closed, all activities in the application are also terminated. In this case, a correspondence between a shortcut control and each of the activities becomes invalid. In other words, the shortcut control becomes invalid. The user cannot invoke the activity of the application by using the shortcut control. Optionally, an invalid shortcut control is not displayed on the display 194.

The path storage module is configured to store a path associated with each shortcut control. The electronic device 100 may display a corresponding application interface based on the path. Data in the path storage module does not become invalid as an activity is terminated.

The path is a directory path through which the electronic device 100 reaches an application interface, which may be a relative path or an absolute path. The relative path describes a path relationship, that is, a location of a file relative to a directory where the file is located. For example, a directory of "Chat list" is "E:\Instant messaging software\Chat list" and a directory of a "Lisa" dialog box is "E:\Instant messaging software\Chat list\Lisa". In a relative sense, the "Lisa" dialog box is located in a "Chat list" subdirectory in the directory where the "Lisa" dialog box is located. In this case, a statement used to reference the "Lisa" dialog box is "..\Chat List\Lisa". The absolute path is a full path of a file, which includes a domain name. The absolute path is a path where the file really exists on a hard disk. For example, if the "Lisa" dialog box is stored in the "E:\Instant messaging software\Chat list\Lisa" directory on a hard disk, the absolute path of the "Lisa" dialog box is "E:\Instant messaging software\Chat list\Lisa".

The electronic device 100 records a directory path from where application software is run to where a current application interface is accessed. When detecting a user operation of creating a shortcut control for the current application interface, the electronic device 100 records a directory path of the current application interface. When the user taps the shortcut control, the electronic device 100 is redirected to the corresponding application interface based on the directory path in the path storage module.

Optionally, the path may be a user operation path through which the electronic device 100 reaches the application interface. The electronic device 100 records operations performed by the user from when application software is run to when a current application interface is accessed. When the user manually adds a frequently used function or a frequently used function is automatically recorded based on user behavior, coordinates of the user on the display 194 are recorded. When the user taps the shortcut control, the electronic device 100 simulates user operations in the background to execute the user operation path, and displays the corresponding application interface.

In some embodiments, if the user triggers a shortcut control in a running process of an application, the electronic device 100 may invoke an activity to display a corresponding user interface. If the application is closed and rerun, an activity associated with the shortcut control has been terminated. In this case, if the user triggers the shortcut control, the electronic device wo may invoke a path to display the corresponding user interface.

The view system includes a visual control, such as a text display control, an image display control, or the like. The view system may be configured to construct an application. A display interface may include one or more views. For example, a display interface includes an SMS message notification icon, and may include a text display view and an image display view. In this application, the view system is configured to: when the electronic device 100 meets a preset trigger condition, display a shortcut area on the display 103. The shortcut area includes one or more shortcut controls added by the electronic device 100. A position and a layout of the shortcut area, and an icon, a position, a layout, and a function of a control in the shortcut area are not limited in this application.

The display manager is configured to transmit display content to the kernel layer.

The phone manager is configured to provide a communications function for the electronic device 100, for example, management of a call status (including answering, declining, or the like).

The resource manager provides, for an application, various resources such as a localized character string, an icon, an image, a layout file, a video file, and the like.

The notification manager enables an application to display notification information in the status bar, and may be configured to transmit a notification-type message. The displayed notification information may automatically disappear after a short pause without user interaction. For example, the notification manager is configured to notify download completion, provide a message notification, and the like. The notification manager may alternatively display a notification in a top status bar of the system in a form of a graph or scrollable text, for example, a notification of an application running in the background or a notification that appears on the display in a form of a dialog box. For example, text information is displayed in the status bar, a prompt tone is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), a 2D graphics engine (such as SGL), and the like.

The surface manager is configured to manage a display subsystem and provide fusion of 2D and 3D layers for a plurality of applications.

The media library supports static image files, playback and recording of a plurality of frequently used audio and video formats, and the like. The media library may support a plurality of audio and video coding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstraction layer HAL is an interface layer between operating system software and hardware components, and provides an interface for interaction between upper-layer software and lower-layer hardware. The HAL layer abstracts bottom-layer hardware as software that includes a corresponding hardware interface. A bottom-layer hardware device may be configured by accessing the HAL layer. For example, a related hardware component may be enabled or disabled at the HAL layer. In some embodiments, a core architecture of the HAL layer is implemented in at least one of C++ or C.

The kernel layer is a layer between hardware and software. The kernel layer includes at least a display driver, a camera driver, an audio driver, a sensor driver, a touch control chip driver, an input system, and the like. For ease of description, in FIG. 1B, a kernel layer that includes an input system, a driver of a touch control chip, a display driver, and a storage driver is used as an example for illustration. Both the display driver and the storage driver may be disposed in a driver module.

It may be understood that the structure shown in this application does not constitute a limitation on the electronic device 100. In some other embodiments, the electronic device 100 may include more or fewer components than those shown in the figure, combine some components, split some components, or have different component arrangements. The components shown in the figure may be implemented by using hardware, software, or a combination of software and hardware.

The following describes a workflow of software and hardware of the electronic device 100 by using an example scenario in which the electronic device 100 creates a shortcut control for an application interface 1 and quickly enters the application interface 1 from an application interface 2 based on the shortcut control.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event.

For example, the touch operation is a touch tap operation, and a control corresponding to the tap operation is a control that is used for creating a shortcut control for the application interface 1. When the touch sensor 180K of the electronic device 100 identifies the tap operation on the control that is used for creating the shortcut control for the application interface 1, the activity storage module obtains an activity corresponding to the application interface 1, and stores a correspondence between the shortcut control and the activity. Optionally, the path storage module obtains and stores a directory path (or a user operation path) from running application software to accessing the application interface 1, and stores a correspondence between the shortcut control and the directory path (or the user operation path).

When the electronic device 100 accesses the application interface 2, the touch sensor 180K identifies a tap operation on the shortcut control for the application interface 1. The content provider obtains, from the activity storage module, the activity corresponding to the shortcut control, and invokes the activity manager to place the activity on the top of a task stack. The display manager transmits a request to the display driver at the kernel layer, where the request is used to display the application interface 1 corresponding to the activity. Then, the display driver drives a GPU 105 and the display 194 to display the application interface 1. Optionally, the content provider obtains, from the path storage module, the directory path (or the user operation path) corresponding to the shortcut control. The display manager transmits a request to the display driver at the kernel layer, where the request is used to display the application interface 1 corresponding to the directory path (or the user operation path). Then, the display driver drives the GPU 105 and the display 194 to display the application interface 1.

In some embodiments, when a preset condition is met, the electronic device 100 records the directory path of the application interface 1 and creates a shortcut control for a current application interface. The preset condition is that the application interface 1 is accessed for more than a preset quantity of times, the application interface 1 is accessed for more than a preset quantity of times within a preset time period, stay duration of the application interface 1 is greater than a preset time period, or the like.

With reference to an application scenario, the following describes how a method for quickly entering an application interface provided in this application is implemented on a display interface of the electronic device 100.

In an application scenario, when a user chats with another person by using instant messaging software of the electronic device 100, the user wants to switch to another page of the instant messaging software, for example, to a payment code interface to make a payment. If the user wants to return to the chat interface after completing the payment, the user may first exit the payment code interface, and then search a chat list for a chat box used for chatting with the specific person, so as to enter the chat interface for the person. However, the user operations are complex. In this case, when chatting with the another person, the user may add a shortcut control for the current chat interface, and the electronic device 100 establishes an association relationship between the shortcut control and the chat interface. After the user completes the payment on the payment code interface, the user may quickly switch from the payment code interface to the chat interface by using the shortcut control, without performing complex operation steps. This simplifies an operation process of accessing an application interface, and improves access efficiency of the application interface.

UI embodiments shown in FIG. 2A to FIG. 2G provide an example operation process in which the electronic device 100 quickly enters a corresponding application interface from a multi-task interface to by adding a shortcut control.

Figure 2A:
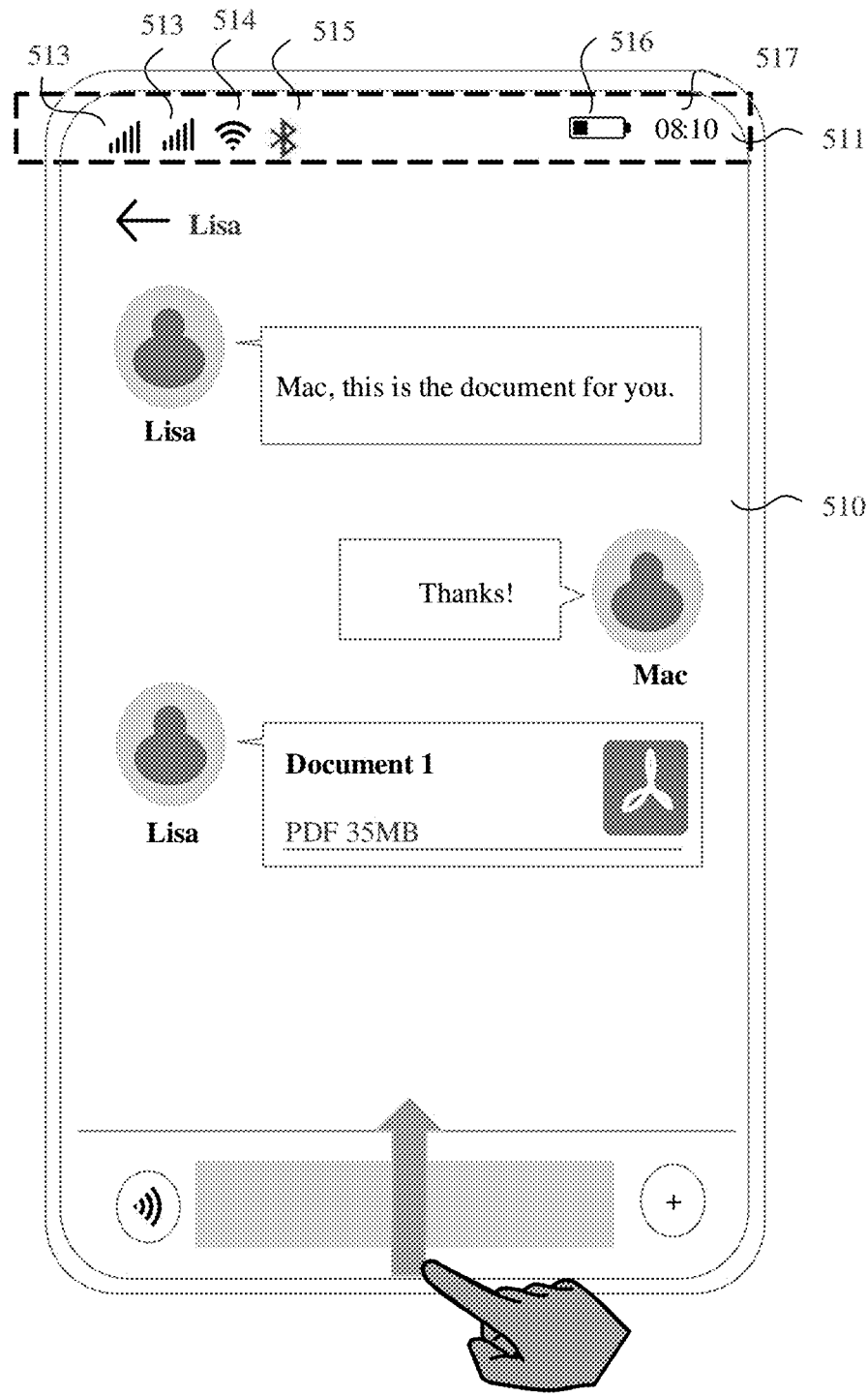
FIG. 2A to FIG. 2K are schematic diagrams of a group of application interfaces according to an embodiment of this application.

FIG. 2A shows an example user interface 510 on the electronic device 100. The user interface 510 may be a chat interface in instant messaging software, and may include a status bar 511 and a chat box. The status bar 201 may include one or more signal strength indicators 513 of a mobile communications signal (which may also be referred to as a cellular signal), one or more signal strength indicators 514 of a wireless fidelity (Wi-Fi) signal, a Bluetooth indicator 515, a battery status indicator 516, and a time indicator 517. If a Bluetooth module of the electronic device 100 is enabled (in other words, the electronic device supplies power to the Bluetooth module), the Bluetooth indicator 515 is displayed on the display interface of the electronic device 100.

After detecting a user operation that indicates opening of the multi-task interface, the electronic device 100 displays the multi-task interface. The multi-task interface includes pages corresponding to a plurality of applications that are running on the electronic device 100. Various user operations may be performed to indicate the opening of the multi-task interface. For example, the user operation may be that a physical button is triggered, a virtual button is triggered, or a gesture is drawn. In this embodiment of this application, the user interface 510 is merely an example interface. The electronic device 100 may alternatively open the multi-task interface on another interface.

Figure 2B:
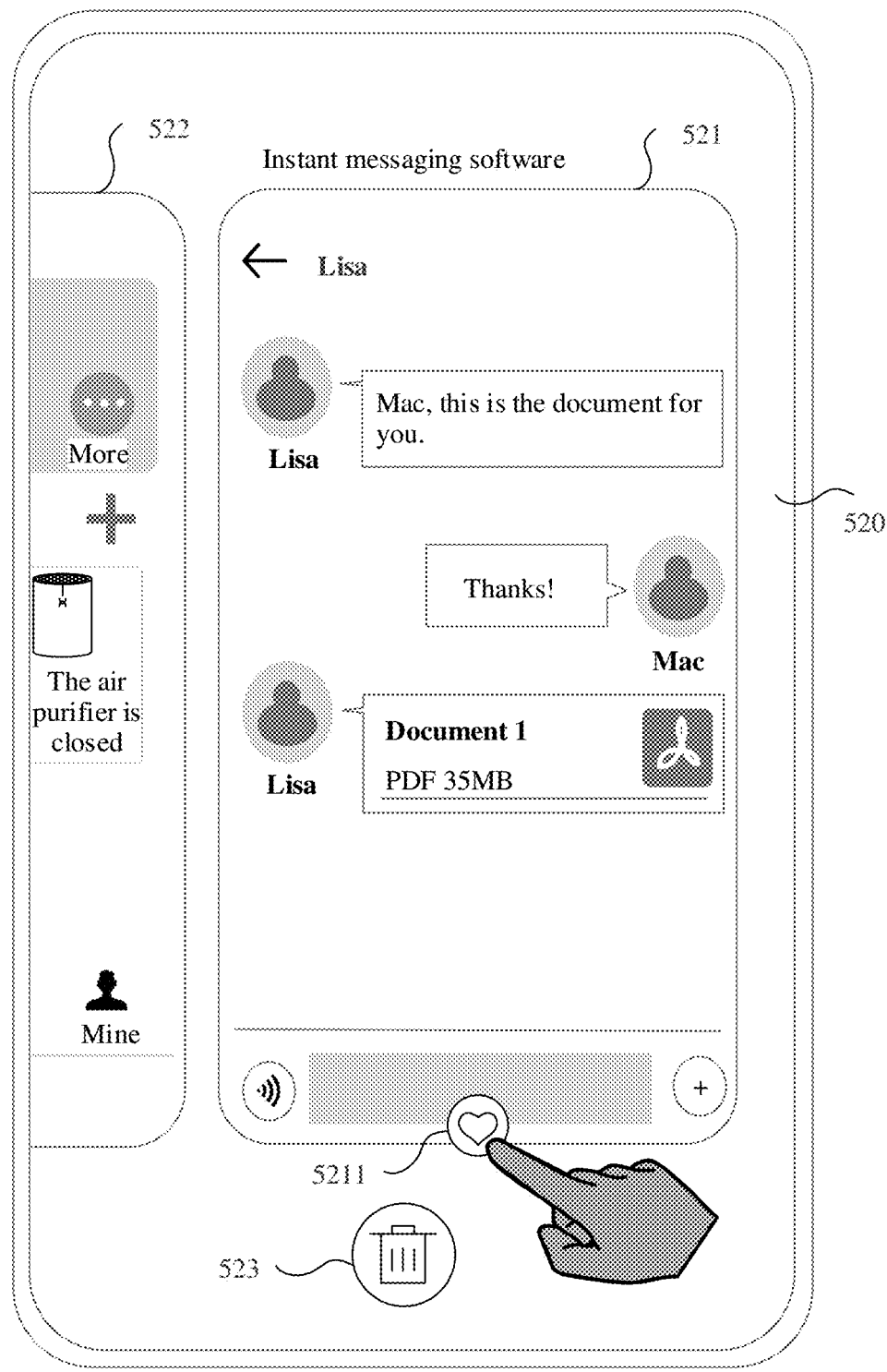

For example, when the electronic device 100 detects an upward sliding operation at the bottom of the electronic device 100, the electronic device 100 displays a multi-task interface 520 in response to the operation, as shown in FIG. 2B.

The multi-task interface 520 includes one or more pages that are horizontally arranged in parallel based on a preset sequence policy. Optionally, in a sequence policy, the electronic device 100 arranges pages corresponding to different applications based on a time sequence of running the applications. For example, a page corresponding to an application that is most recently run is arranged on the rightmost, and a page corresponding to an application that is previously run is arranged on the left in sequence. The user may slide left and right on the multi-task interface 520 to switch between pages for display. For example, when the electronic device 100 detects a rightward sliding operation on the multi-task interface 520, the pages on the multi-task interface 520 sequentially move rightward in response to the operation. When the electronic device 100 detects a leftward sliding operation on the multi-task interface 520, the pages on the multi-task interface 520 sequentially move leftward in response to the operation.

As shown in FIG. 2B, the multi-task interface 520 may include a page 521, a page 522, and a delete icon 523. The page 521 is fully displayed, and the page 522 is partially displayed. The page 521 corresponding to the application that is most recently run is arranged on the rightmost, and the page 522 corresponding to the application that is previously run is arranged on the left. Optionally, display content of the page 521 is a page last displayed (namely, a page displayed on the user interface 510) when the application runs in the foreground. Optionally, the page 521 is associated with the user interface 510. When the electronic device 100 detects a user operation on the page 521, the electronic device 100 displays the user interface 510 associated with the page 521, as shown in FIG. 2A.

The delete icon 523 may be used to close applications corresponding to all pages on the current multi-task interface 520. When the electronic device receives a user operation on the delete icon 523, the electronic device deletes all the pages on the multi-task interface 520 in response to the user operation. In some embodiments, the delete icon 523 may be used to close an application corresponding to a page that is fully displayed on the current multi-task interface 520.

The multi-task interface 520 further includes an icon 5211. If the user wants to quickly enter the user interface 510 from another interface, the user may trigger the icon 5211 in a manner such as tapping after entering the multi-task interface 520. When the electronic device 100 detects a user operation on the icon 5211, the electronic device 100 adds a shortcut control for the user interface 510 in response to the user operation, and establishes an association relationship between the shortcut control and the user interface 510. The user may use the shortcut control to quickly switch from the another interface to the user interface 510.

Figure 2C:
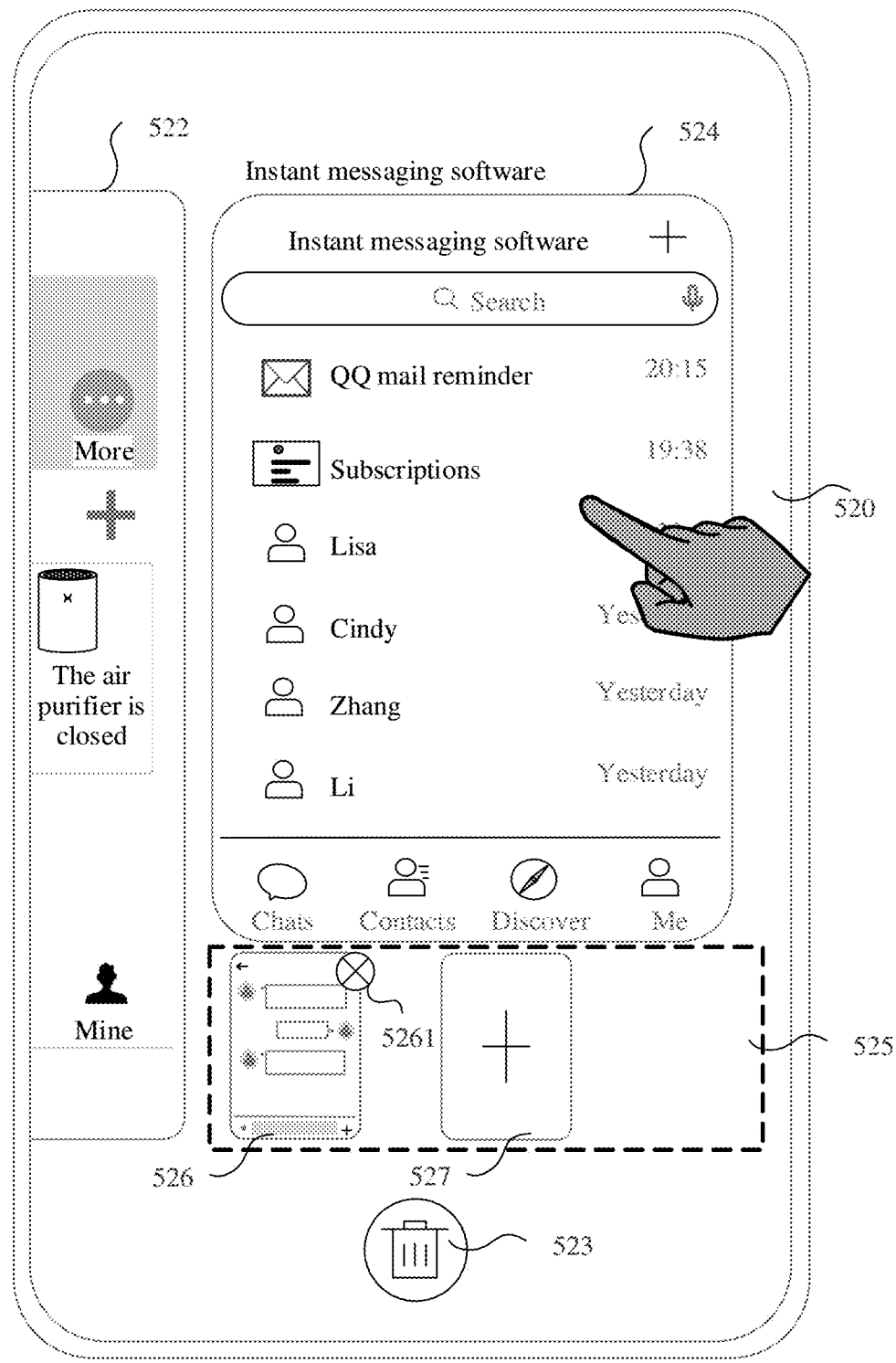

For example, when the electronic device 100 detects the user operation on the icon 5211, the electronic device 100 displays an application interface shown in FIG. 2C. As shown in FIG. 2C, the multi-task interface 520 in FIG. 2C includes a control area 525. The control area 525 includes one or more controls, such as controls 526 and 527. The control 526 is a shortcut control for the user interface 510. The control 527 is configured to add a new shortcut control. Optionally, display content of the control 526 is a thumbnail of the user interface 510. Alternatively, the display content of the control 526 is associated with the user interface 510. When the electronic device 100 detects a user operation on the control 526, the electronic device 100 displays the user interface 510 in response to the user operation, as shown in FIG. 2A.

Optionally, the control 526 further includes a control 5261. The control 5261 is configured to delete the control 526. When the electronic device 100 detects a user operation on the control 5261, the electronic device 100 deletes the control 526 in response to the user operation. Then, the control area 525 does not include the control 526.

The multi-task interface 520 in FIG. 2C includes a page 524, where the page 524 and the page 521 in FIG. 2B belong to same application software (the instant messaging software). Optionally, display content of the page 524 may be a homepage of the application software. The homepage herein may be understood as a first page that is displayed when the application software is started. Optionally, the display content of the page 524 may be an upper-level page of the display content of the page 521.

When the electronic device 100 detects a user operation on the icon 5211, the electronic device 100 adds the control 526 in response to the user operation and switches from the page 521 to the page 524.

Figure 2D:
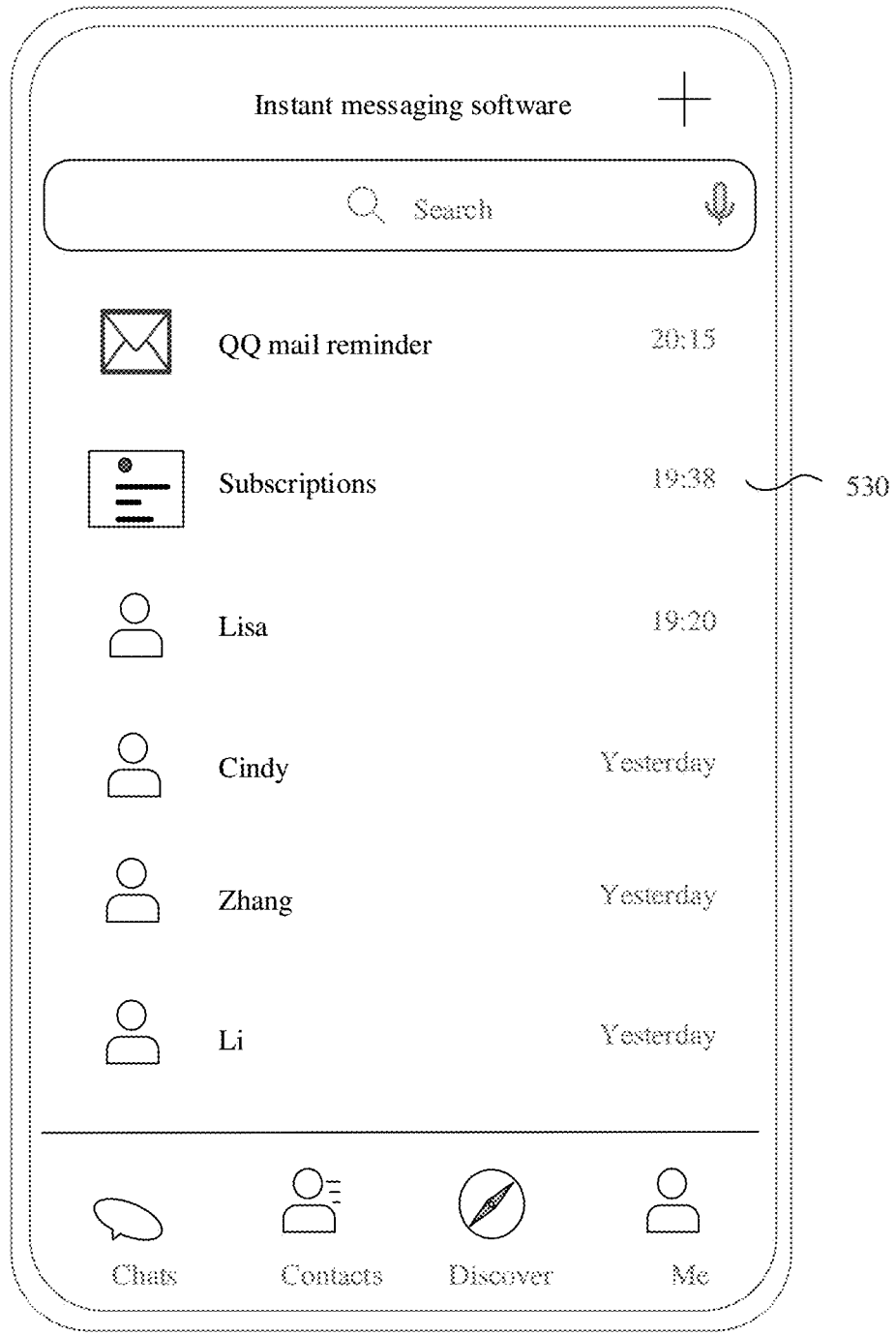

As shown in FIG. 2D, when the electronic device 100 detects a user operation on the page 524, the electronic device 100 displays an application interface 530 corresponding to the page 524 in response to the user operation.

In some embodiments, if the instant messaging software keeps running (running in the foreground or background), the control area 525 does not change. If the instant messaging software is closed, the control 526 added to the control area by the electronic device 100 is deleted accordingly. FIG. 2C is used as an example. When the electronic device receives a user operation (for example, sliding the page 524 upward) of closing the instant messaging software, the electronic device deletes the page 524 and the control area 525 from the multi-task interface 520 in response to the user operation. When the electronic device starts the instant messaging software next time and displays a page of the instant messaging software on the multi-task interface 520, the control area 525 does not include the control 526. Optionally, the multi-task interface 520 may include the control area 525, and the control area 525 may include the control 527.

In some embodiments, when the electronic device reruns the instant messaging software next time and displays a page of the instant messaging software on the multi-task interface 520, controls in the control area 525 remain the same. In other words, the control 526 is still valid.

In this application, FIG. 2A to FIG. 2D show a workflow of adding a shortcut control (the control 526) for the user interface 510. With reference to the foregoing embodiments, when the electronic device 100 enters another interface of the instant messaging software, the electronic device 100 may quickly return to the application interface 510 by using the shortcut control (the control 526). In addition, a shortcut control for another interface may also be added. For example, FIG. 2E to FIG. 2I show an example of this workflow.

Figure 2E:
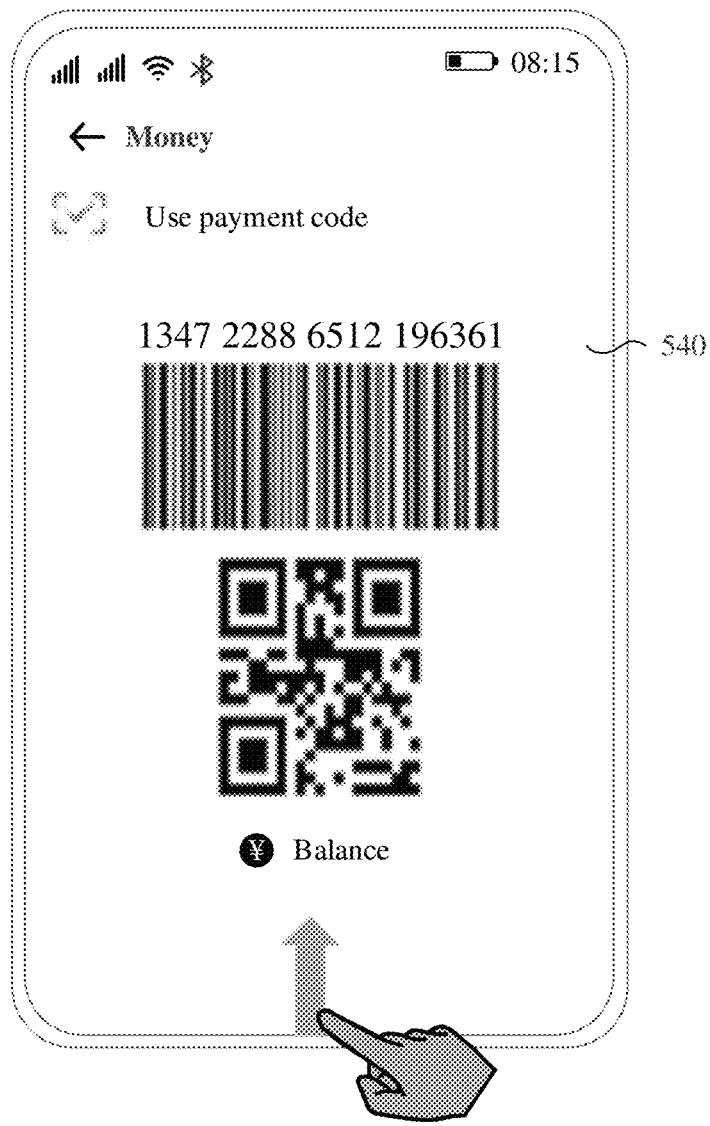
Figure 2F:
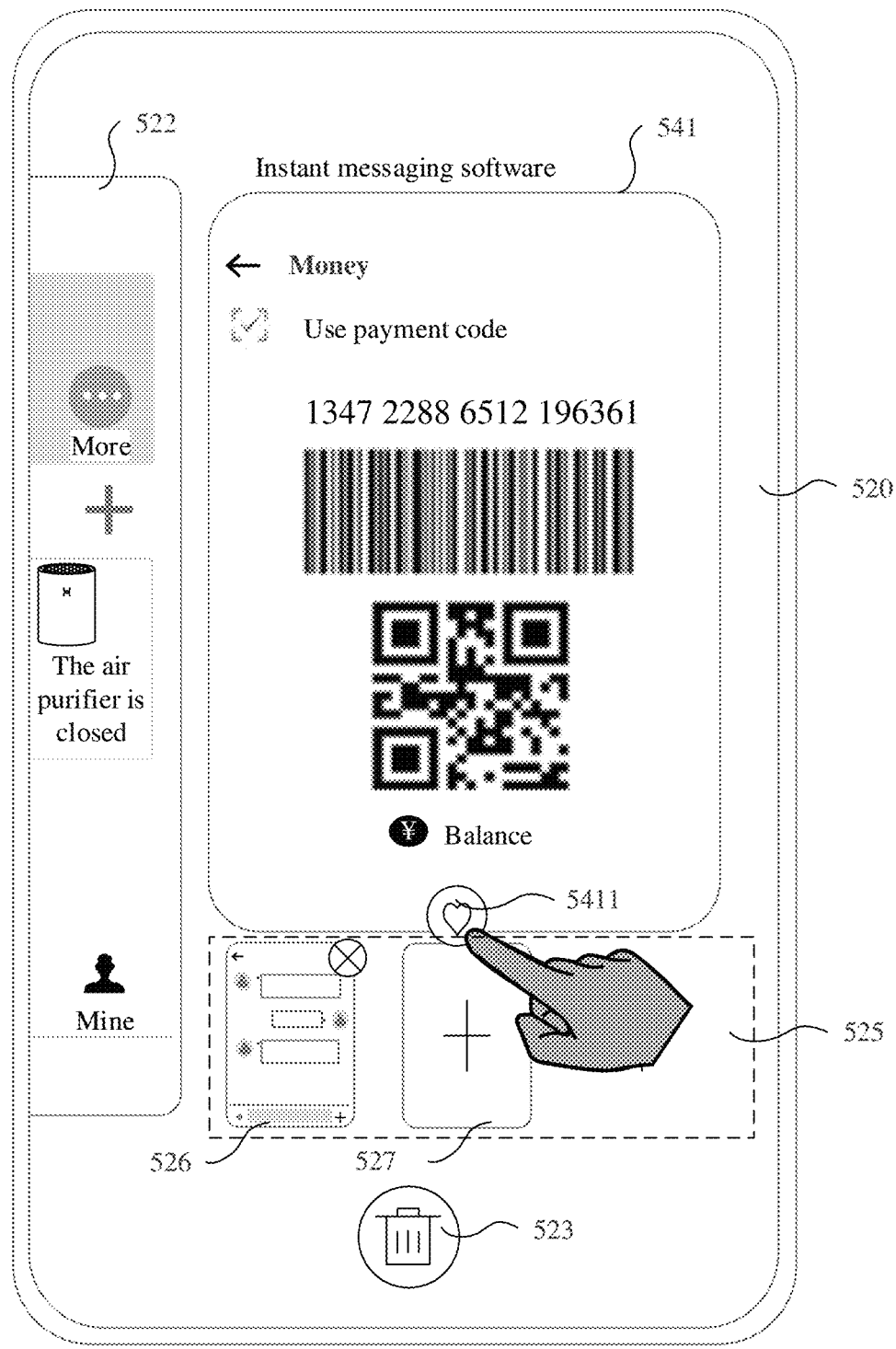

As shown in FIG. 2E, the electronic device 100 displays a payment code interface 540 of the instant messaging software. When the electronic device 100 detects an upward sliding operation at the bottom of the electronic device 100, the electronic device 100 displays the multi-task interface 520 in response to the operation, as shown in FIG. 2F. The multi-task interface 520 in FIG. 2F includes a page 541, and display content of the page 541 may be a thumbnail of the payment code interface 540. Optionally, the page 541 is associated with the user interface 540. When the electronic device 100 detects a user operation on the page 541, the electronic device 100 displays the user interface 540 associated with the page 541, as shown in FIG. 2E.

The page 541 displays an icon 5411. If the user wants to save the user interface 540 as a frequently used page, the user may trigger the icon 5411 in a manner such as tapping after entering the multi-task interface 520. When the electronic device 100 detects a user operation on the icon 5411, the electronic device 100 adds a shortcut control for the user interface 540 in response to the user operation, and establishes an association relationship between the shortcut control and the user interface 540. The user may use the shortcut control to quickly switch from another interface to the user interface 540.

Figure 2G:
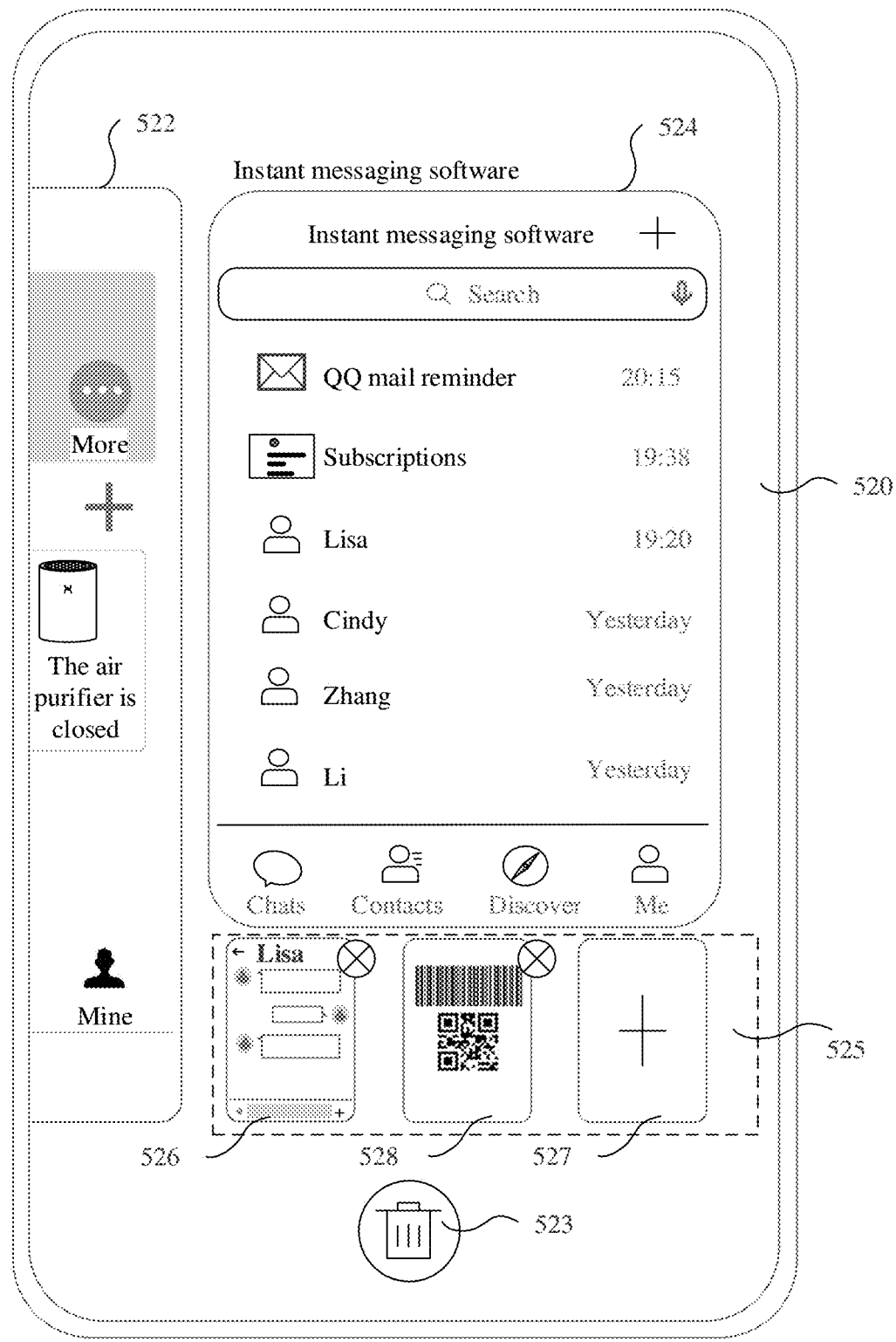

For example, when the electronic device 100 detects a user operation on the icon 5411, the electronic device displays an application interface shown in FIG. 2G. As shown in FIG. 2G, the multi-task interface 520 includes the control area 525. Compared to the control area 525 in FIG. 2C, the control area 525 in FIG. 2G further includes a control 528. The control 528 is a shortcut control for the user interface 540. Optionally, display content of the control 528 is a thumbnail of the payment code interface 540. Alternatively, the display content of the control 528 is associated with the payment code interface 540. When the electronic device 100 detects a user operation on the control 528, the electronic device 100 displays the payment code interface 540 in response to the user operation, as shown in FIG. 2E.

The multi-task interface 520 in FIG. 2G includes the page 524, where the page 524 and the page 541 in FIG. 2F belong to the same application software (the instant messaging software). Optionally, the display content of the page 524 may be the homepage of the application software. The homepage herein may be understood as the first page that is displayed when the application software is started. Optionally, the display content of the page 524 may be the upper-level page of the display content of the page 541.

When the electronic device 100 detects a user operation on the icon 5411, the electronic device 100 adds the control 528 to the control area 525 in response to the user operation, and switches from the page 541 to the page 524.

In some embodiments, in FIG. 2G, when the electronic device 100 detects a user operation on the control 526, the electronic device 100 displays the user interface 510 in response to the user operation, as shown in FIG. 2A.

Figure 2H:
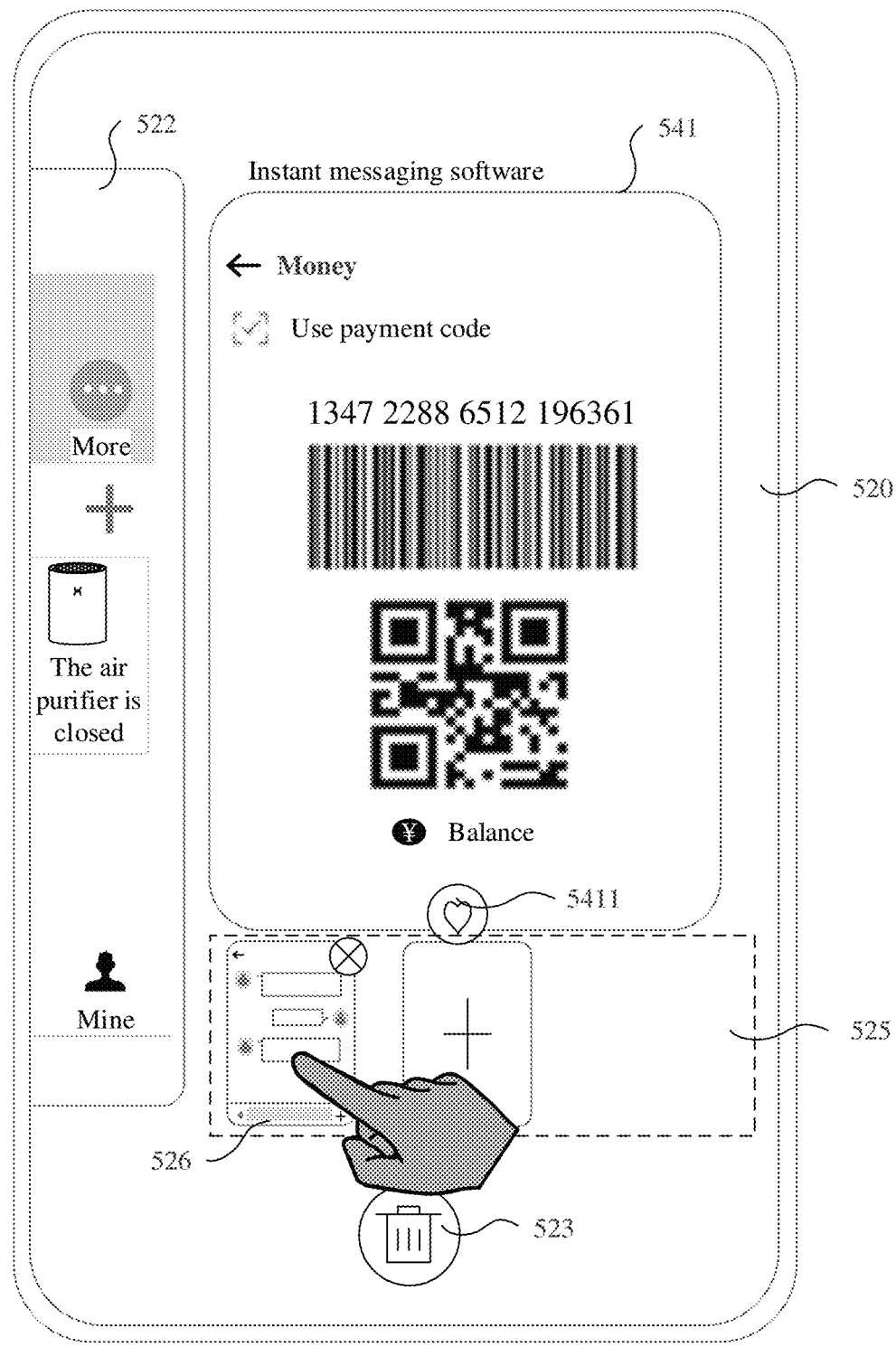
Figure 2I:
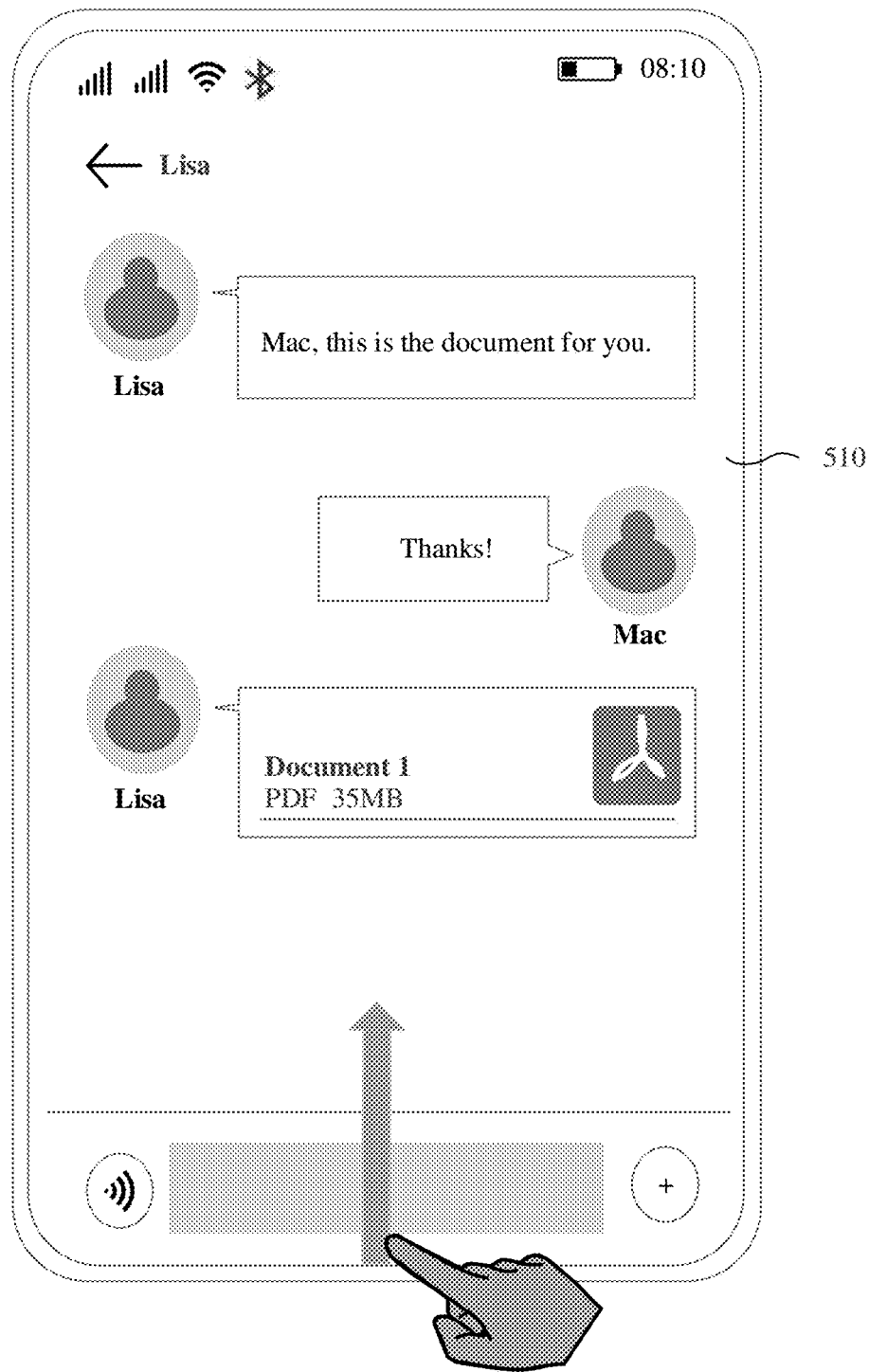

In some embodiments, in FIG. 2F, when the electronic device 100 detects a user operation on the control 526, the electronic device 100 displays the user interface 510 in response to the user operation, as shown in FIG. 2A. In this embodiment of this application, FIG. 2H and FIG. 2I show this step. If the user wants to quickly switch to the application page 510 when the electronic device 100 displays the user interface 540 shown in FIG. 2E, the user may first enter the multi-task interface 520 and triggers the control 526 in the control area 525, as shown in FIG. 2H. When the electronic device 100 detects the user operation on the control 526, the electronic device 100 displays the application interface 510, as shown in FIG. 2I. A display interface in FIG. 2H is the same as the display interface in FIG. 2F, and a display interface in FIG. 2I is the same as the display interface in FIG. 2A. Details are not described herein.

Figure 2J:
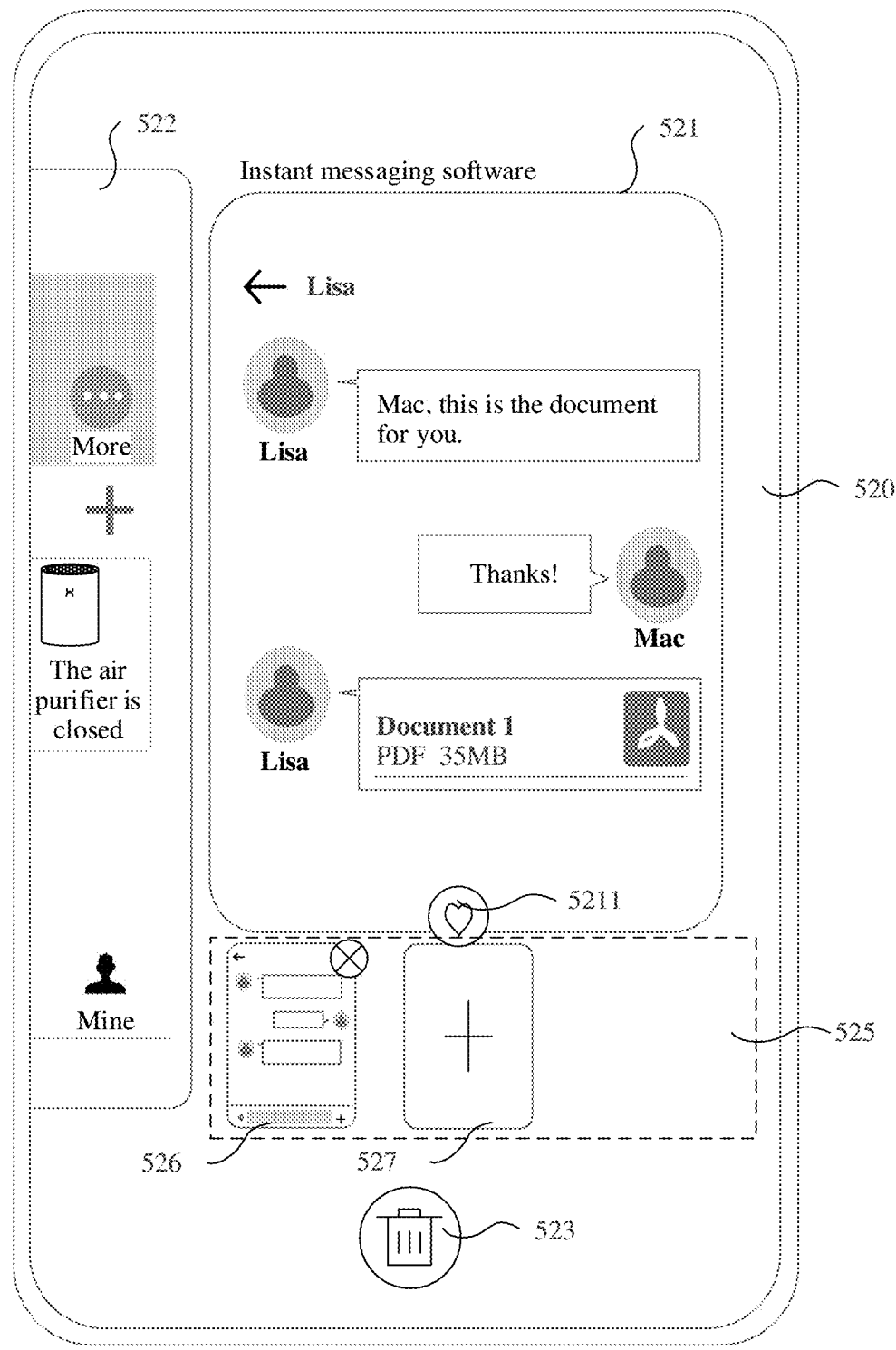

In some embodiments, when the electronic device 100 enters the multi-task interface again, the control area 525 includes a previously added control. For example, as shown in FIG. 2I, when the electronic device 100 detects an upward sliding operation at the bottom of the electronic device 100, the electronic device 100 displays the multi-task interface 520 shown in FIG. 2J in response to the operation. The multi-task interface 520 includes the page 521, and the control area 525 includes the control 526.

In some embodiments, the electronic device 100 may automatically add a display control to or remove a display control from the control area 525. For example, in FIG. 2I, the user interface 510 is displayed. When the electronic device 100 detects an upward sliding operation at the bottom of the electronic device 100, the electronic device 100 displays the multi-task interface 520 shown in FIG. 2K in response to the operation. The multi-task interface 520 includes the page 521, and the control area 525 includes the control 528 but not the control 526. When the electronic device 100 detects a user operation on the page 521, the electronic device 100 displays the application interface 510, and when the electronic device 100 detects a user operation on the control 526, the electronic device 100 also displays the application interface 510. Therefore, when the electronic device 100 identifies that a current interface is the multi-task interface entered from the application interface 510, the control 526 associated with the application interface 510 may not be displayed in the control area.

When the electronic device 100 detects a user operation on the control 528, the electronic device 100 displays a third page, as shown in FIG. 2E. The control 528 is a control automatically added by the electronic device 100. If the electronic device 100 has displayed the third page, the third page is a historical track interface. The electronic device 100 establishes a correspondence between the control 528 and the third page, and displays the control 528 in the control area 525. If the electronic device 100 has displayed the third page, and cumulative display time of the third page is greater than a first threshold, the third page is a historical track interface. The electronic device 100 establishes a correspondence between the control 528 and the third page, and displays the control 528 in the control area 525. If the electronic device 100 has displayed the third page, and a cumulative quantity of times of displaying the third page is greater than a second threshold, the third page is a historical track interface. The electronic device 100 establishes a correspondence between the control 528 and the third page, and displays the control 528 in the control area 525.

Optionally, the control area 525 may include the control 526 and the control 528.

In this application, when the electronic device 100 displays the third page, the control 526 may be triggered on the multi-task interface to quickly enter the third page. FIG. 2A to FIG. 2G show an operation process in which the electronic device 100 quickly switches between application interfaces of a same application by using the multi-task interface. For different applications, FIG. 3A to FIG. 3D show an example of quick switching between application interfaces of different applications.

Figure 3B:
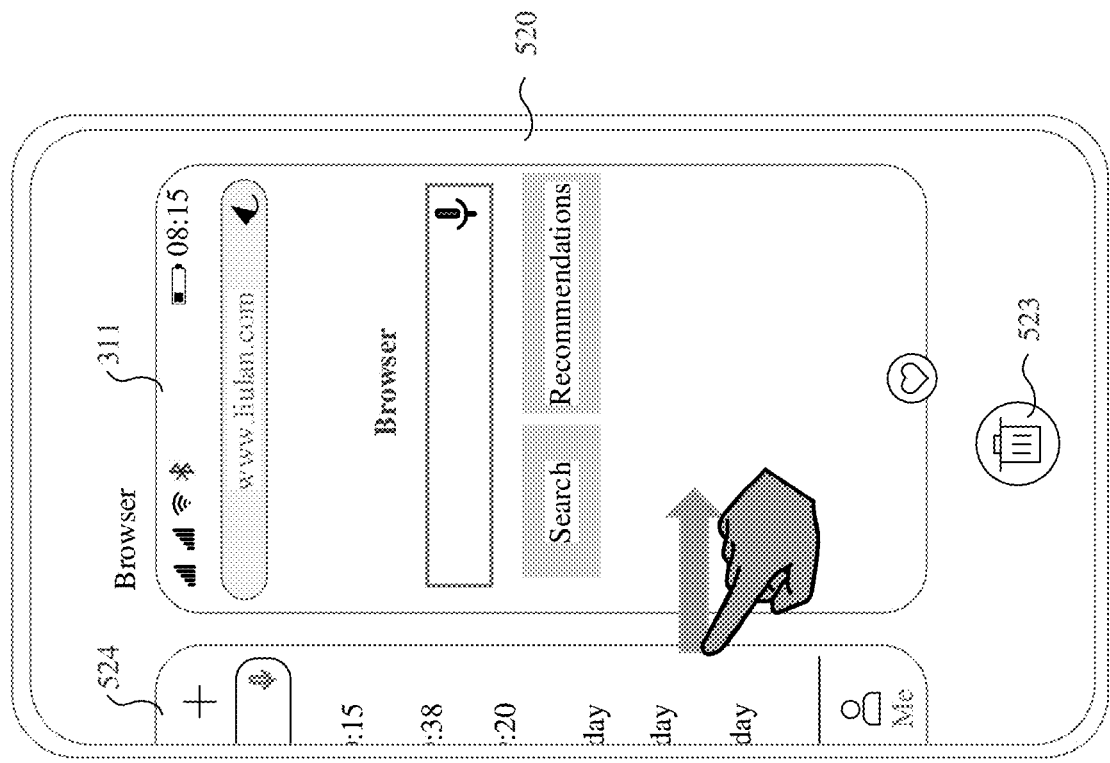
FIG. 3A to FIG. 3D are schematic diagrams of another group of application interfaces according to an embodiment of this application.
Figure 3A:
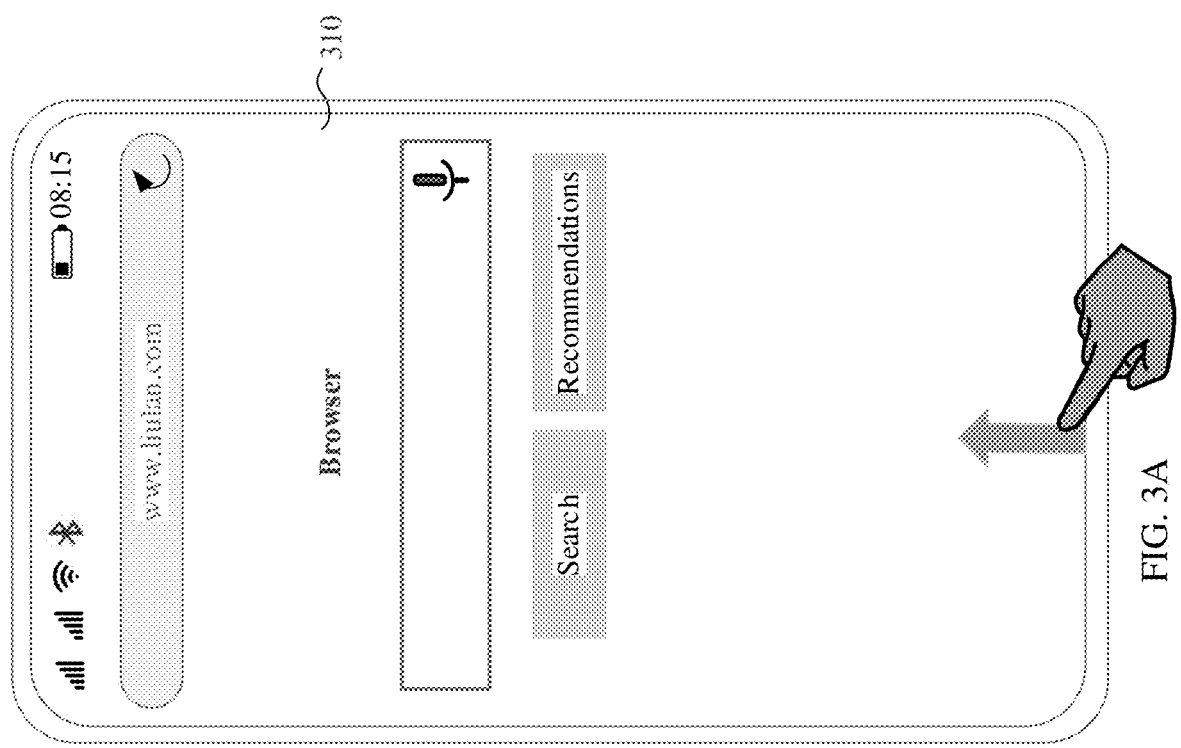

FIG. 3A shows an application interface 310 of a browser. When the user browses news by using the browser software, the electronic device 100 displays the application interface 310. If the user wants to switch to a chat interface of the instant messaging software, the user may use a multi-task interface to directly enter the chat interface. In FIG. 3A, when the electronic device 100 detects an upward sliding operation at the bottom of the electronic device 100, the electronic device 100 displays the multi-task interface 520 in response to the operation, as shown in FIG. 3B.

The multi-task interface 520 in FIG. 3B includes a page 311, the page 524, and the delete icon 523. The page 311 is fully displayed, and the page 524 is partially displayed. The page 311 corresponding to an application (the browser) that is most recently run is arranged on the rightmost, and the page 524 corresponding to the application (the instant messaging software) that is previously run is arranged on the left in sequence.

Figure 3C:
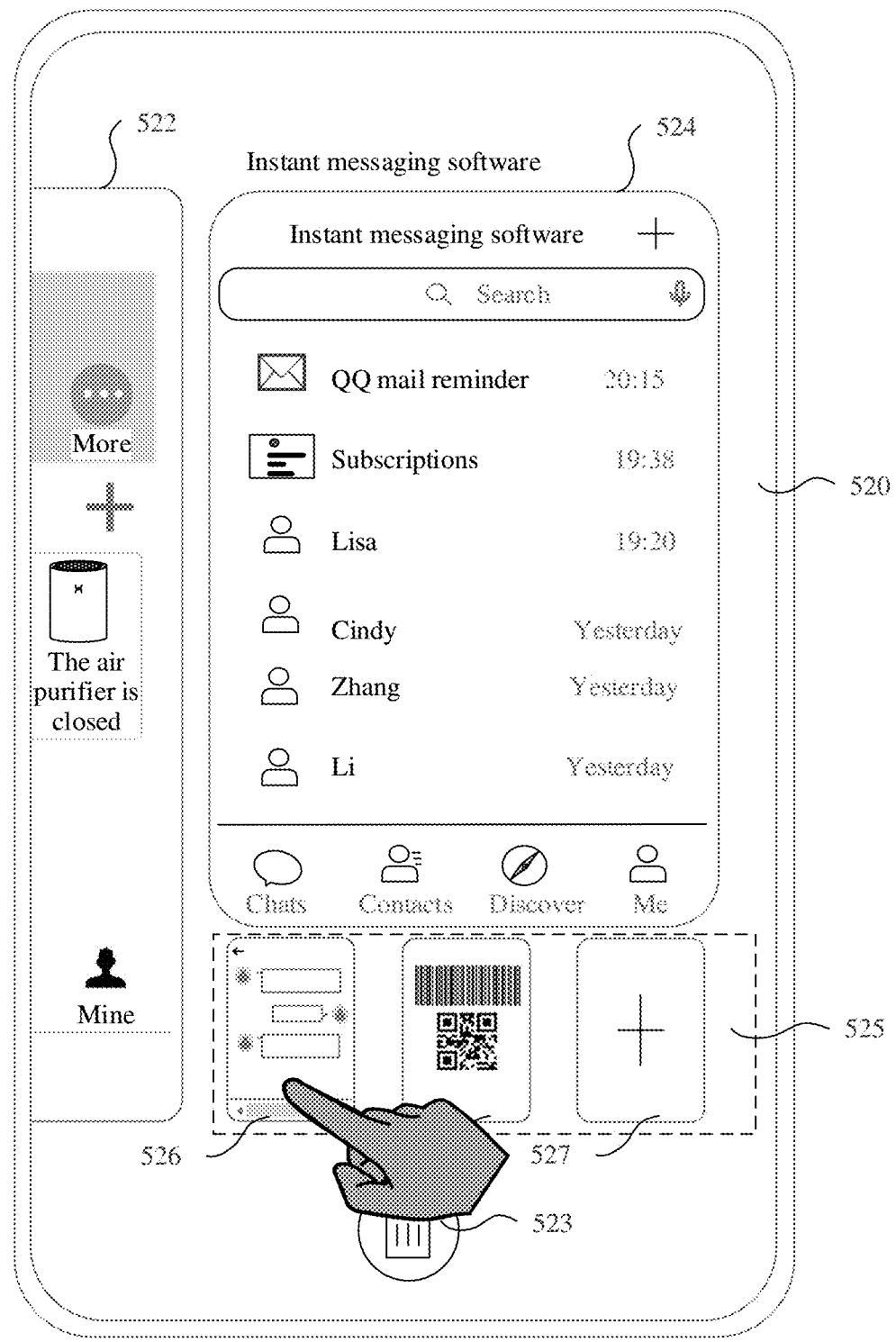

The user may slide left and right on the multi-task interface 520 to switch between pages for display. As shown in FIG. 3B, when the electronic device 100 detects a rightward sliding operation on the multi-task interface 520, pages on the multi-task interface 520 sequentially move rightward in response to the operation. In this case, the page 521 is fully displayed. As shown in FIG. 3C, a page 522 (partially displayed) is on the left side of the page 521, and the page 311 (not displayed) is on the right side of the page 524. For specific descriptions of FIG. 3C, refer to descriptions of FIG. 2G. Details are not described herein.

Figure 3D:
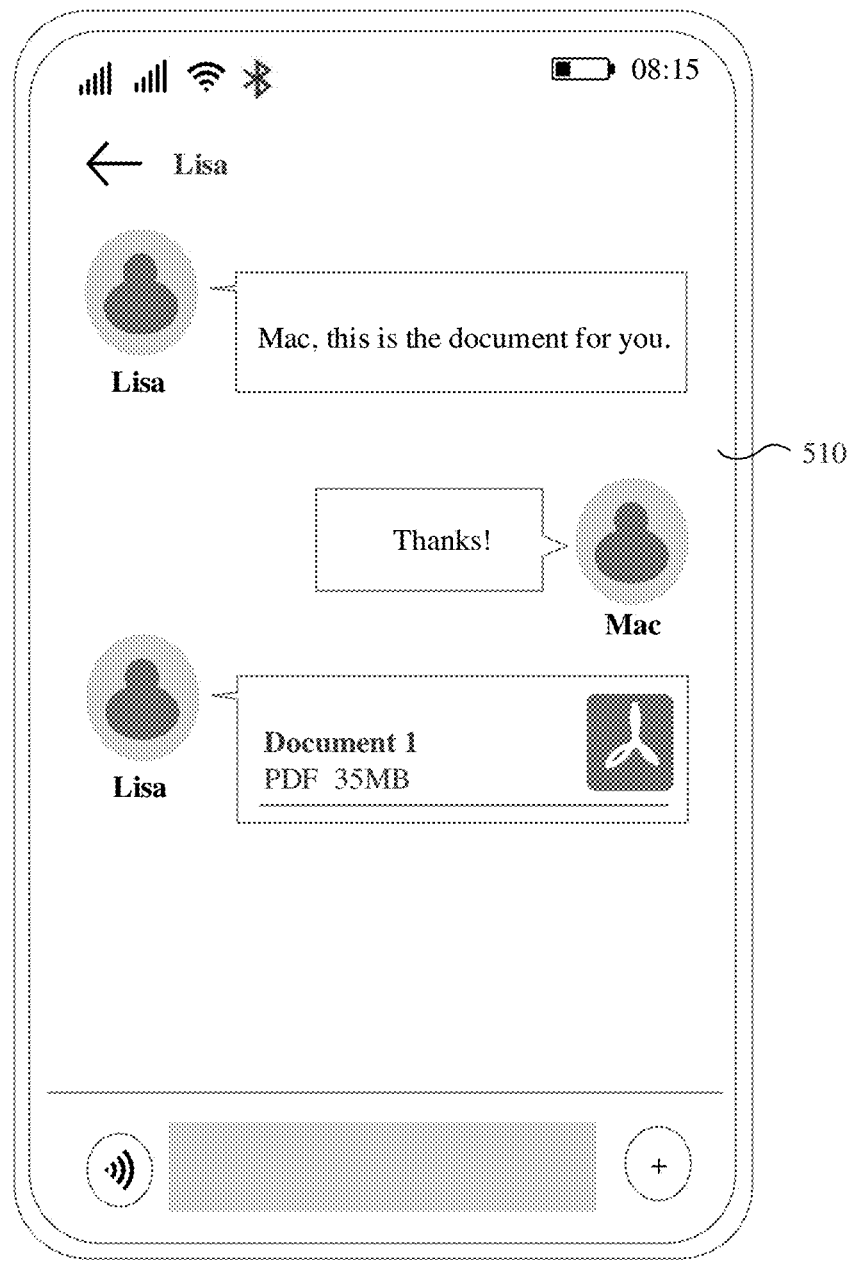

In FIG. 3C, when the electronic device 100 detects a user operation on the control 526, the electronic device 100 displays the user interface 510 in response to the user operation, as shown in FIG. 3D. For specific descriptions of FIG. 3D, refer to descriptions of FIG. 2A. Details are not described herein.

To be specific, if the user wants to quickly switch to a specific page (such as the application interface 510) of application software 2 (such as the instant messaging software) when the electronic device 100 runs the application software 1 (such as the browser software) in the foreground, the control 526 corresponding to the application interface 510 may be selected on the multi-task interface. When the electronic device 100 detects a user operation on the control 526, the electronic device 100 displays the user interface 510.

FIG. 3A to FIG. 3D show an example operation process in which the electronic device wo quickly switches between application interfaces of different applications by using the multi-task interface 520. An embodiment of this application further provides a function for recommending a frequently used interface to add. The frequently used interface may be an important interface of an application. For example, for an instant messaging application, the frequently used interface may be a homepage of the application, a homepage of an applet in the application, a page of a function (such as a payment function, a code scanning function, a setting function, or the like) in the application, a dialog box of a specific contact, or the like.

In some embodiments, the frequently used interface may be preset in the electronic device 100. In this case, the electronic device 100 stores a correspondence between the frequently used interface and an activity corresponding to the frequently used interface, and protects the activity from being terminated. When the electronic device 100 displays another application interface, the user may trigger a shortcut control of the frequently used interface. In response to the user operation, the activity manager reactivates the activity and places the activity on the top of a task stack. In this way, the electronic device 100 displays the frequently used interface.

In some embodiments, the frequently used interface may be automatically determined and generated by the electronic device 100 based on a quantity of times/a frequency of accessing the interface by the user. If the electronic device 100 finds that a quantity of times/a frequency of accessing a current interface is greater than a threshold, the electronic device 100 determines that the current interface is a frequently used interface, and stores a correspondence between the current interface and an activity corresponding to the current interface. In addition, the electronic device 100 protects the activity from being terminated.

Optionally, the electronic device 100 stores a directory path of a frequently used interface. The electronic device 100 may be redirected to the frequently used interface from another interface based on the directory path.

Optionally, the user may add/remove a frequently used interface in a customized manner.

Optionally, the electronic device 100 may automatically update a frequently used interface.

Figure 4A:
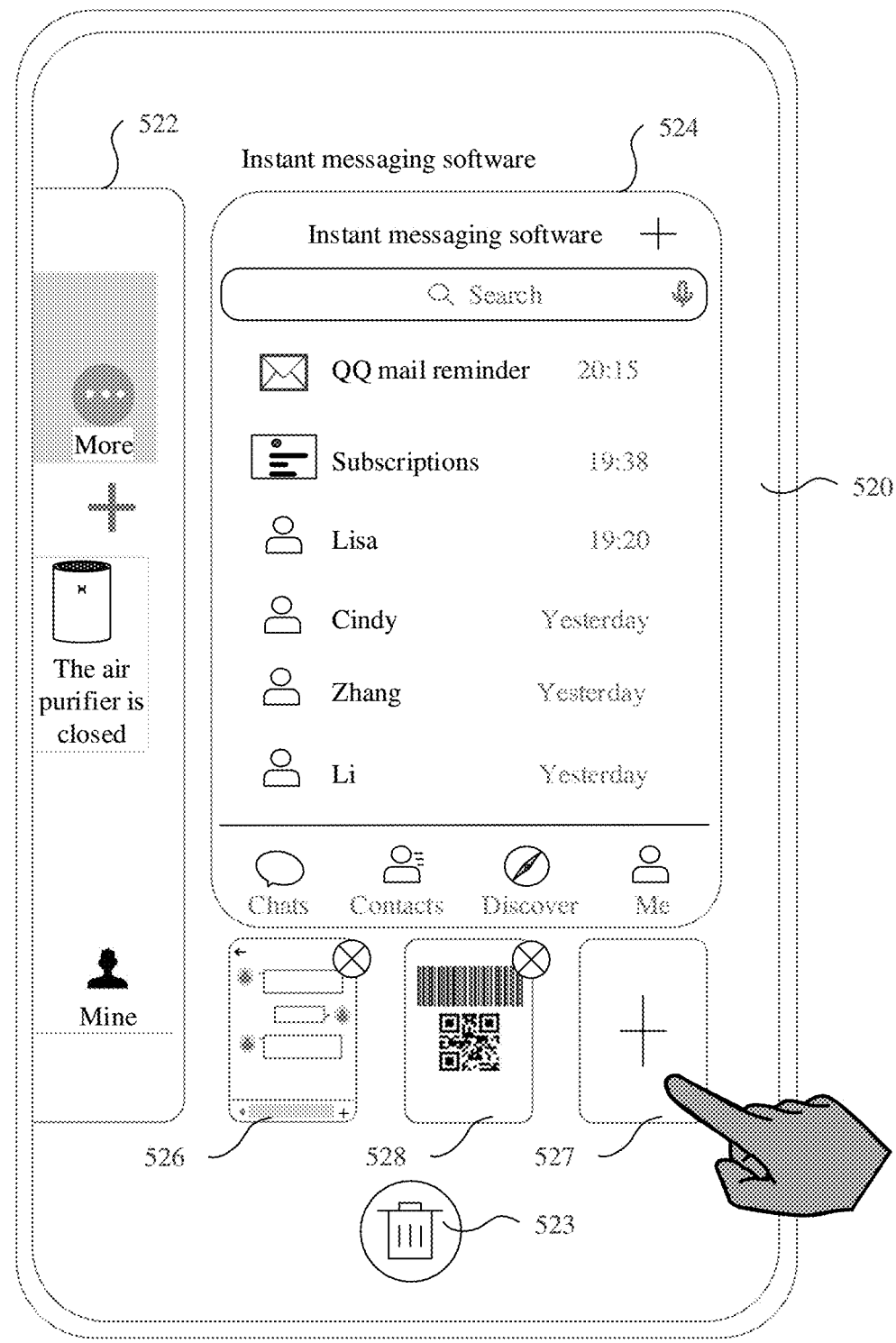
FIG. 4A to FIG. 4D are schematic diagrams of another group of application interfaces according to an embodiment of this application.
Figure 4B:
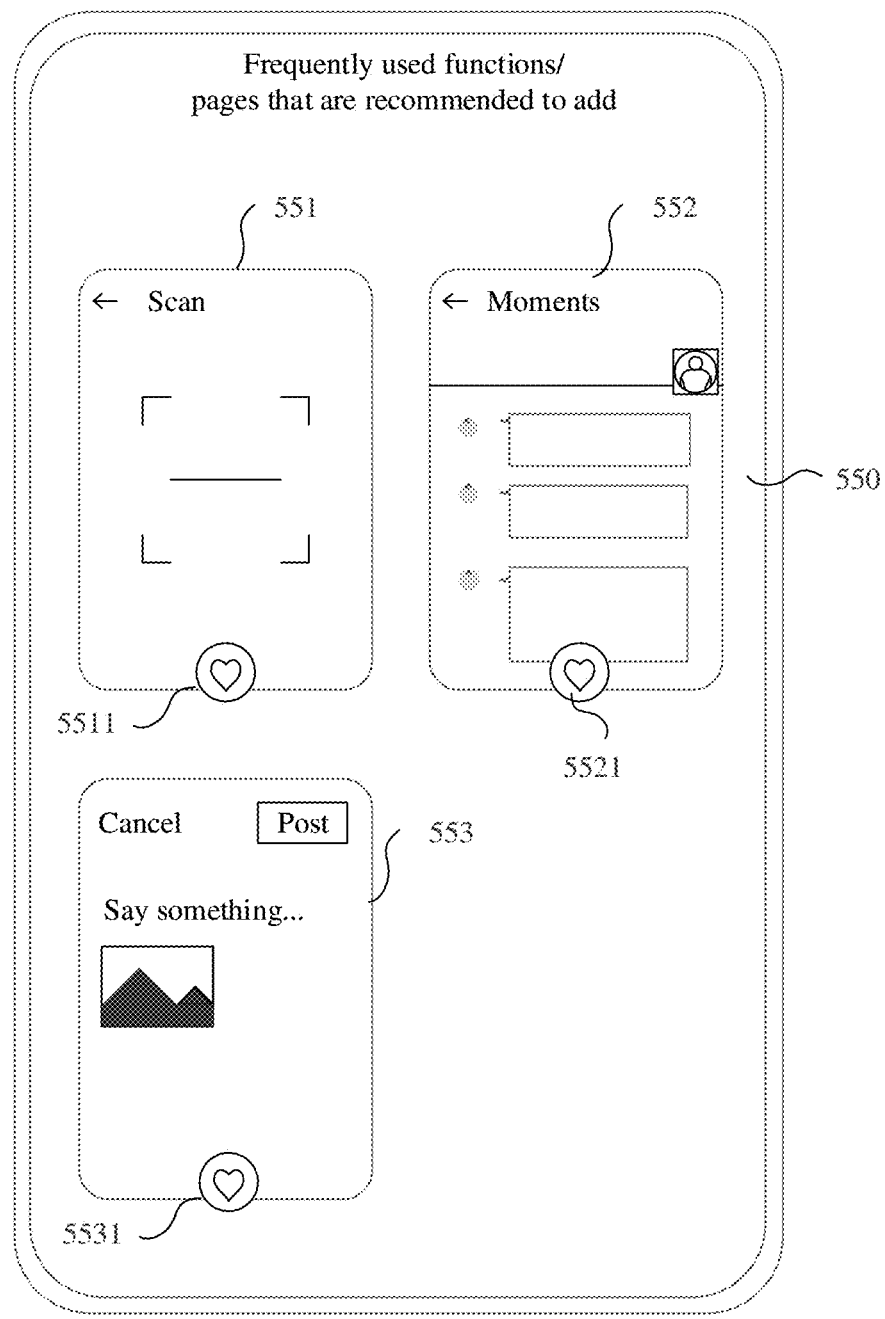

As shown in FIG. 4A, the multi-task interface 520 and controls 526, 528, and 527 in FIG. 4A are the same as those in FIG. 2G. For specific descriptions of FIG. 4A, refer to related descriptions of FIG. 2G. Details are not described herein. When the electronic device 100 detects a user operation on the control 527, the electronic device 100 displays, in response to the user operation, one or more pages that can be added. FIG. 4B shows an example application interface 550. The application interface 550 includes pages 551, 552, and 553.

The page 551 includes an icon 5511. The icon 5511 is used to indicate the user to add, as a shortcut, an application interface associated with the page 551. The page 552 includes an icon 5521. The icon 5521 is used to indicate the user to add, as a shortcut, an application interface associated with the page 552. The page 553 includes an icon 5531. The icon 5531 is used to indicate the user to add, as a shortcut, an application interface associated with the page 553.

For example, when the electronic device 100 detects a user operation on the icon 5511, the electronic device 100 adds, in response to the user operation, a shortcut control for the application interface associated with the page 551, and establishes an association relationship between the shortcut control and the application interface. The user may use the shortcut control to quickly switch to the application interface from another interface.

Figure 4C:
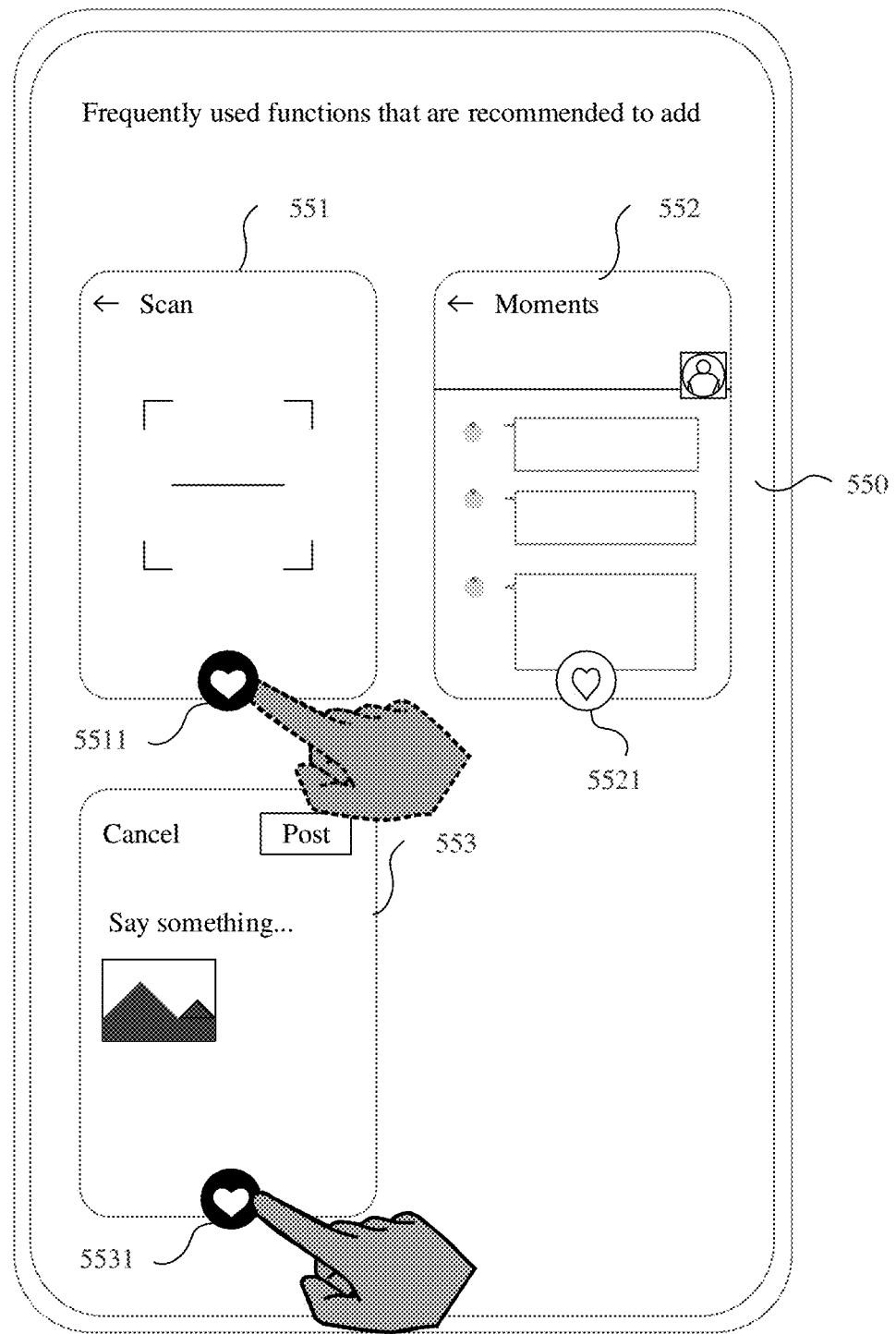
Figure 4D:
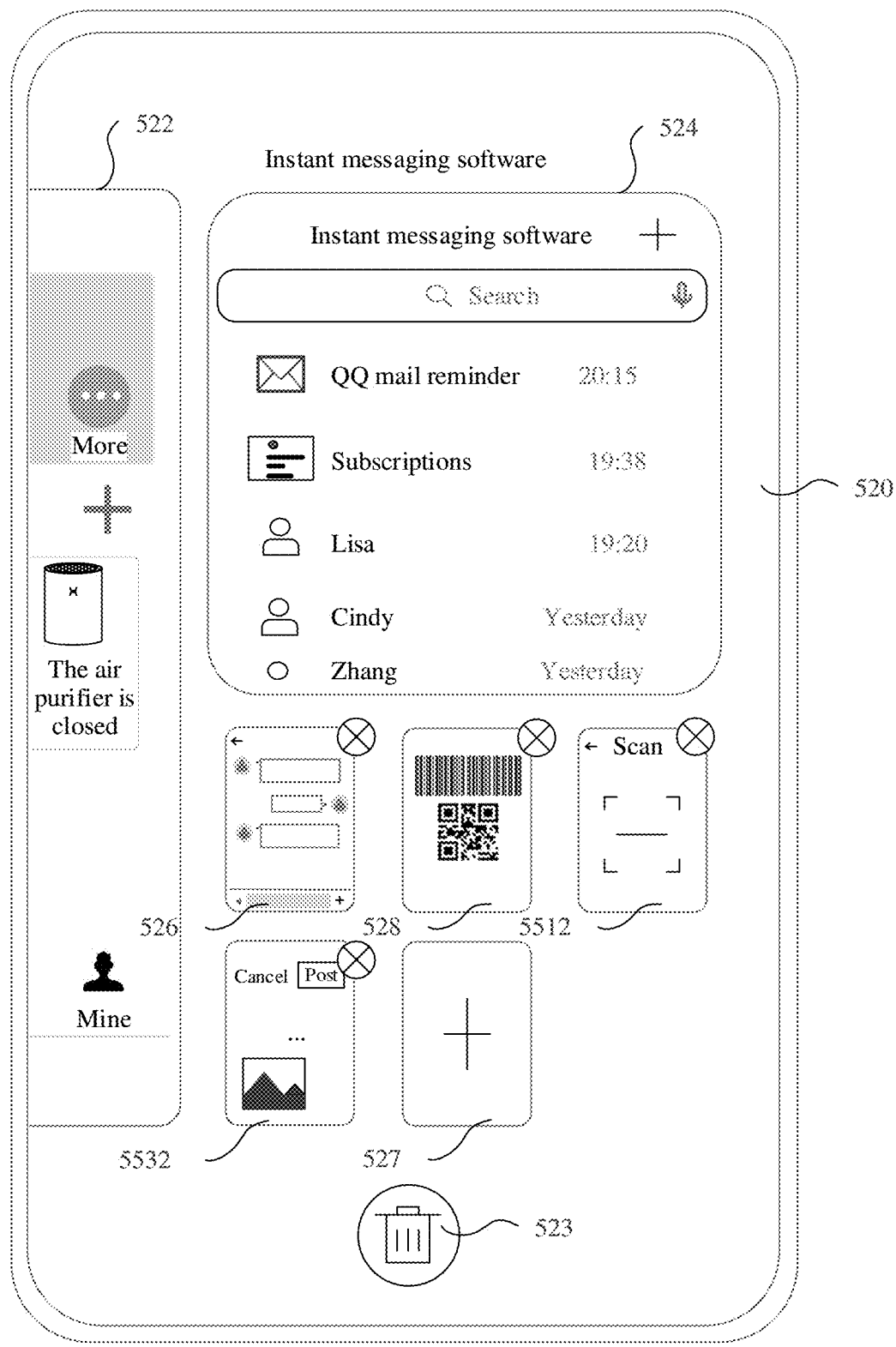

For example, as shown in FIG. 4C, when the electronic device 100 detects user operations on the icon 5511 and the icon 5531, the electronic device 100 adds, in response to the user operations, shortcut controls for application interfaces associated with the page 551 and the page 553. Compared to FIG. 4A, FIG. 4D further includes the control 5512 and the control 5532. The control 5512 corresponds to the page 551, and the control 5532 corresponds to the page 553. Optionally, display content of the control 5512 is associated with display content of the page 551, and display content of the control 5532 is associated with display content of the page 553.

Figures such as FIG. 2C, FIG. 2F, FIG. 2G, FIG. 2H, and FIG. 3C in this embodiment of this application each include the control 527, and the control 527 in each figure functions the same.

An embodiment of this application further provides a function for adding a historical track page. The historical track page may be a page/function accessed by the user in an application running process, a page/function accessed by the user for more than a preset quantity of times in an application running process, a page/function on which the user dwells for greater than a preset time period in an application running process, or a page/function that is accessed by the user for more than a preset quantity of times in a preset time period in an application running process, or an important interface such as a main interface, a page of a function (such as a payment function, a code scanning function, and a setting function), or the like.

If the electronic device 100 determines that a current interface is a historical track page, the electronic device 100 stores a correspondence between the current interface and an activity corresponding to the current interface, and protects the activity from being terminated. When the electronic device 100 displays another application interface, the user may trigger a shortcut control of the historical track page. In response to the user operation, the activity manager reactivates the activity and places the activity on the top of a task stack. In this way, the electronic device 100 displays the historical track page.

Optionally, the electronic device 100 stores a directory path or a user operation path of a historical track page. The electronic device 100 may be redirected to the historical track page from another interface based on the directory path or the user operation path.

Figure 5A:
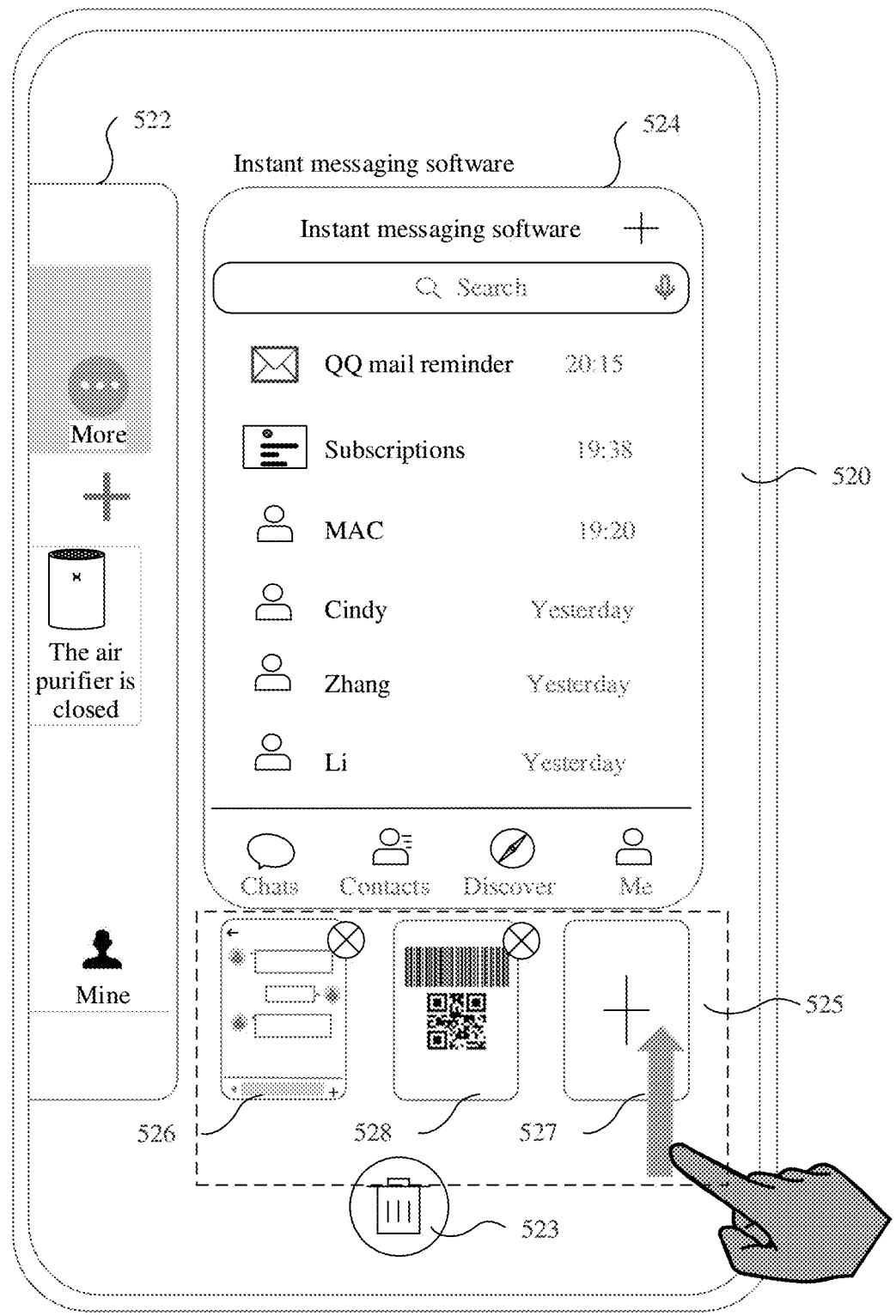
FIG. 5A to FIG. 5C are schematic diagrams of another group of application interfaces according to an embodiment of this application.
Figure 5B:
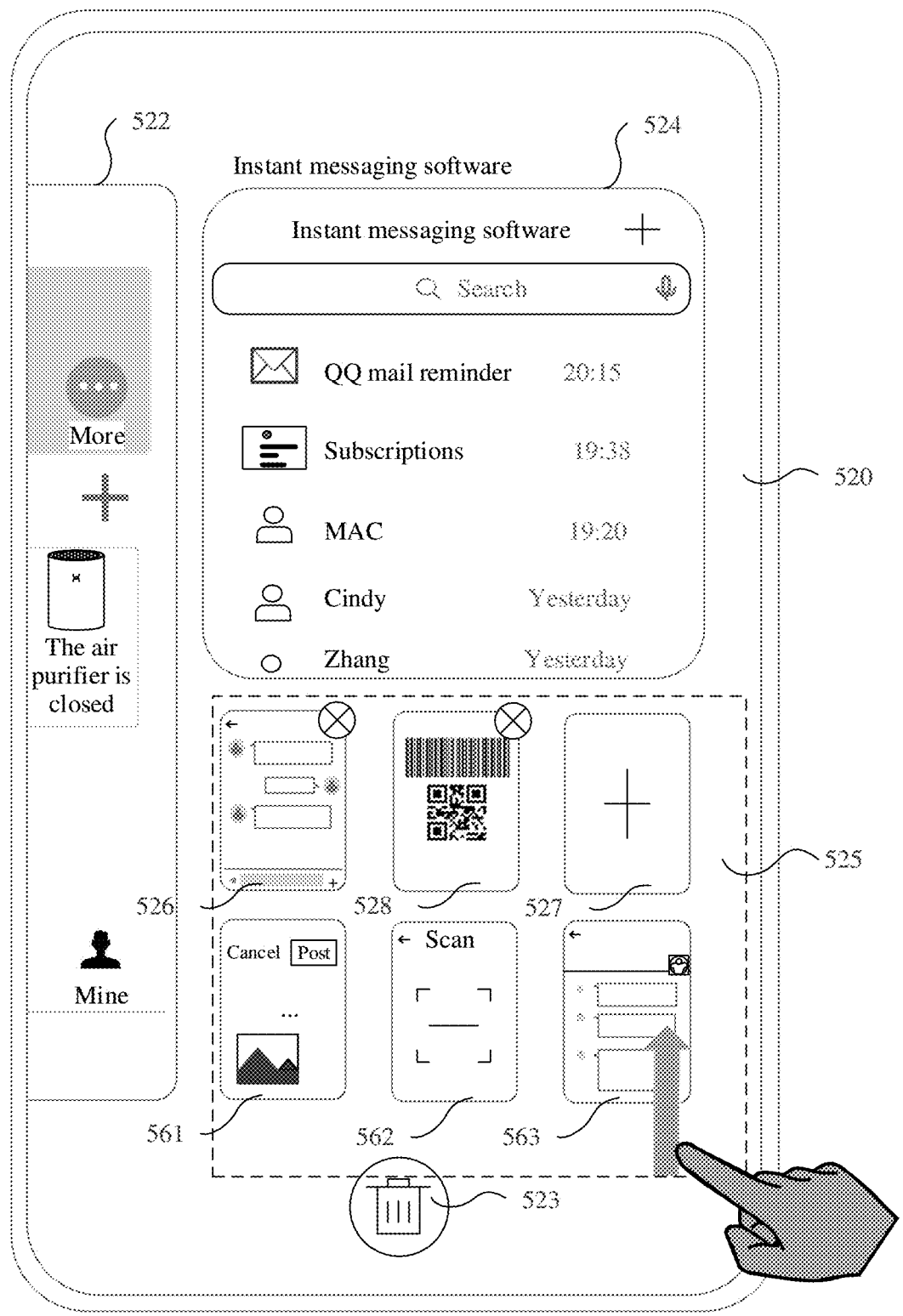

As shown in FIG. 5A, the multi-task interface 520 and controls 526, 528, and 527 in FIG. 5A are the same as those in FIG. 2G. For specific descriptions of FIG. 5A, refer to related descriptions of FIG. 2G. Details are not described herein. When the electronic device 100 detects an upward sliding operation in the area 525 of the electronic device 100, the electronic device 100 displays one or more historical track pages in response to the operation. As shown in FIG. 5B, the area 525 has a larger display scope, and the following three historical track pages are displayed in the area 525 as examples: a page 561, a page 562, and a page 563. For example, when the electronic device 100 detects a user operation on the page 561, the electronic device 100 displays a user interface corresponding to the page 561 in response to the user operation.

In some embodiments, there is a maximum display scope for the area 525. For example, it is set that a maximum of six controls can be displayed in the area 525. Optionally, the user may slide left and right (or up and down) in the area 525 to switch between controls for display. For example, when the electronic device 100 detects a rightward sliding operation in the area 525, controls in the area 525 sequentially move rightward in response to the operation. When the electronic device 100 detects a leftward sliding operation in the area 525, controls in the area 525 sequentially move leftward in response to the operation.

Figure 5C:
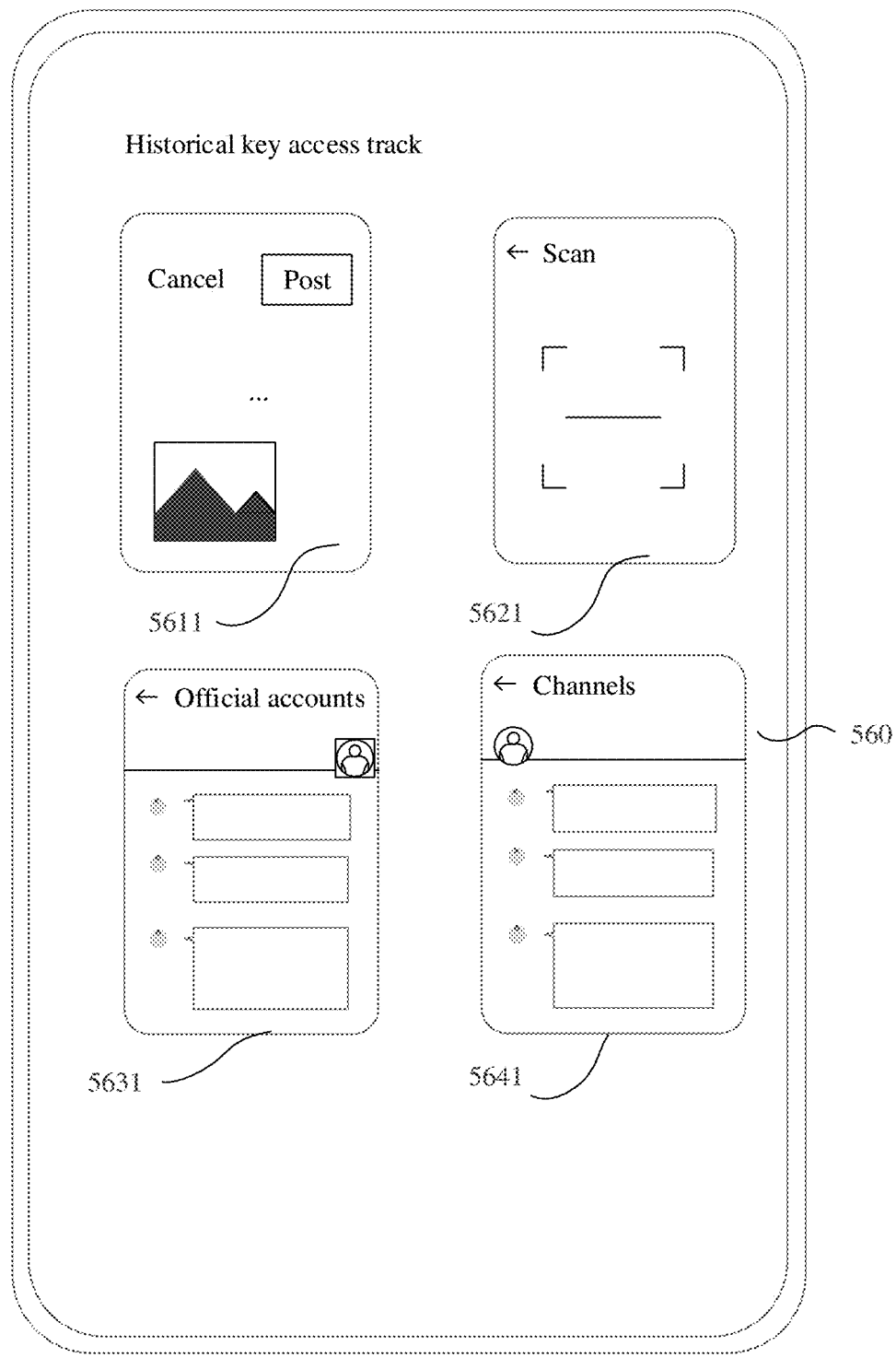

If the user continues to sliding upward on the interface shown in FIG. 5B, the electronic device 100 displays more historical track pages, or displays historical track pages in full screen. FIG. 5C shows an example historical track interface 560. The historical track interface 560 includes one or more historical track pages, such as pages 5611, 5621, 5631, and 5641. The page 5611 corresponds to the page 561 in FIG. 5B, and the page 5611 and the page 561 correspond to a same user interface. The page 5621 corresponds to the page 562 in FIG. 5B, and the page 5621 and the page 562 correspond to a same user interface. The page 5631 corresponds to the page 563 in FIG. 5B, the page 5631 and the page 563 correspond to a same user interface. The page 5641 is not shown in FIG. 5B. For example, when the electronic device 100 detects a user operation on the page 5611, the electronic device 100 displays a user interface corresponding to the page 5611 in response to the user operation.

In some embodiments, FIG. 5B is optional. On the interface shown in FIG. 5A, when the electronic device detects an upward sliding operation in the control area 525 of the electronic device 100, the electronic device 100 displays, in response to the operation, the historical track interface 560 shown in FIG. 5C.

In this embodiment of this application, display manners of pages and controls on the foregoing multi-task interface are not limited. FIG. 6A to FIG. 6F further show several display manners of the multi-task interface. FIG. 6A to FIG. 6D show that different applications may be displayed by performing a horizontal sliding on the multi-task interface, and different application pages of a same application may be displayed by performing a vertical sliding.

Figure 6A:
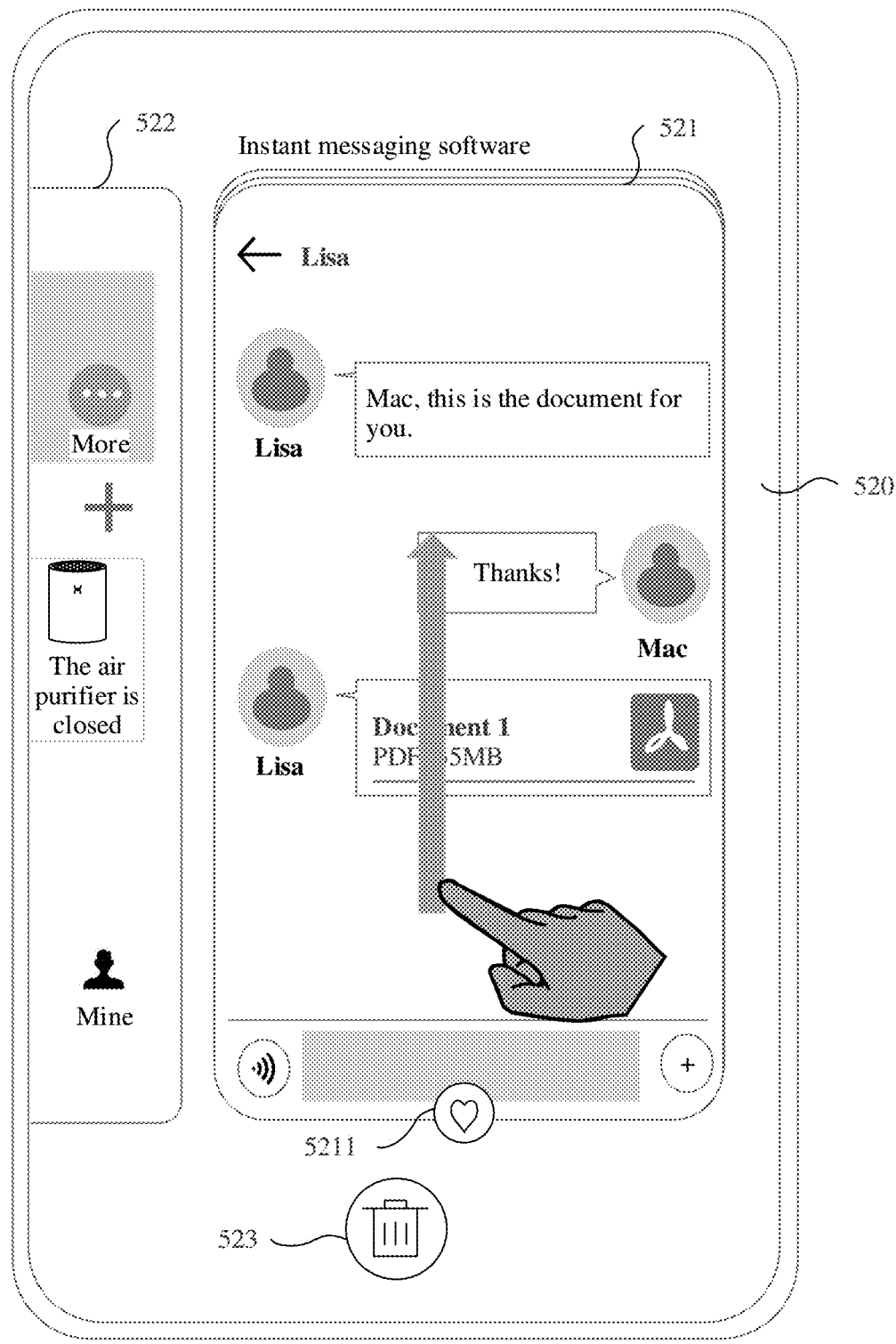
FIG. 6A to FIG. 6F are schematic diagrams of another group of application interfaces according to an embodiment of this application.
Figure 6B:
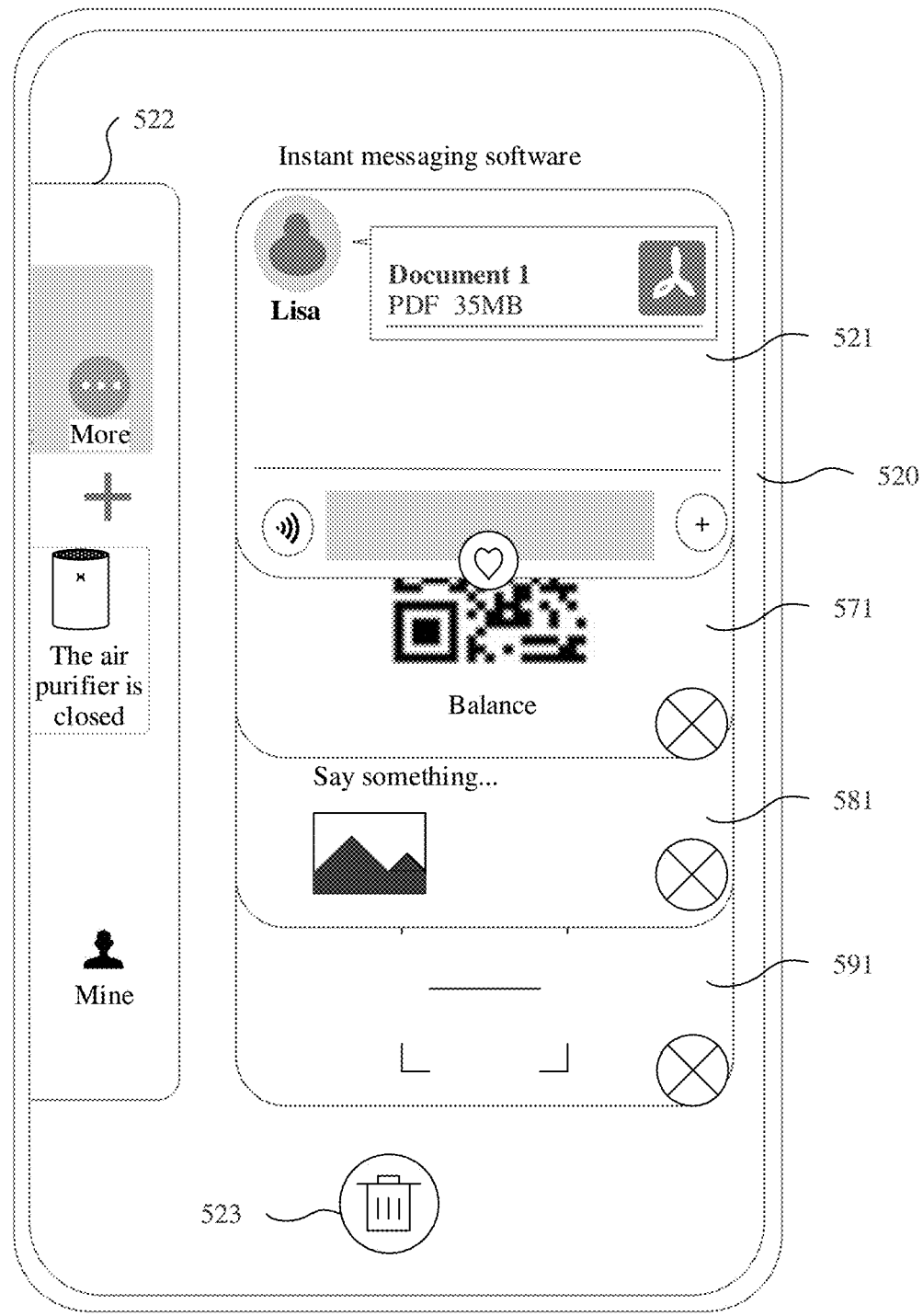

FIG. 6A shows a multi-task interface 520 that includes a page 521 and a page 522. The page 521 is fully displayed, and the page 522 is partially displayed to the left of the page 521. It can be learned that the page 521 is superimposed on another page. This indicates that the application software includes a plurality of pages. The user may slide up and down on the multi-task interface 520 to switch between pages of a same application for display. When the electronic device 100 detects an upward sliding operation on instant messaging software on the multi-task interface 520, pages of the instant messaging software sequentially move upward in response to the operation. FIG. 6B includes pages 521, 571, 581, and 591. The page 581 is superimposed on the page 591, the page 571 is superimposed on the page 581, and the page 521 is superimposed on the page 571. Optionally, in FIG. 6B, when the electronic device 100 detects an upward sliding operation on the instant messaging software, the pages of the instant messaging software continue to move upward, but an overlapping area between every two adjacent pages becomes smaller. To be specific, an overlapping area between the page 521 and the page 571 becomes smaller, an overlapping area between the page 571 and the page 581 becomes smaller, and an overlapping area between the page 581 and the page 591 becomes smaller. When the electronic device 100 detects a user operation on any one of the pages, the electronic device 100 displays a user interface corresponding to the page.

Figure 6C:
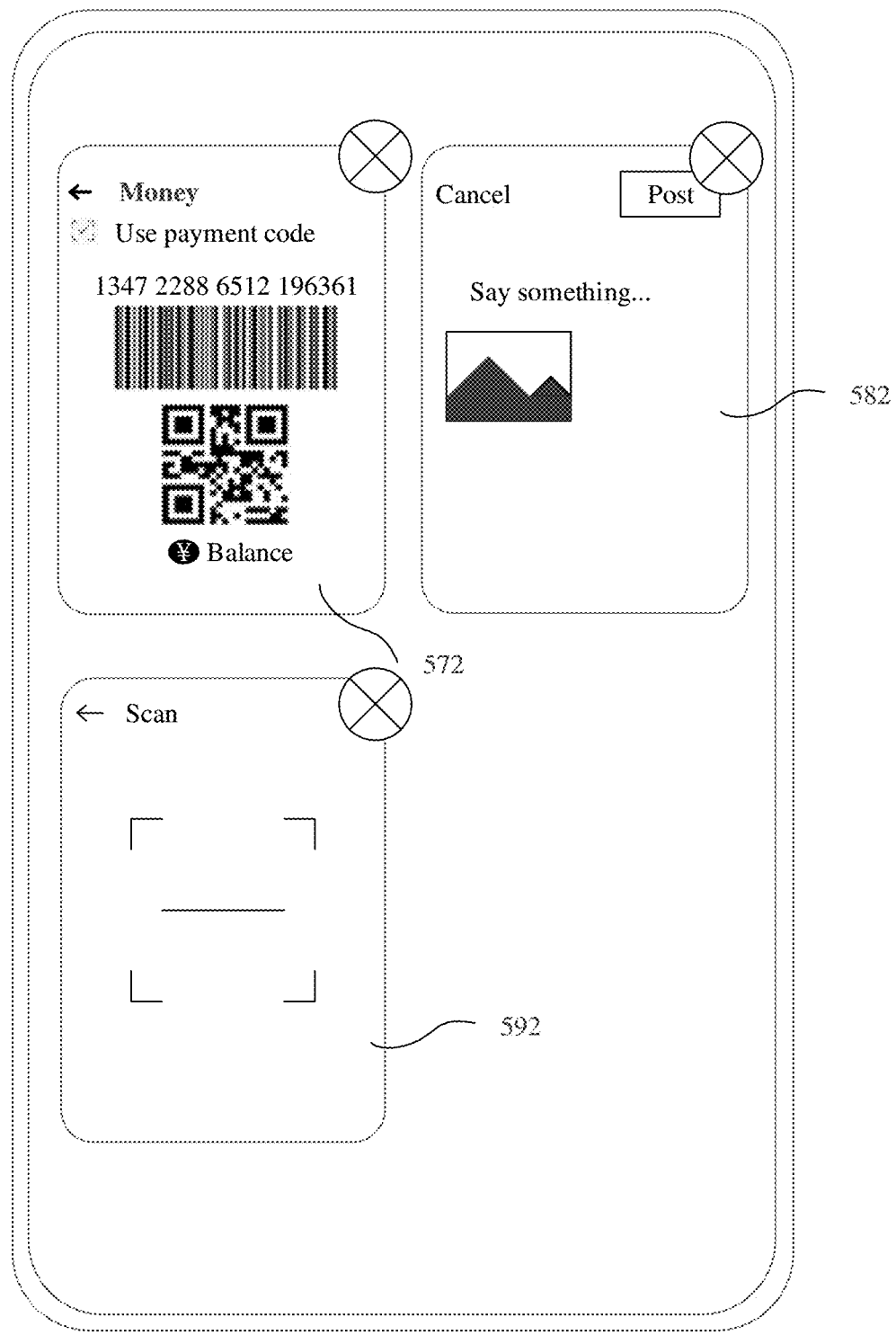

Optionally, when the electronic device 100 detects an upward sliding operation on the instant messaging software on the multi-task interface 520 shown in FIG. 6A, the electronic device 100 displays, in response to the operation, one or more pages of the instant messaging software, as shown in FIG. 6C. FIG. 6C includes pages 572, 582, and 592. When the electronic device 100 detects a user operation on any one of the pages, the electronic device 100 displays a user interface corresponding to the page.

Figure 6D:
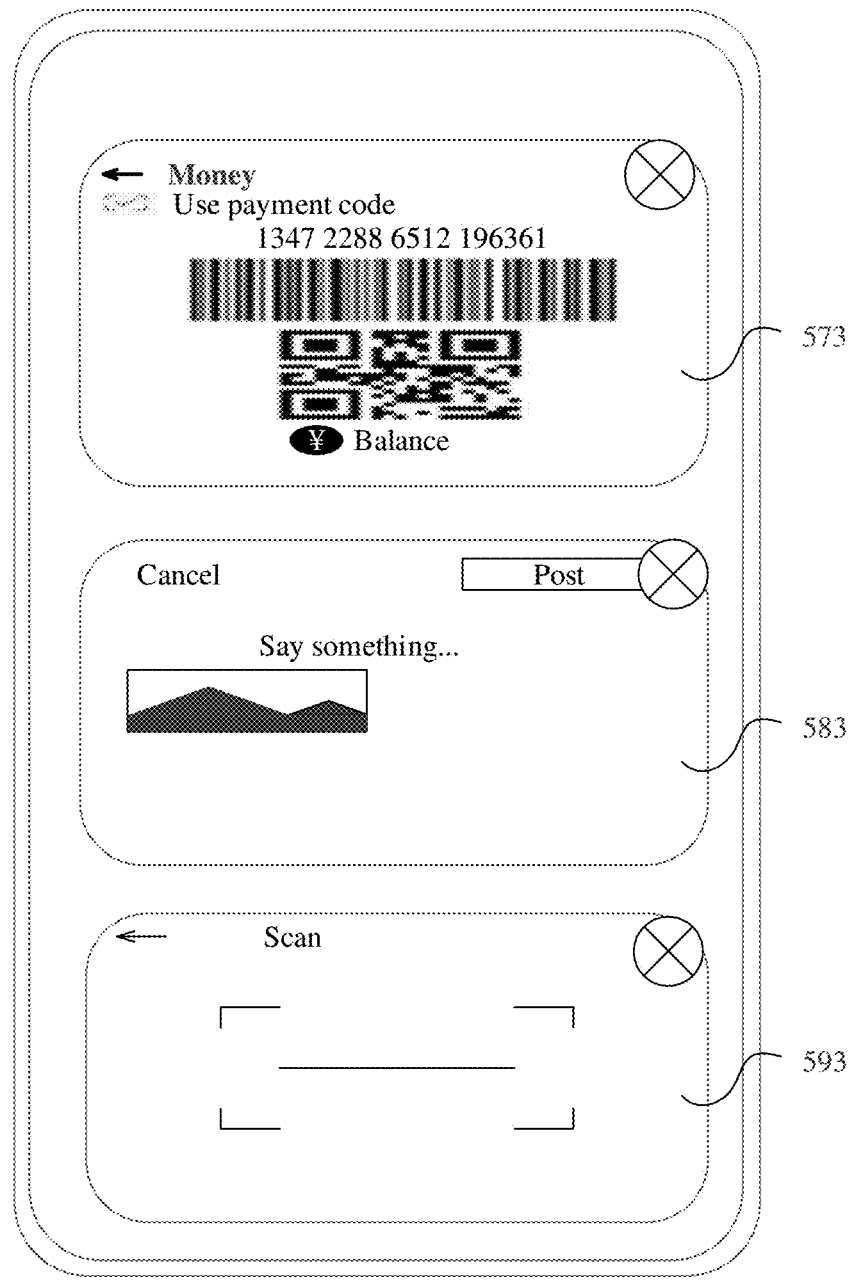

Optionally, when the electronic device 100 detects an upward sliding operation on the multi-task interface 520 shown in FIG. 6A, the electronic device displays, in response to the operation, an interface shown in FIG. 6D. FIG. 6D includes pages 573, 583, and 593. When the electronic device 100 detects a user operation on any one of the pages, the electronic device 100 displays a user interface corresponding to the page.

Figure 6E:
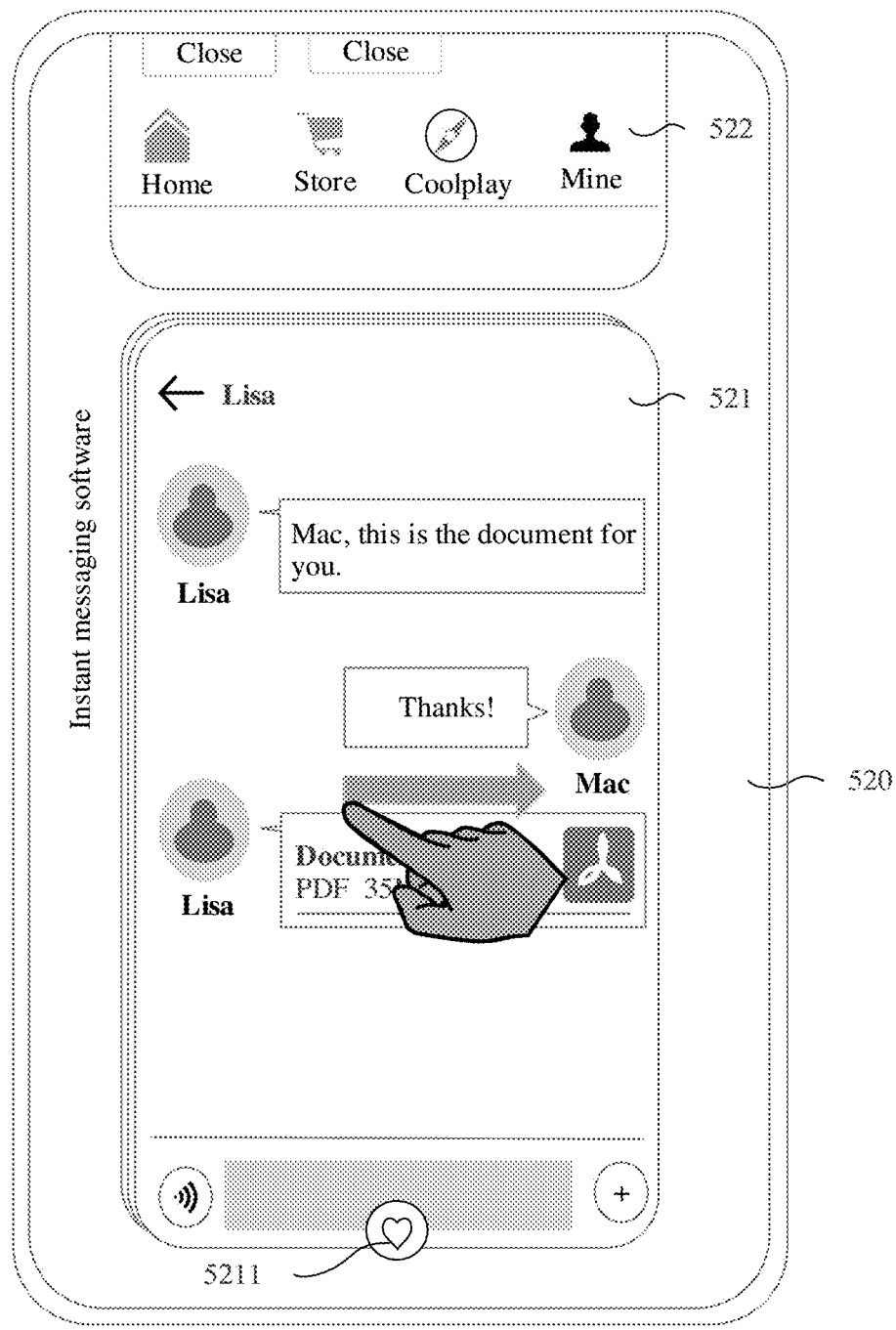
Figure 6F:
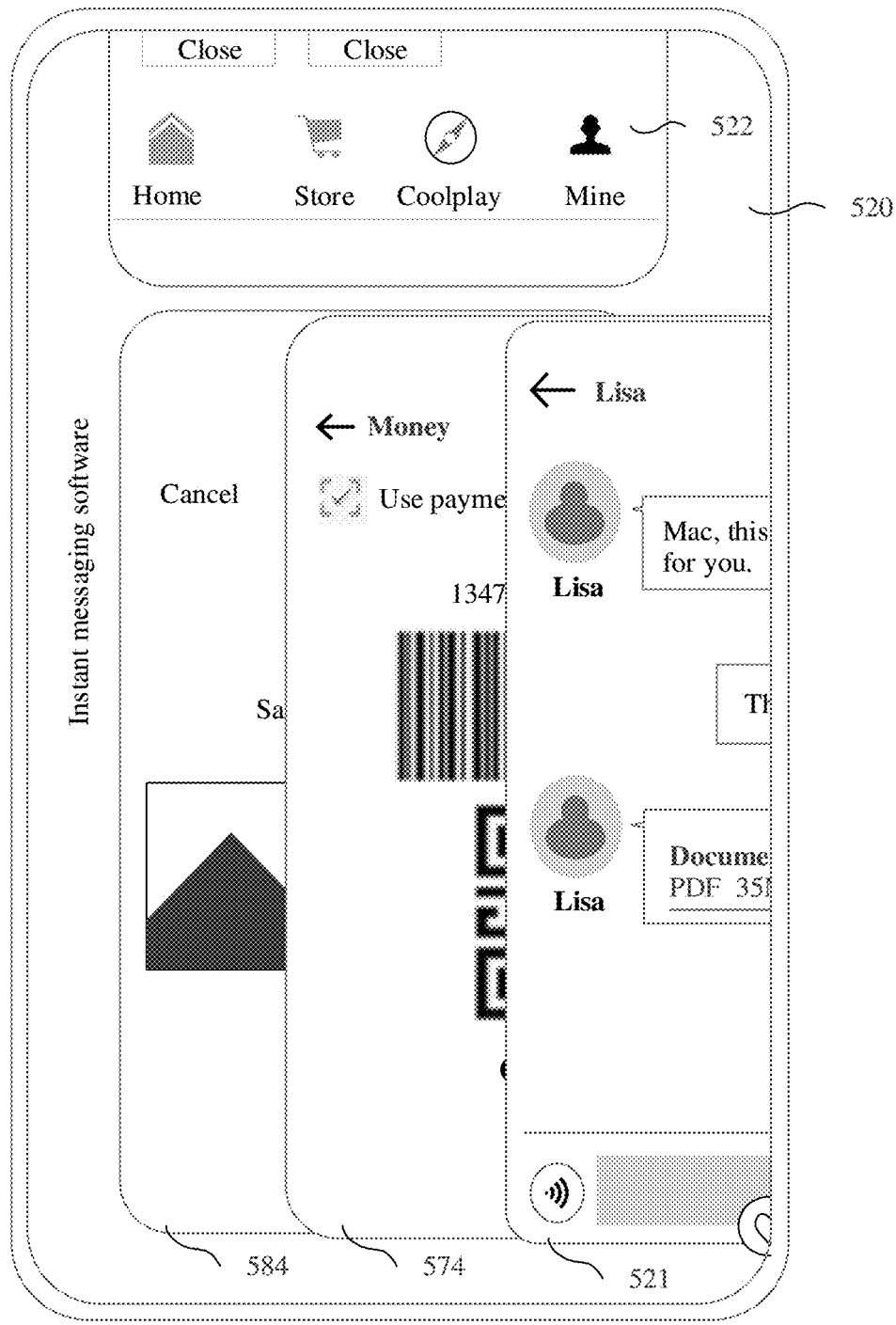

In some embodiments, FIG. 6E and FIG. 6F show that different applications may be displayed by performing a vertical sliding (an upward sliding or a downward sliding) on the multi-task interface, and different application pages of a same application may be displayed by performing a horizontal sliding (a leftward sliding or a rightward sliding).

FIG. 6E shows a multi-task interface 520 that includes a page 521 and a page 522. The page 521 is fully displayed, and the page 522 is partially displayed above the page 521. It can be learned that the page 521 is superimposed on another page. This indicates that the application software (the instant messaging software) includes a plurality of pages. The user may slide horizontally on the multi-task interface 520 to switch between pages of a same application for display. When the electronic device 100 detects a rightward sliding operation on the instant messaging software on the multi-task interface 520, the pages of the instant messaging software sequentially move rightward in response to the operation. As shown in FIG. 6F, pages 521, 574, and 584 are included. The page 574 is superimposed on the page 584, and the page 521 is superimposed on the page 574. Optionally, in FIG. 6F, when the electronic device 100 detects a rightward sliding operation on the multi-task interface 520, the pages of the instant messaging software continue to move rightward, but an overlapping area between every two adjacent pages becomes smaller. To be specific, an overlapping area between the page 521 and the page 574 becomes smaller, and an overlapping area between the page 574 and the page 584 becomes smaller. When the electronic device 100 detects a user operation on any one of the pages, the electronic device 100 displays a user interface corresponding to the page.

Figure 7A:
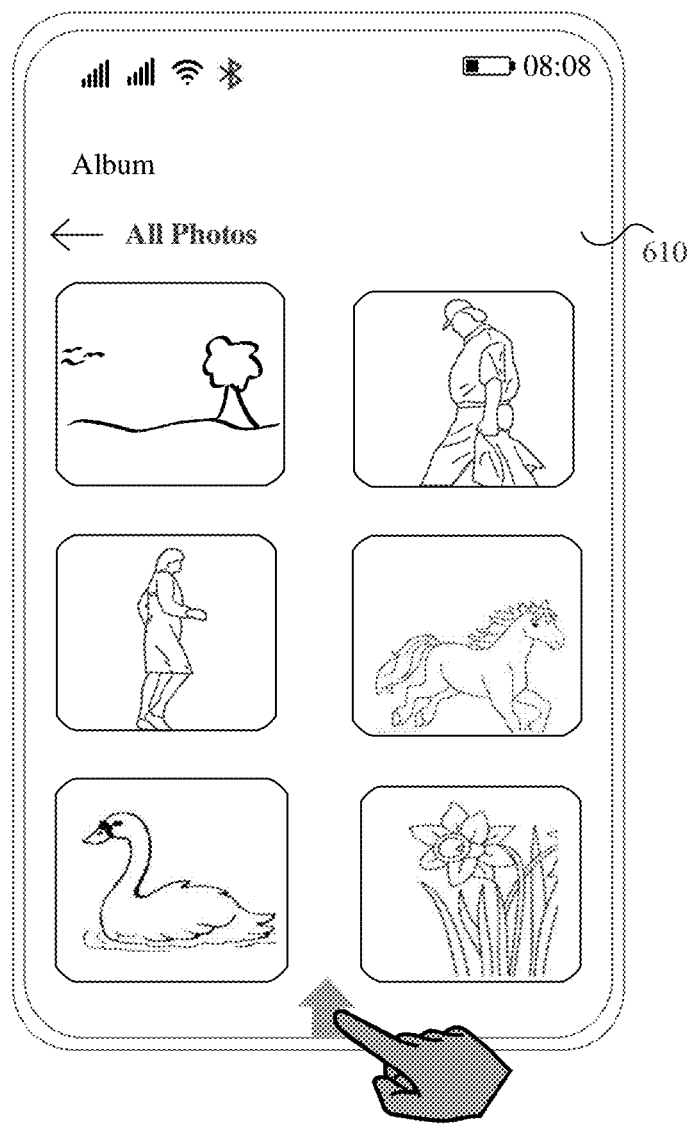
FIG. 7A to FIG. 7C are schematic diagrams of another group of application interfaces according to an embodiment of this application.
Figure 7B:
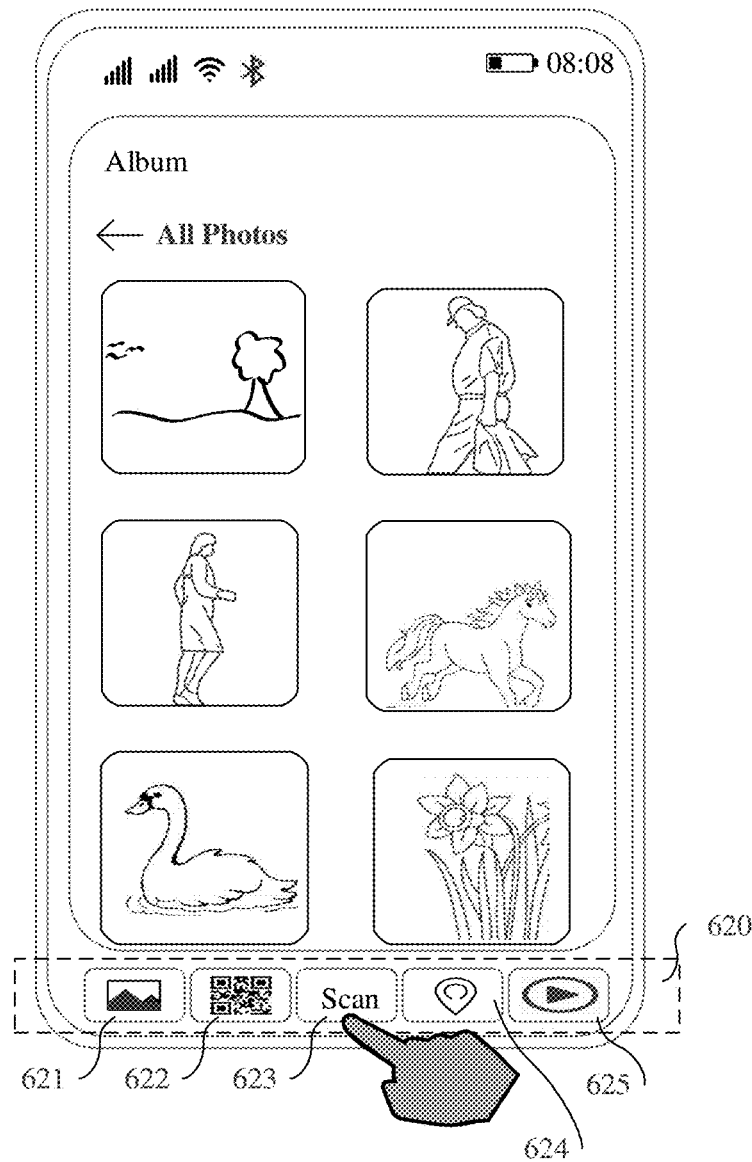
Figure 7C:
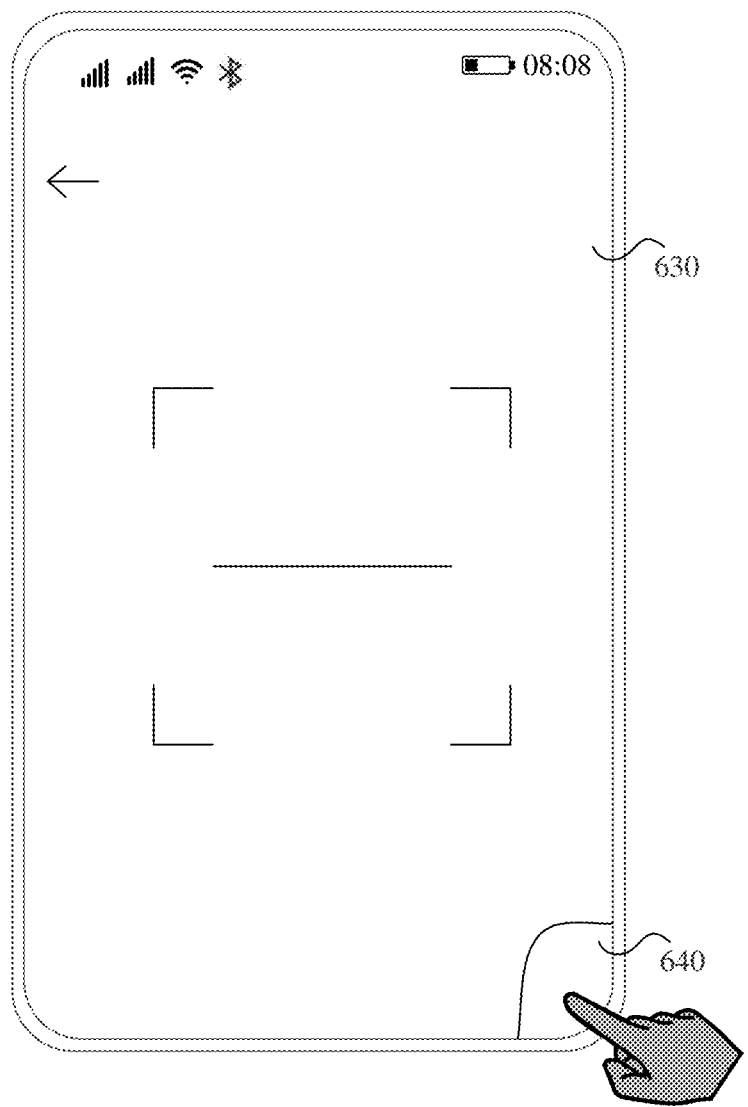

In an embodiment of this application, FIG. 7A to FIG. 7C further show how to view shortcut controls of a plurality of applications.

In some application scenarios, a user views an album by using an electronic device 100 while walking to a subway station. When arriving at the subway station, the user gently slides upward at the bottom of an album interface. The album application is zoomed out, and a row of shortcut controls are displayed at the bottom. The shortcut controls may include shortcut controls for a plurality of applications on the electronic device 100, for example, a shortcut control for a subway QR code. When the user taps the shortcut control for the application that generates subway QR codes, the electronic device 100 displays, in full screen, an application interface of the application that generates subway QR codes. Therefore, a quick switch can be implemented between application interfaces. In some embodiments, an icon associated with the album interface is displayed in a lower-right corner of the application interface of the application that generates subway QR codes. After a QR code on the application interface of the application that generates subway QR codes is scanned, the user may tap the icon in the lower-right corner to return to the previous album interface and continue to view the album.

FIG. 7A shows an example album interface 610. When the electronic device 100 detects a user operation on the album interface 610, the electronic device 100 displays, in response to the user operation, a shortcut control area 620 shown in FIG. 7B. The user operation may be a short-path upward sliding operation.

When the electronic device 100 detects a short-path upward sliding operation at the bottom of the electronic device 100, the electronic device 100 displays the area 620 shown in FIG. 7B. The area 620 shows five shortcut controls as examples, and the five shortcut controls include shortcut controls for a plurality of applications of the electronic device 100. For example, a control 621 is a shortcut control for a gallery application. Controls 622 and 623 are shortcut controls for instant messaging software, where the control 622 indicates a payment code interface and the control 623 indicates a code scanning interface. A control 624 is a shortcut control for a map application, and a control 625 is a shortcut control for a video application.

The user may slide left and right (or up and down) in the area 620 to view more shortcut controls.

For example, when the electronic device 100 detects a user operation on the control 623, as shown in FIG. 7C, the electronic device 100 displays a corresponding application interface 630 for code scanning. In some embodiments, the application interface 630 includes a control 640. When the electronic device 100 detects a user operation on the control 640, the electronic device 100 returns, in response to the user operation, to a previous application interface, that is, the album interface 610.

In this embodiment of this application, the user may alternatively trigger, on another interface, display of shortcut controls for all applications. For example, when the electronic device 100 detects a short-path upward sliding operation at the bottom of a main interface of the electronic device 100, the electronic device 100 displays a row of shortcut controls at the bottom of the main interface.

An embodiment of this application further provides an interaction manner of displaying a multi-task interface across devices. In this manner, an electronic device 100 may obtain a multi-task queue of another electronic device, and the another device may also obtain a multi-task queue of the electronic device 100 and select one or more tasks from the multi-task queue to process tasks.

For example, a multi-task interface is opened on a tablet, where the multi-task interface displays other devices that are communicatively connected to the tablet. After a mobile phone is selected, the tablet may display application software that is recently used on the mobile phone and frequently used pages that are added to the application software. In other words, a multi-task queue of the mobile phone is displayed on the multi-task interface of the tablet. An application that is running on the mobile phone may be directly invoked and displayed on the tablet. For example, a payment function of the mobile phone is directly invoked on the tablet, a web page that is opened on the mobile phone continues to be displayed on the tablet, a video played on the mobile phone continues to be played on the tablet, a file edited on the mobile phone continues to be edited on the tablet, or the like.

In an implementation, the electronic device 100 is communicatively connected to another electronic device, so as to obtain historical task records from the another electronic device.

In another implementation, the electronic device 100 and other electronic devices each are communicatively connected to a server, and synchronize historical task records to the server. In this way, any electronic device in the system may obtain historical task records of another electronic device by using the server. The server may be a network server, a local server, or the like. This is not limited in this application. Optionally, the electronic device 100 and other electronic devices are communicatively connected to the server. In this case, a plurality of electronic devices may log on to the server by using a same user account, so as to synchronize historical task records to the server. This way, the plurality of electronic devices that log on to the server by using the same user account can obtain historical task records from each other by using the server. The user account in this embodiment of this application may be a character string for distinguishing identities of different users. For example, the user account is an email address or a cloud service account.

Figure 8A:
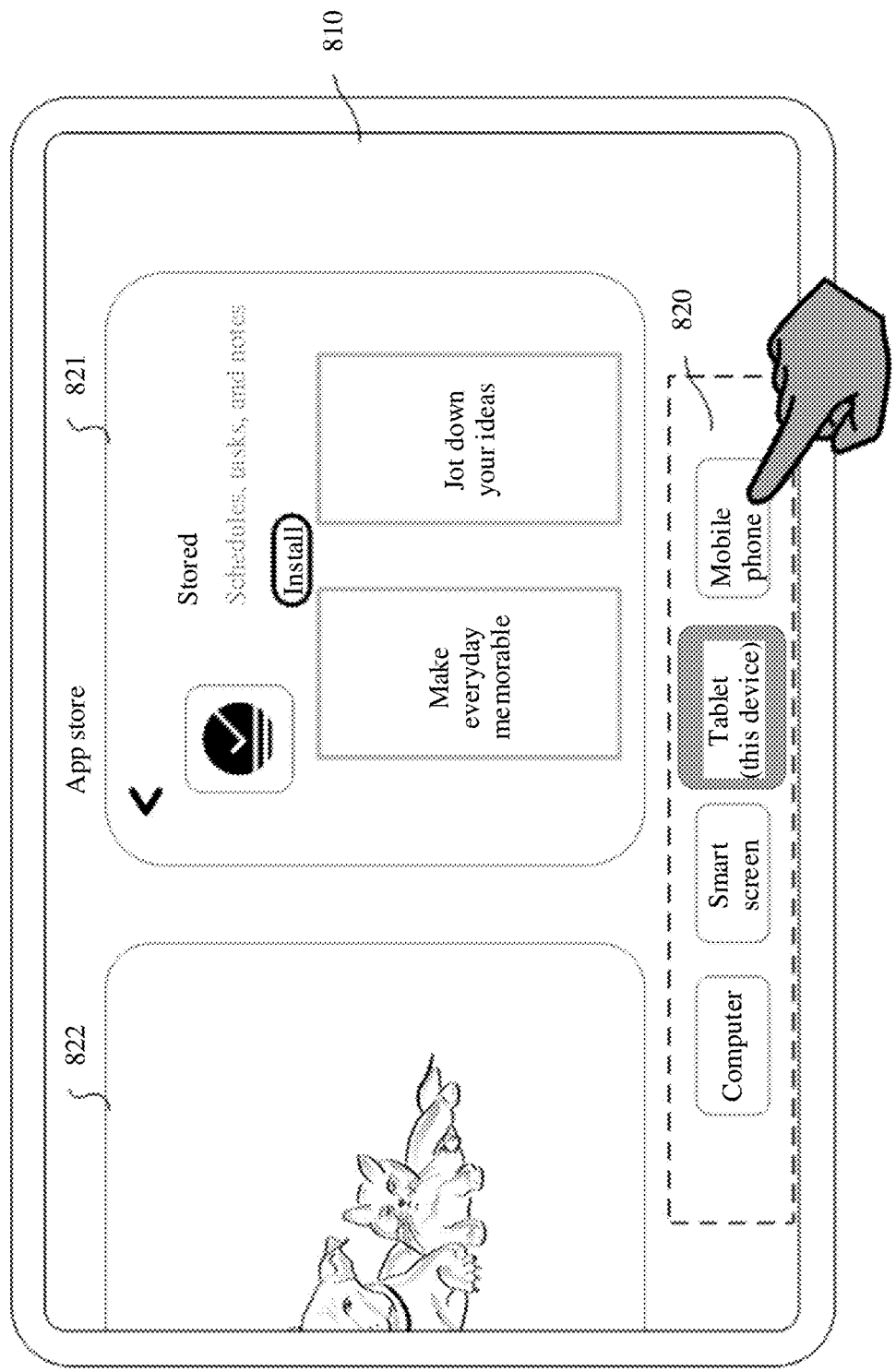
FIG. 8A to FIG. 8C are schematic diagrams of another group of application interfaces according to an embodiment of this application.
Figure 8B:
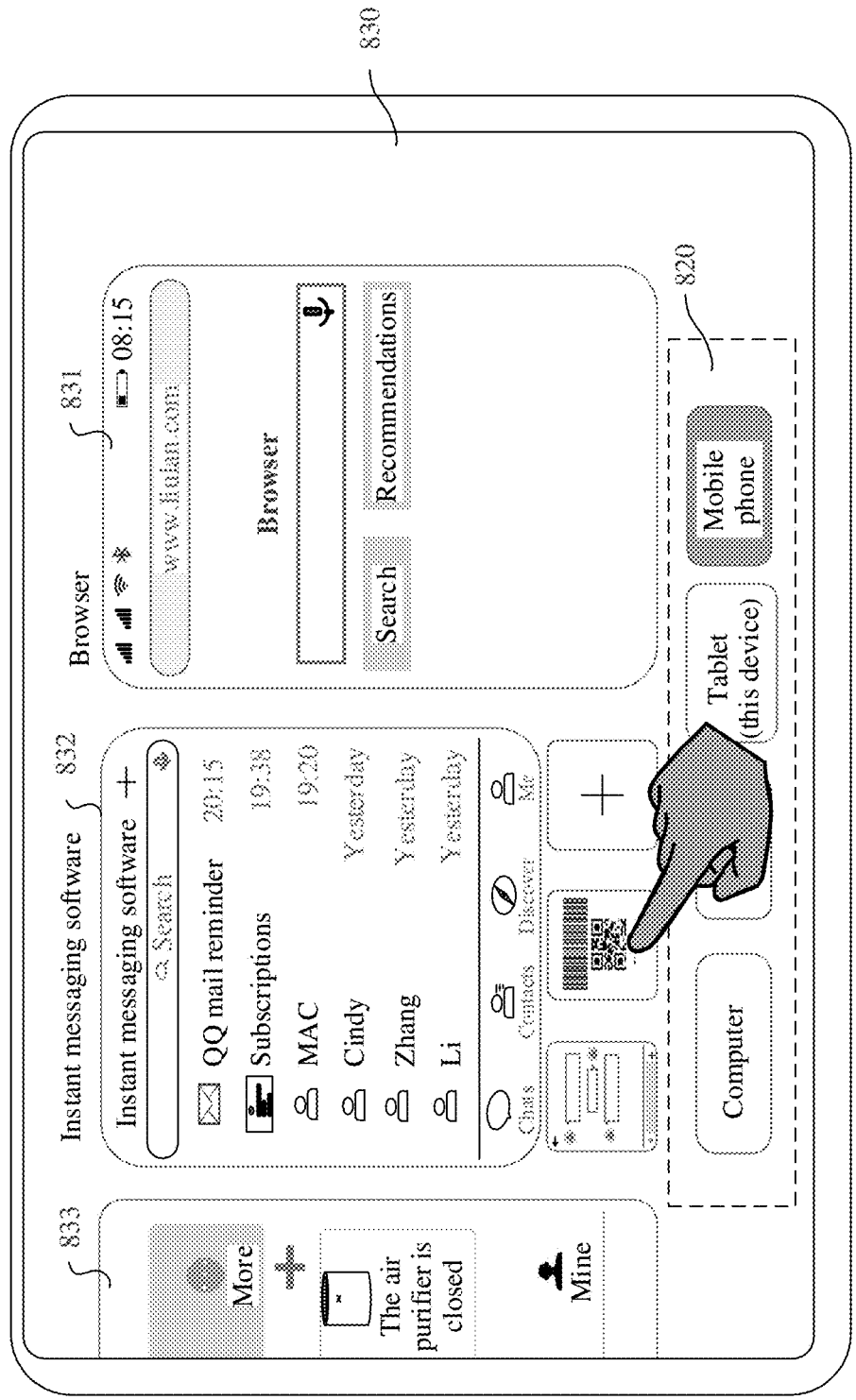
Figure 8C:
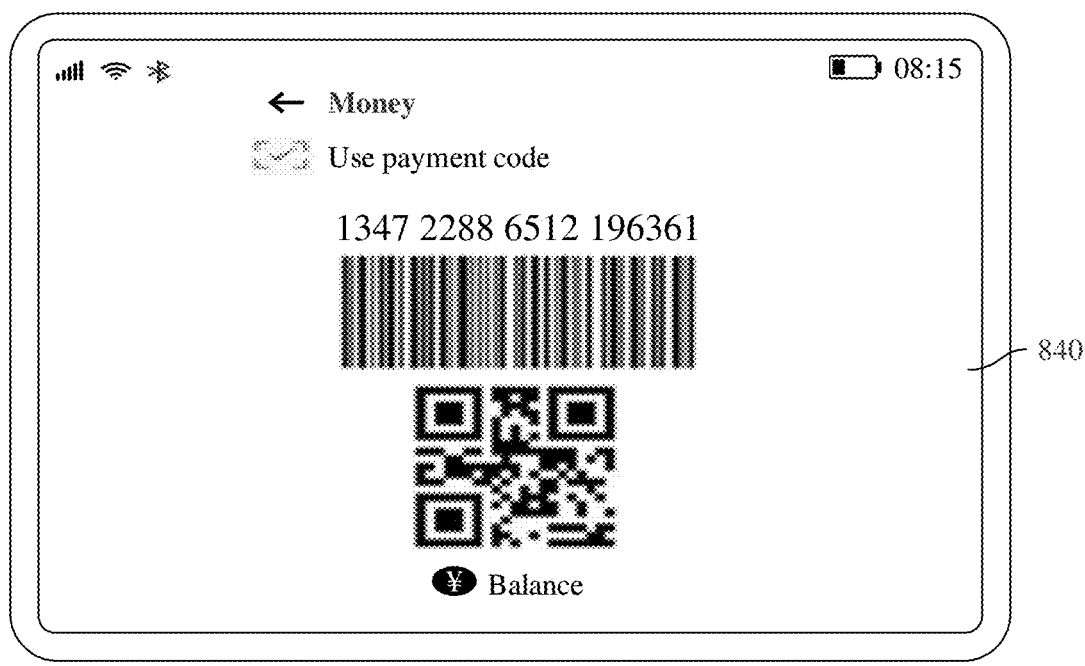

FIG. 8A to FIG. 8C show an example process of displaying a multi-task queue of a mobile phone on a tablet.

As shown in FIG. 8A, a multi-task interface 810 of the tablet is displayed. The multi-task interface 810 includes a device area 820. The device area 820 includes a device icon of the tablet and device icons of one or more electronic devices connected to the tablet, including a computer, a smart screen, and a mobile phone (the electronic device 100). The device icon of the tablet is marked, which indicates that the current multi-task interface 810 is the multi-task interface of the tablet. In other words, pages 821 and 822 are pages corresponding to applications that are running on the tablet.

When the tablet detects a user operation on the device icon of the mobile phone, the tablet displays a multi-task interface of the mobile phone (the electronic device 100) in response to the user operation. As shown in FIG. 8B, the device icon of the mobile phone in the device area 820 is marked, which indicates that a current multi-task interface 830 is the multi-task interface of the mobile phone. In other words, pages 311, 524, and 522 are pages corresponding to applications that are running on the mobile phone. A page 831 and the page 311 in FIG. 3B are application interfaces of a same activity, a page 832 and the page 524 in FIG. 3B are application interfaces of a same activity, and a page 833 and the page 522 in FIG. 3C are application interfaces of a same activity. Details are not described herein.

In FIG. 8B, when the tablet detects a user operation on a shortcut control 8322 below the page 832, the tablet displays, in response to the user operation, an application interface 840 corresponding to the shortcut control 8322, as shown in FIG. 8C. A principle of the shortcut control 8322 is the same as that of the foregoing control 528, and details are not described herein.

Figure 9:
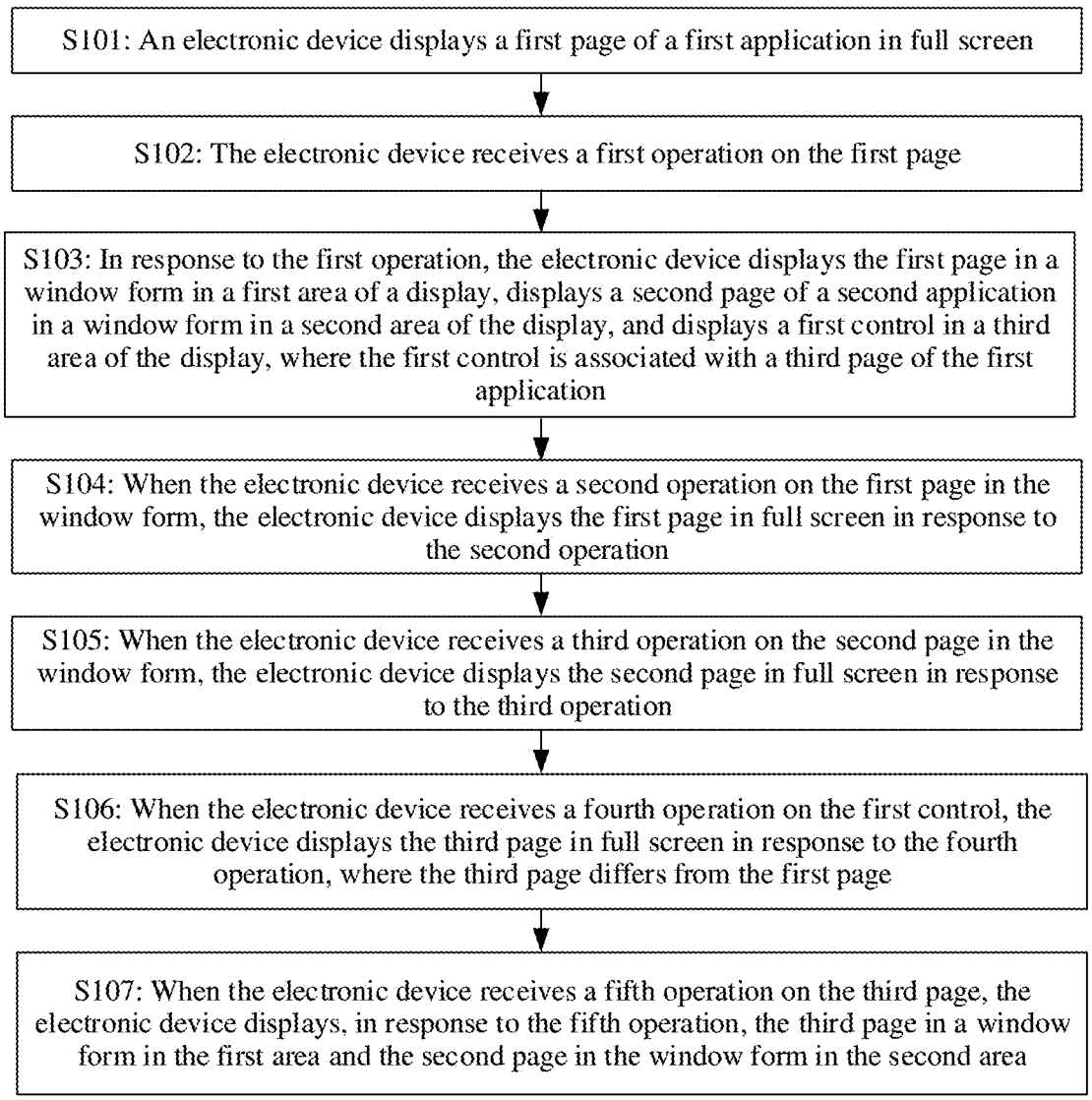
FIG. 9 is a method flowchart of an interface display method according to an embodiment of this application.

The following describes a procedure of an interface display method provided in this application. As shown in FIG. 9, the following steps are included:

S101: An electronic device displays a first page of a first application in full screen.

The first application is an instant messaging application, and the first page may be, for example, the user interface 540 shown in FIG. 2E.

S102: The electronic device receives a first operation on the first page.

The first operation may be an upward sliding operation performed at the bottom of the first page, or may be a tapping operation, a touch operation, a voice operation, or the like.

S103: In response to the first operation, the electronic device displays the first page in a window form in a first area of a display, displays a second page of a second application in a window form in a second area of the display, and displays a first control in a third area of the display, where the first control is associated with a third page of the first application.

The first page in the window form may be, for example, the page 541 shown in FIG. 2F. The second page of the second application in the window form may be, for example, the page 522 shown in FIG. 2F. The third area may be, for example, the control area 525 shown in FIG. 2F. The first control may be, for example, the control 526 shown in FIG. 2F.

S104: When the electronic device receives a second operation on the first page in the window form, the electronic device displays the first page in full screen in response to the second operation.

The second operation is not limited to a tap operation, a touch operation, a voice operation, or the like.

S105: When the electronic device receives a third operation on the second page in the window form, the electronic device displays the second page in full screen in response to the third operation.

The third operation is not limited to a tap operation, a touch operation, a voice operation, or the like.

S106: When the electronic device receives a fourth operation on the first control, the electronic device displays the third page in full screen in response to the fourth operation, where the third page differs from the first page.

The fourth operation is not limited to a tap operation, a touch operation, a voice operation, or the like. For example, in FIG. 2H and FIG. 2I, the electronic device receives a tap operation on the control 526, the electronic device displays the third page. The third page may be the user interface 510 shown in FIG. 2I.

S107: When the electronic device receives a fifth operation on the third page, the electronic device displays, in response to the fifth operation, the third page in a window form in the first area and the second page in the window form in the second area.

The fifth operation may be an upward sliding operation, as shown in FIG. 2I, performed at the bottom of the third page, or may be a tapping operation, a touch operation, a voice operation, or the like. The third page in the window form may be, for example, the page 521 shown in FIG. 2J.

In this embodiment of this application, when the first page on the electronic device is accessed, the first operation may be performed to enter a multi-task interface, and a tap operation may be performed on the first control on the multi-task interface. The first control is associated with the third page. In response to the tap operation performed on the first control, the electronic device displays the third page. In this way, the third page can be quickly entered from the first page can be implemented and access efficiency is improved.

In some embodiments, the electronic device displays the first control in the third area in response to the fifth operation. When the electronic device receives the fifth operation on the third page, the electronic device displays the multi-task interface. The third area still includes the previous first control. In other words, the first control may be always displayed in the third area on the multi-task interface. Optionally, the first control is displayed surrounding the first application. For example, the fifth operation is the upward sliding operation that is shown in FIG. 2I and that is performed at the bottom of the third page, and the first control is the control 526 shown in FIG. 2J.

Figure 2K:
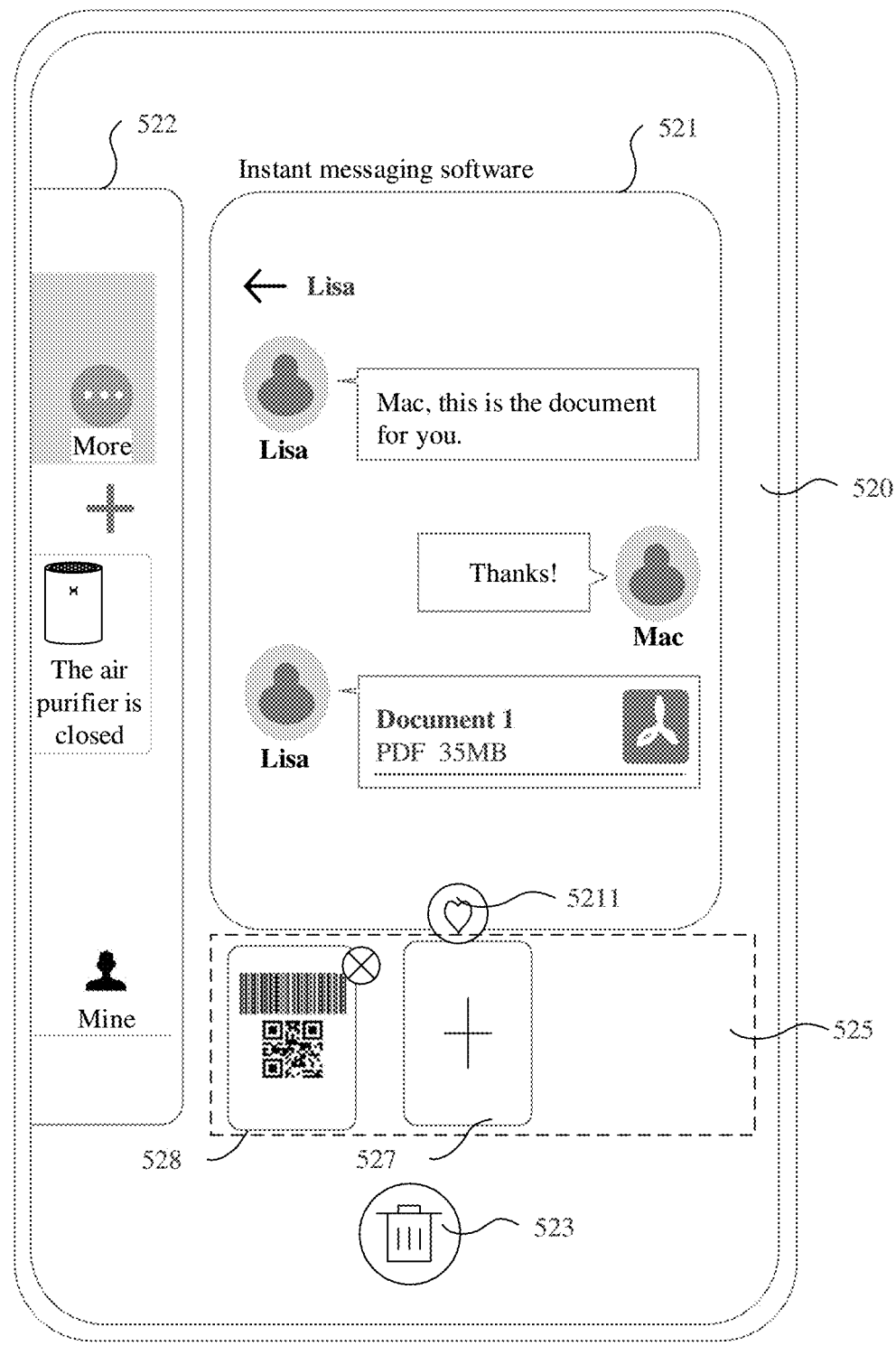

In some embodiments, the electronic device displays a second control in the third area in response to the fifth operation, where the second control is associated with the first page. When the electronic device receives a sixth operation on the second control, the electronic device displays the first page in full screen in response to the sixth operation. For example, as shown in FIG. 2K, the fifth operation is the upward sliding operation that is shown in FIG. 2I and that is performed at the bottom of the third page, and the third area (the control area 525) includes the second control (the control 528 shown in FIG. 2J).

The second control is automatically added by the electronic device. If the electronic device has displayed the third page, the third page is a historical track interface. The electronic device establishes a correspondence between the second control and the third page, and displays the second control in the third area. Optionally, if the electronic device has displayed the third page, and cumulative display time of the third page is greater than a first threshold, the third page is a historical track interface. The electronic device establishes a correspondence between the second control and the third page, and displays the second control in the third area. Optionally, if the electronic device has displayed the third page, and a cumulative quantity of times of displaying the third page is greater than a second threshold, the third page is a historical track interface. The electronic device establishes a correspondence between the second control and the third page, and displays the second control in the third area. A manner in which the electronic device automatically adds a control associated with a historical track interface is provided herein, so that a user can quickly return to a historical interface.

The electronic device displays the third page in a window form in the first area. In this case, the electronic device may directly enter the third page based on the third page in the window form, which functions the same as the first control. Therefore, when the electronic device identifies that a current interface is the multi-task interface entered from the third page, the first control that is in the third area and that is associated with the third page may not be displayed. This reduces resources.

In some embodiments, when the electronic device receives a seventh operation on the first page in the window form, the electronic device displays the second control in the third area in response to the seventh operation, where the second control is associated with the first page. Alternatively, the second control may be manually added by the user. For example, as shown in FIG. 2F and FIG. 2G, the seventh operation is a tap operation on a control 5411.

In some embodiments, the electronic device displays a fourth page in a window form in the first area in response to the seventh operation. The fourth page is a homepage of the first application or an upper-level page of the first page in the first application. For example, as shown in FIG. 2F and FIG. 2G, the first page (the page 541) in the window form is displayed in the first area in FIG. 2F. After the seventh operation on the control 5411 is detected, the page 524 in a window form in FIG. 2G is displayed in the first area. The page 524 is the homepage of the instant messaging application (the first application).

In some embodiments, the first control is displayed in the third area by the electronic device in response to an eighth operation when the electronic device receives the eighth operation on the third page in a window form. The third page in the window form is displayed in the first area by the electronic device in response to a ninth operation when the electronic device displays the third page in full screen and the electronic device receives the ninth operation on the third page. A manner of manually adding the first control is described herein. In the first area of the multi-task interface, the third page in a window form is displayed. When receiving a user operation on the third page, the electronic device may add the first control to the multi-task interface. For example, as shown in FIG. 2B and FIG. 2C, the third page in the window form is the page 521 shown in FIG. 2B. When the electronic device receives a tap operation on the control 5211, the control 526 (the first control) is displayed in the third area in FIG. 2C.

In some embodiments, the electronic device displays the third page in full screen before displaying the first page of the first application in full screen. When the electronic device receives a tenth operation on the third page, the electronic device displays the first page in full screen in response to the tenth operation. A manner of automatically adding the first control is described herein. If the electronic device has displayed the third page, the electronic device establishes a correspondence between the first control and the third page.

In some embodiments, the electronic device displays the third page in full screen before displaying the first page of the first application in full screen, where the cumulative display time of the third page is greater than the first threshold. When the electronic device receives a tenth operation on the third page, the electronic device displays the first page in full screen in response to the tenth operation. Another manner of automatically adding the first control is described herein. If the electronic device has displayed the third page, and the cumulative display time of the third page is greater than the first threshold, the electronic device establishes a correspondence between the first control and the third page.

In some embodiments, the electronic device displays the third page in full screen before displaying the first page of the first application in full screen, where the cumulative quantity of times of displaying the third page is greater than the second threshold. When the electronic device receives the tenth operation on the third page, the electronic device displays the first page in full screen in response to the tenth operation. Another manner of automatically adding the first control is described herein. If the electronic device has displayed the third page, and the cumulative quantity of times of displaying the third page is greater than the first threshold, the electronic device establishes a correspondence between the first control and the third page.

In some embodiments, the third area further includes a third control, the third control is associated with a fifth page of the first application, and the third control is preset by the electronic device.

In some embodiments, the electronic device displays the fifth page in full screen. When the electronic device receives an eleventh operation on the fifth page, the electronic device displays the first control and a fourth control in response to the eleventh operation. When the electronic device receives a user operation on the first control, the electronic device displays the third page in full screen. When the electronic device receives a user operation on the fourth control, the electronic device displays a sixth page of a third application in full screen, where the third application differs from the first application. The electronic device may view controls of a plurality of applications. When the eleventh operation is detected on the fifth page such as the user interface 610 in FIG. 7A, the display device displays the interface shown in FIG. 7B. The first control, such as a control 622, is associated with the first application. The fourth control, such as a control 621, is associated with a fourth application.

In some embodiments, after the electronic device displays the third page in full screen when receiving the user operation on the first control, the electronic device displays a fifth control on the third page. When the electronic device receives a user operation on the fifth control, the electronic device displays the fifth page in full screen. A return control is provided herein. If the electronic device enters the fifth page by using the first control, the electronic device may also quickly return to the third page by using the fifth control on the fifth page. For example, the fifth control is the control 640 shown in FIG. 7C.

In some embodiments, after the electronic device displays the sixth page of the third application in full screen when receiving the user operation on the fourth control, the electronic device displays a sixth control on the sixth page. When the electronic device receives a user operation on the sixth control, the electronic device displays the fifth page in full screen.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid-state drive), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

What is claimed is:

1. An interface display method, wherein the method comprises:
   displaying, by an electronic device, a first page of a first application in full screen of a display, the full screen of the display comprising a first area, a second area, and a third area;
   receiving, by the electronic device, a first operation on the first page;
   displaying, by the electronic device in response to the first operation, the first page in a window form in the first area of the display, displaying a second page of a second application in a window form in the second area of the display, and displaying a first control in the third area of the display, wherein the first control is associated with a third page of the first application;

when the electronic device receives a second operation on the first page in the window form, displaying, by the electronic device, the first page in full screen in response to the second operation;

when the electronic device receives a third operation on the second page in the window form, displaying, by the electronic device, the second page in full screen in response to the third operation;

when the electronic device receives a fourth operation on the first control, displaying, by the electronic device, the third page in full screen in response to the fourth operation, wherein the third page differs from the first page; and when the electronic device receives a fifth operation on the third page, displaying, by the electronic device in response to the fifth operation, the third page in a window form in the first area and the second page in the window form in the second area.

2. The method according to claim 1, wherein the method further comprises:
displaying, by the electronic device, the first control in the third area in response to the fifth operation.

3. The method according to claim 1, wherein the method further comprises:
displaying, by the electronic device, a second control in the third area in response to the fifth operation, wherein the second control is associated with the first page; and
when the electronic device receives a sixth operation on the second control, displaying, by the electronic device, the first page in full screen in response to the sixth operation.

4. The method according to claim 1, wherein the method further comprises:
when the electronic device receives a seventh operation on the first page in the window form, displaying, by the electronic device, a second control in the third area in response to the seventh operation, wherein the second control is associated with the first page.

5. The method according to claim 4, wherein the method further comprises:
displaying, by the electronic device, a fourth page in a window form in the first area in response to the seventh operation, wherein the fourth page is a homepage of the first application or an upper-level page of the first page in the first application.

6. The method according to claim 1, wherein the first control is displayed in the third area by the electronic device in response to an eighth operation when the electronic device receives the eighth operation on the third page in a window form, and the third page in the window form is displayed in the first area by the electronic device in response to a ninth operation when the electronic device displays the third page in full screen and the electronic device receives the ninth operation on the third page.

7. The method according to claim 1, wherein the method further comprises:
displaying, by the electronic device, the third page in full screen before displaying the first page of the first application in full screen; and
when the electronic device receives a tenth operation on the third page, displaying, by the electronic device, the first page in full screen in response to the tenth operation.

8. The method according to claim 1, wherein the method further comprises:
displaying, by the electronic device, the third page in full screen before displaying the first page of the first application in full screen, wherein cumulative display time of the third page is greater than a first threshold; and
when the electronic device receives a tenth operation on the third page, displaying, by the electronic device, the first page in full screen in response to the tenth operation.

9. The method according to claim 1, wherein the method further comprises:
displaying, by the electronic device, the third page in full screen before displaying the first page of the first application in full screen, wherein a cumulative quantity of times of displaying the third page is greater than a second threshold; and
when the electronic device receives a tenth operation on the third page, displaying, by the electronic device, the first page in full screen in response to the tenth operation.

10. The method according to claim 1, wherein the third area further comprises a third control, the third control is associated with a fifth page of the first application, and the third control is preset by the electronic device.

11. The method according to claim 1, wherein the method further comprises:
displaying, by the electronic device, a fifth page in full screen;
receiving, by the electronic device, an eleventh operation on the fifth page;
displaying, by the electronic device, the first control and a fourth control in response to the eleventh operation; and
when the electronic device receives a user operation on the first control, displaying, by the electronic device, the third page in full screen; or when the electronic device receives a user operation on the fourth control, displaying, by the electronic device, a sixth page of a third application in full screen, wherein the third application differs from the first application.

12. The method according to claim ii, wherein the method further comprises:
after the electronic device displays the third page in full screen when receiving the user operation on the first control, displaying, by the electronic device, a fifth control on the third page; and
when the electronic device receives a user operation on the fifth control, displaying, by the electronic device, the fifth page in full screen.

13. The method according to claim ii, wherein the method further comprises:
after the electronic device displays the sixth page of the third application in full screen when receiving the user operation on the fourth control, displaying, by the electronic device, a sixth control on the sixth page; and
when the electronic device receives a user operation on the sixth control, displaying, by the electronic device, the fifth page in full screen.

14. An electronic device, comprising:
one or more processors and one or more memories, wherein the one or more memories are coupled to the one or more processors, the one or more memories are configured to store computer program code, the computer program code comprises computer instructions, and when the computer instructions are executed on the processor, the electronic device is enabled to:

display a first page of a first application in full screen of a display, the full screen of the display comprising a first area, a second area, and a third area;

receive a first operation on the first page;

display, in response to the first operation, the first page in a window form in a first area of a display, displaying a second page of a second application in a window form in a second area of the display, and displaying a first control in a third area of the display, wherein the first control is associated with a third page of the first application;

when the electronic device receives a second operation on the first page in the window form, display, by the electronic device, the first page in full screen in response to the second operation;

when the electronic device receives a third operation on the second page in the window form, display, by the electronic device, the second page in full screen in response to the third operation;

when the electronic device receives a fourth operation on the first control, display, by the electronic device, the third page in full screen in response to the fourth operation, wherein the third page differs from the first page; and when the electronic device receives a fifth operation on the third page, display, by the electronic device in response to the fifth operation, the third page in a window form in the first area and the second page in the window form in the second area.

15. The electronic device according to claim 14, wherein the electronic device is further enabled to:
display, the first control in the third area in response to the fifth operation.

16. The electronic device according to claim 14, wherein the electronic device is further enabled to:
display, by the electronic device, a second control in the third area in response to the fifth operation, wherein the second control is associated with the first page; and when receives a sixth operation on the second control, displaying, by the electronic device, the first page in full screen in response to the sixth operation.

17. The electronic device according to claim 14, wherein the electronic device is further enabled to:
when receives a seventh operation on the first page in the window form, display, by the electronic device, a second control in the third area in response to the seventh operation, wherein the second control is associated with the first page.

18. The electronic device according to claim 17, wherein the electronic device is further enabled to:
display, by the electronic device, a fourth page in a window form in the first area in response to the seventh operation, wherein the fourth page is a homepage of the first application or an upper-level page of the first page in the first application.

19. The electronic device according to claim 14, wherein the first control is displayed in the third area by the electronic device in response to an eighth operation when the electronic device receives the eighth operation on the third page in a window form, and the third page in the window form is displayed in the first area by the electronic device in response to a ninth operation when the electronic device displays the third page in full screen and the electronic device receives the ninth operation on the third page.

20. The electronic device according to claim 14, wherein the electronic device is further enabled to:
display the third page in full screen before displaying the first page of the first application in full screen; and when receives a tenth operation on the third page, display, by the electronic device, the first page in full screen in response to the tenth operation.

* * * * *